US012446605B2

(12) United States Patent
McCormick et al.

(10) Patent No.: US 12,446,605 B2
(45) Date of Patent: Oct. 21, 2025

(54) SWEETENERS

(71) Applicant: Sweegen, Inc., Rancho Santa Margarita, CA (US)

(72) Inventors: Casey McCormick, Rancho Santa Margarita, CA (US); Jenise Pratt, La Habra, CA (US); Daria Agnieszka Nalewajek, Reading (GB); Orrany Chayasing, Irvine, CA (US); James Xu, Irvine, CA (US)

(73) Assignee: Sweegen, Inc., Rancho Santa Margarita, CA (US)

( * ) Notice: Subject to any disclaimer, the term of this patent is extended or adjusted under 35 U.S.C. 154(b) by 0 days.

(21) Appl. No.: 18/187,931

(22) Filed: Mar. 22, 2023

(65) Prior Publication Data
US 2023/0345984 A1 Nov. 2, 2023

Related U.S. Application Data

(60) Provisional application No. 63/449,266, filed on Mar. 1, 2023, provisional application No. 63/323,003, filed on Mar. 23, 2022.

(51) Int. Cl.
A23L 27/30 (2016.01)
A23G 1/40 (2006.01)
A23G 1/44 (2006.01)
A23L 2/60 (2006.01)
A23L 2/66 (2006.01)
A23L 27/00 (2016.01)
A23L 27/60 (2016.01)
(Continued)

(52) U.S. Cl.
CPC ............. *A23L 27/36* (2016.08); *A23G 1/40* (2013.01); *A23G 1/44* (2013.01); *A23L 2/60* (2013.01); *A23L 2/66* (2013.01); *A23L 27/31* (2016.08); *A23L 27/63* (2016.08); *A23L 27/88* (2016.08); *A61K 47/26* (2013.01); *A61K 47/42* (2013.01)

(58) Field of Classification Search
CPC .................................. A23L 2/60; A23L 27/36
See application file for complete search history.

(56) References Cited

U.S. PATENT DOCUMENTS 10,010,099 B2   7/2018  Mao et al.
10,010,101 B2   7/2018  Mao et al.
(Continued)

FOREIGN PATENT DOCUMENTS

CA    2912436 C    1/2019
EP    3607833      2/2020
(Continued)

OTHER PUBLICATIONS

Fawibe et al., Botanical and Protein Sweeteners. Journal of Advanced Laboratory Research in Biology. Oct. 2014;5(4):169-187.
(Continued)

*Primary Examiner* — Jenna A Watts
(74) *Attorney, Agent, or Firm* — Wolf, Greenfield & Sacks, P.C.

(57) ABSTRACT

The present disclosure relates, at least in part, to compositions (e.g., formulations) comprising a steviol glycoside, Rebaudioside M (Reb M), combined with brazzein that have improved caloric profile as well as flavor, taste and/or mouthfeel. In some embodiments, the composition further comprises one or more additional sweeteners.

29 Claims, 6 Drawing Sheets
Specification includes a Sequence Listing.

(51) Int. Cl.
　　*A61K 47/26*　　(2006.01)
　　*A61K 47/42*　　(2017.01)

(56) References Cited

U.S. PATENT DOCUMENTS

| | | | |
|---|---|---|---|
| 10,407,400 | B2 | 9/2019 | Jiang et al. |
| 10,932,483 | B2 | 3/2021 | Lee et al. |
| 10,966,447 | B2 | 4/2021 | Erickson et al. |
| 11,019,837 | B2 | 6/2021 | Brijwani et al. |
| 11,102,995 | B2 | 8/2021 | Browne et al. |
| 11,154,079 | B2 | 10/2021 | Shi et al. |
| 11,252,978 | B2 | 2/2022 | Shi et al. |
| 2017/0275666 | A1* | 9/2017 | Prakash .................. A23L 2/60 |
| 2022/0361544 | A1 | 11/2022 | Prakash |

FOREIGN PATENT DOCUMENTS

| | | | | |
|---|---|---|---|---|
| WO | WO-2017059414 A1 * | 4/2017 | ............. | A23L 2/60 |
| WO | 2020/205978 | 10/2020 | | |
| WO | 2022/155668 | 7/2022 | | |

OTHER PUBLICATIONS

Hellekant et al., Brazzein a Small, Sweet Protein: Discovery and Physiological Overview. Chem Senses. Jan. 2005;30 Suppl 1:188-9. doi: 10.1093/chemse/bjh127.

Poinski, Sweegen to bring brazzein to market through synthetic biology. Food Dive. Published Jan. 6, 2022. https://www.fooddive.com/news/sweegenbrazzein-conagen-synbio/616547 [last accessed Jun. 21, 2023].

Prakash et al., Development of Next Generation Stevia Sweetener: Rebaudioside M. Foods. Feb. 27, 2014;3(1):162-175. doi: 10.3390/foods3010162.

Reyes et al., Evaluation of Sweetener Synergy in Humans by Isobole Analyses. Chem Senses. Oct. 17, 2019;44(8):571-582. doi: 10.1093/chemse/bjz056.

International Search Report and Written Opinion for Application No. PCT/US2023/064797, mailed Jun. 30, 2023.

International Preliminary Report on Patentability for Application No. PCT/US2023/064797, mailed Oct. 3, 2024.

\* cited by examiner

CSD Cola Sweegen

1+4 Syrup

| Ingredients | 100 ml | |
|---|---:|---|
| Potassium Sorbate | 0.0150 | g |
| Sodium Benzoate | 0.0150 | g |
| Bestevia® Reb M | 0.0320 | g |
| Brazzein | 0.0025 | g |
| | | |
| Cola Flavour | 0.0300 | g |
| Cola Base | 0.2500 | g |
| Water | 19.656 | ml |
| | | |
| Carbonated water | to volume 100 | ml |

FIG. 3A

CSD Cola Sweegen

1+4 Syrup

| Ingredients | 100 ml | |
|---|---:|---|
| Potassium Sorbate | 0.0150 | g |
| Sodium Benzoate | 0.0150 | g |
| Bestevia® Reb M | 0.0320 | g |
| | | |
| | | |
| Cola Flavour | 0.0300 | g |
| Cola Base | 0.2500 | g |
| Water | 19.658 | ml |
| | | |
| Carbonated water | to volume 100 | ml |

FIG. 3B

CSD Cola Sweegen

1+4 Syrup

| Ingredients | 100 ml | |
|---|---|---|
| Potassium Sorbate | 0.0150 | g |
| Sodium Benzoate | 0.0150 | g |
| Reb M, Reb D, Reb E, Reb I | 0.0400 | g |
| Brazzein | 0.0025 | g |
| | | |
| Cola Flavour | 0.0300 | g |
| Cola Base | 0.2500 | g |
| Water | 19.648 | ml |
| | | |
| Carbonated water | to volume 100 | ml |

FIG. 4A

CSD Cola Sweegen

1+4 Syrup

| Ingredients | 100 ml | |
|---|---|---|
| Potassium Sorbate | 0.0150 | g |
| Sodium Benzoate | 0.0150 | g |
| Reb M, Reb D, Reb E, Reb I | 0.0400 | g |
| | | |
| | | |
| Cola Flavour | 0.0300 | g |
| Cola Base | 0.2500 | g |
| Water | 19.650 | ml |
| | | |
| Carbonated water | to volume 100 | ml |

FIG. 4B

NAS Tomato Ketchup
Bestevia® Platinum & Sweetensity™ Natural Flavor SX00132

|  | Usage | g |
|---|---|---|
| Tomato puree, double concentrated | 18.0000 | g |
| Spirit Vinegar (10% acetic acid) | 7.0000 | g |
| Salt | 1.8000 | g |
| Black pepper | 0.0150 | g |
| Garlic powder | 0.0200 | g |
| Onion powder | 0.0100 | g |
| Cloves | 0.0100 | g |
| Starch, corn modified | 2.6000 | g |
| Bestevia® Platinum (Liquid Reb M, Reb D, Reb E, Reb I) SWGI00004 | 0.3000 | g |
| Sweetensity™ Natural Flavor SX00132 | 0.1500 | g |
| Potassium Sorbate | 0.1000 | g |
| Water | 69.9950 | g |
| Total | 100 | g |

FIG. 5A

NAS Tomato Ketchup
Bestevia® Platinum

|  | Usage | g |
|---|---|---|
| Tomato puree, double concentrated | 18.0000 | g |
| Spirit Vinegar (10% acetic acid) | 7.0000 | g |
| Salt | 1.8000 | g |
| Black pepper | 0.0150 | g |
| Garlic powder | 0.0200 | g |
| Onion powder | 0.0100 | g |
| Cloves | 0.0100 | g |
| Starch, corn modified | 2.6000 | g |
| Bestevia® Platinum (Liquid Reb M, Reb D, Reb E, Reb I) SWGI00004 | 0.3000 | g |
|  |  | g |
| Potassium Sorbate | 0.1000 | g |
| Water | 70.1450 | g |
|  |  |  |
|  |  |  |
| Total | 100 | g |

FIG. 5B

| Rebaudioside M | | $C_{56}H_{90}O_{33}$ | 1291.29 g/mol |
|---|---|---|---|

FIG. 6

```
                        SEQUENCE LISTING

Sequence total quantity: 15
SEQ ID NO: 1            moltype = AA  length = 457
FEATURE                 Location/Qualifiers
source                  1..457
                        mol_type = protein
                        organism = Stevia rebaudiana
SEQUENCE: 1
MENKTETTVR RRRRIILFPV PFQGHINPIL QLANVLYSKG FSITIFHTNF NKPKTSNYPH   60
FTFRFILDND PQDERISNLP THGPLAGMRI PIINEHGADE LRRELELLML ASEEDEEVSC  120
LITDALWYFA QSVADSLNLR RLVLMTSSLF NFHAHVSLPQ FDELGYLDPD DKTRLEEQAS  180
GFPMLKVKDI KSAYSNWQIL KEILGKMIKQ TKASSGVIWN SFKELEESEL ETVIREIPAP  240
SFLIPLPKHL TASSSSLLDH DRTVFQWLDQ QPPSSVLYVS FGSTSEVDEK DFLEIARGLV  300
DSKQSFLWVV RPGFVKGSTW VEPLPDGFLG ERGRIVKWVP QQEVLAHGAI GAFWTHSGWN  360
STLESVCEGV PMIFSDFGLD QPLNARYMSD VLKVGVYLEN GWERGEIANA IRRVMVDEEG  420
EYIRQNARVL KQKADVSLMK GGSSYESLES LVSYISS                          457

SEQ ID NO: 2            moltype = AA  length = 458
FEATURE                 Location/Qualifiers
source                  1..458
                        mol_type = protein
                        organism = Synthetic construct
SEQUENCE: 2
MENKTETTVR RRRRIILFPV PFQGHINPIL QLANVLYSKG FSITIFHTNF NKPKTSNYPH   60
FTFRFILDND PQDERISNLP THGPLAGMRI PIINEHGADE LRRELELLML ASEEDEEVSC  120
LITDALWYFA QSVADSLNLR RLVLMTSSLF NFHAHVSLPQ FDELGYLDPD DKTRLEEQAS  180
GFPMLKVKDI KSAYSNWQIA KEILGKMIKQ TKASSGVIWN SFKELEESEL ETVIREIPAP  240
SFLIPLPKHL TASSSSLLDH DRTVFQWLDQ QPPSSVLYVS FGSTSEVDEK DFLEIARGLV  300
DSKQSFLWVV RPGFVKGSTW VEPLPDGFLG ERGRIVKWVP QQEVLAHGAI GAFWTHSGWN  360
STLESVCEGV PMIFSDFGLD QPLNARYMSD VLKVGVYLEN GWERGEIANA IRRVMVDEEG  420
EYIRQNARVL KQKADVSLMK GGSSYESLES LVSYISSL                         458

SEQ ID NO: 3            moltype = AA  length = 458
FEATURE                 Location/Qualifiers
source                  1..458
                        mol_type = protein
                        organism = Synthetic construct
SEQUENCE: 3
MNWQILKEIL GKMIKQTKAS SGVIWNSFKE LEESELETVI REIPAPSFLI PLPKHLTASS   60
SSLLDHDRTV FQWLDQQPPS SVLYVSFGST SEVDEKDFLE IARGLVDSKQ SFLWVVRPGF  120
VKGSTWVEPL PDGFLGERGR IVKWVPQQEV LAHGAIGAFW THSGWNSTLE SVCEGVPMIF  180
SDFGLDQPLN ARYMSDVLKV GVYLENGWER GEIANAIRRV MVDEEGEYIR QNARVLKQKA  240
DVSLMKGGSS YESLESLVSY ISSLENKTET TVRRRRRIIL FPVPFQGHIN PILQLANVLY  300
SKGFSITIFH TNFNKPKTSN YPHFTFRFIL DNDPQDERIS NLPTHGPLAG MRIPIINEHG  360
ADELRRELEL LMLASEEDEE VSCLITDALW YFAQSVADSL NLRRLVLMTS SLFNFHAHVS  420
LPQFDELGYL DPDDKTRLEE QASGFPMLKV KDIKSAYS                         458

SEQ ID NO: 4            moltype = AA  length = 482
FEATURE                 Location/Qualifiers
source                  1..482
                        mol_type = protein
                        organism = Synthetic construct
SEQUENCE: 4
MNWQILKEIL GKMIKQTKAS SGVIWNSFKE LEESELETVI REIPAPSFLI PLPKHLTASS   60
SSLLDHDRTV FQWLDQQPPS SVLYVSFGST SEVDEKDFLE IARGLVDSKQ SFLWVVRPGF  120
VKGSTWVEPL PDGFLGERGR IVKWVPQQEV LAHGAIGAFW THSGWNSTLE SVCEGVPMIF  180
SDFGLDQPLN ARYMSDVLKV GVYLENGWER GEIANAIRRV MVDEEGEYIR QNARVLKQKA  240
DVSLMKGGSS YESLESLVSY ISSLYKDDSG YSSSYAAAAG MENKTETTVR RRRRIILFPV  300
PFQGHINPIL QLANVLYSKG FSITIFHTNF NKPKTSNYPH FTFRFILDND PQDERISNLP  360
THGPLAGMRI PIINEHGADE LRRELELLML ASEEDEEVSC LITDALWYFA QSVADSLNLR  420
RLVLMTSSLF NFHAHVSLPQ FDELGYLDPD DKTRLEEQAS GFPMLKVKDI KSAYSSEQID  480
NO                                                                482
```

```
SEQ ID NO: 5            moltype = AA  length = 462
FEATURE                 Location/Qualifiers
source                  1..462
                        mol_type = protein
                        note = Oryza sativa chromosome 3
                        organism = unidentified
SEQUENCE: 5
MDSGYSSSYA  AAAGMHVVIC  PWLAFGHLLP  CLDLAQRLAS  RGHRVSFVST  PRNISRLPPV   60
RPALAPLVAF  VALPLPRVEG  LPDGAESTND  VPHDRPDMVE  LHRRAFDGLA  APFSEFLGTA  120
CADWVIVDVF  HHWAAAAALE  HKVPCAMMLL  GSAHMIASIA  DRRLERAETE  SPAAAGQGRP  180
AAAPTFEVAR  MKLIRTKGSS  GMSLAERFSL  TLSRSSLVVG  RSCVEFEPET  VPLLSTLRGK  240
PITFLGLMPP  LHEGRREDGE  DATVRWLDAQ  PAKSVVYVAL  GSEVPLGVEK  VHELALGLEL  300
AGTRFLWALR  KPTGVSDADL  LPAGFEERTR  GRGVVATRWV  PQMSILAHAA  VGAFLTHCGW  360
NSTIEGLMFG  HPLIMLPIFG  DQGPNARLIE  AKNAGLQVAR  NDGDGSFDRE  GVAAAIRAVA  420
VEEESSKVFQ  AKAKKLQEIV  ADMACHERYI  DGFIQQLRSY  KD                      462

SEQ ID NO: 6            moltype = AA  length = 462
FEATURE                 Location/Qualifiers
source                  1..462
                        mol_type = protein
                        organism = Synthetic construct
SEQUENCE: 6
MGSSGMSLAE  RFSLTLSRSS  LVVGRSCVEF  EPETVPLLST  LRGKPITFLG  LMPPLHEGRR   60
EDGEDATVRW  LDAQPAKSVV  YVALGSEVPL  GVEKVHELAL  GLELAGTRFL  WALRKPTGVS  120
DADLLPAGFE  ERTRGRGVVA  TRWVPQMSIL  AHAAVGAFLT  HCGWNSTIEG  LMFGHPLIML  180
PIFGDQGPNA  RLIEAKNAGL  QVARNDGDGS  FDREGVAAAI  RAVAVEEESS  KVFQAKAKKL  240
QEIVADMACH  ERYIDGFIQQ  LRSYKDDSGY  SSSYAAAAGM  HVVICPWLAF  GHLLPCLDLA  300
QRLASRGHRV  SFVSTPRNIS  RLPPVRPALA  PLVAFVALPL  PRVEGLPDGA  ESTNDVPHDR  360
PDMVELHRRA  FDGLAAPFSE  FLGTACADWV  IVDVFHHWAA  AAALEHKVPC  AMMLLGSAHM  420
IASIADRRLE  RAETESPAAA  GQGRPAAAPT  FEVARMKLIR  TK                      462

SEQ ID NO: 7            moltype = AA  length = 459
FEATURE                 Location/Qualifiers
source                  1..459
                        mol_type = protein
                        note = Hordeum vulgare subsp. Vulgare
                        organism = unidentified
SEQUENCE: 7
MDGNSSSSPL  HVVICPWLAL  GHLLPCLDIA  ERLASRGHRV  SFVSTPRNIA  RLPPLRPAVA   60
PLVDFVALPL  PHVDGLPEGA  ESTNDVPYDK  FELHRKAFDG  LAAPFSEFLR  AACAEGAGSR  120
PDWLIVDTFH  HWAAAAAVEN  KVPCVMLLLG  AATVIAGFAR  GVSEHAAAAV  GKERPAAEAP  180
SFETERRKLM  TTQNASGMTV  AERYFLTLMR  SDLVAIRSCA  EWEPESVAAL  TTLAGKPVVP  240
LGLLPPSPEG  GRGVSKEDAA  VRWLDAQPAK  SVVYVALGSE  VPLRAEQVHE  LALGLELSGA  300
RFLWALRKPT  DAPDAAVLPP  GFEERTRGRG  LVVTGWVPQI  GVLAHGAVAA  FLTHCGWNST  360
IEGLLFGHPL  IMLPISSDQG  PNARLMEGRK  VGMQVPRDES  DGSFRREDVA  ATVRAVAVEE  420
DGRRVFTANA  KKMQEIVADG  ACHERCIDGF  IQQLRSYKA                           459

SEQ ID NO: 8            moltype = AA  length = 808
FEATURE                 Location/Qualifiers
source                  1..808
                        mol_type = protein
                        organism = Arabidopsis thaliana
SEQUENCE: 8
MANAERMITR  VHSQRERLNE  TLVSERNEVL  ALLSRVEAKG  KGILQQNQII  AEFEALPEQT   60
RKKLEGGPFF  DLLKSTQEAI  VLPPWVALAV  RPRPGVWEYL  RVNLHALVVE  ELQPAEFLHF  120
KEELVDGVKN  GNFTLELDFE  PFNASIPRPT  LHKYIGNGVD  FLNRHLSAKL  FHDKESLLPL  180
LKFLRLHSHQ  GKNLMLSEKI  QNLNTLQHTL  RKAEEYLAEL  KSETLYEEFE  AKFEEIGLER  240
GWGDNAERVL  DMIRLLLDLL  EAPDPCTLET  FLGRVPMVFN  VVILSPHGYF  AQDNVLGYPD  300
TGGQVVYILD  QVRALEIEML  QRIKQQGLNI  KPRILILTRL  LPDAVGTTCG  ERLERVYDSE  360
YCDILRVPFR  TEKGIVRKWI  SRFEVWPYLE  TYTEDAAVEL  SKELNGKPDL  IIGNYSDGNL  420
VASLLAHKLG  VTQCTIAHAL  EKTKYPDSDI  YWKKLDDKYH  FSCQFTADIF  AMNHTDFIIT  480
STFQEIAGSK  ETVGQYESHT  AFTLPGLYRV  VHGIDVFDPK  FNIVSPGADM  SIYFPYTEEK  540
RRLTKFHSEI  EELLYSDVEN  KEHLCVLKDK  KKPILFTMAR  LDRVKNLSGL  VEWYGKNTRL  600
RELANLVVVG  GDRRKESKDN  EEKAEMKKMY  DLIEEYKLNG  QFRWISSQMD  RVRNGELYRY  660
ICDTKGAFVQ  PALYEAFGLT  VVEAMTCGLP  TFATCKGGPA  EIIVHGKSGF  HIDPYHGDQA  720
ADTLADFFTK  CKEDPSHWDE  ISKGGLQRIE  EKYTWQIYSQ  RLLTLTGVYG  FWKHVSNLDR  780
LEARRYLEMF  YALKYRPLAQ  AVPLAQDD                                        808

SEQ ID NO: 9            moltype = AA  length = 1270
FEATURE                 Location/Qualifiers
source                  1..1270
                        mol_type = protein
                        organism = Synthetic construct
SEQUENCE: 9
MENKTETTVR  RRRIILFPV   PFQGHINPIL  QLANVLYSKG  FSITIFHTNF  NKPKTSNYPH   60
FTFRFILDND  PQDERISNLP  THGPLAGMRI  PIINEHGADE  LRRELELLML  ASEEDEEVSC  120
LITDALWYFA  QSVADSLNLR  RLVLMTSSLF  NFHAHVSLPQ  FDELGYLDPD  DKTRLEEQAS  180
GPPMLKVKDI  KSAYSNWQIL  KEILGKMIKQ  TKASSGVIWN  SFKELEESEL  ETVIREIPAP  240
SFLIPLPKHL  TASSSSLLDH  DRTVFQWLDQ  QPPSSVLYVS  FGSTSEVDEK  DFLEIARGLV  300
```

```
DSKQSFLWVV RPGFVKGSTW VEPLPDGFLG ERGRIVKWVP QQEVLAHGAI GAFWTHSGWN    360
STLESVCEGV PMIFSDFGLD QPLNARYMSD VLKVGVYLEN GWERGEIANA IRRVMVDEEG    420
EYIRQNARVL KQKADVSLMK GGSSYESLES LVSYISSLGS GANAERMITR VHSQRERLNE    480
TLVSERNEVL ALLSRVEAKG KGILQQNQII AEFEALPEQT RKKLEGGPFF DLLKSTQEAI    540
VLPPWVALAV RPRPGVWEYL RVNLHALVVE ELQPAEFLVD KEELVDGVKN GNFTLEDFE     600
PFNASIPRPT LHKYIGNGVD FLNRHLSAKL FHDKESLLPL LKFLRLHSHQ GKNLMLSEKI    660
QNLNTLQHTL RKAEEYLAEL KSETLYEEFE AKFEEIGLER GWGDNAERVL DMIRLLLDLL    720
EAPDPCTLET FLGRVPMVFN VVILSPHGYF AQDNVLGYPD TGGQVVYILD QVRALEIEML    780
QRIKQQGLNI KPRILILTRL LPDAVGTTCG ERLERVYDSE YCDILRVPFR TEKGIVRKWI    840
SRFEVWPYLE TYTEDAAVEL SKELNGKPDL IIGNYSDGNL VASLLAHKLG VTQCTIAHAL    900
EKTKYPDSDI YWKKLDDKYH FSCQFTADIF AMNHTDFIIT STFQEIAGSK ETVGQYESHT    960
AFTLPGLYRV VHGIDVFDPK FNIVSPGADM SIYFPYTEEK RRLTKFHSEI EELLYSDVEN   1020
KEHLCVLKDK KKPILFTMAR LDRVKNLSGL VEWYGKNTRL RELANLVVVG GDRRKESKDN   1080
EEKAEMKKMY DLIEEYKLNG QFRWISSQMD RVRNGELYRY ICDTKGAFVQ PALYEAFGLT   1140
VVEAMTCGLP TFATCKGGPA EIIVHGKSGF HIDPYHGDQA ADTLADFFTK CKEDPSHWDE   1200
ISKGGLQRIE EKYTWQIYSQ RLLTLTGVYG FWKHVSNLDR LEARRYLEMF YALKYRPLAQ   1260
AVPLAQDDWT                                                          1270

SEQ ID NO: 10          moltype = AA  length = 1272
FEATURE                Location/Qualifiers
source                 1..1272
                       mol_type = protein
                       organism = Synthetic construct
SEQUENCE: 10
MDSGYSSSYA AAAGMHVVIC PWLAFGHLLP CLDLAQRLAS RGHRVSFVST PRNISRLPPV     60
RPALAPLVAF VALPLPRVEG LPDGAESTND VPHDRPDMVE LHRRAFDGLA APFSEFLGTA    120
CADWVIVDVF HHWAAAAALE HKVPCAMMLL GSAHMIASIA DRRLERAETE SPAAAGQGRP    180
AAAPTFEVAR MKLIRTKGSS GMSLAERFSL TLSRSSLVVG RSCVEFEPET VPLLSTLRGK    240
PITFLGLMPP LHEGRREDGE DATVRWLDAQ PAKSVVYVAL GSEVPLGVEK VHELALGLEL    300
AGTRFLWALR KPTGVSDADL LPAGFEERTR GRGVVATRWV PQMSILAHAA VGAFLTHCGW    360
NSTIEGLMFG HPLIMLPIFG DQGPNARLIE AKNAGLQVAR NDGDGSFDRE GVAAAIRAVA    420
VEEESSKVFQ AKAKKLQEIV ADMACHERYI DGFIQQLRSY KDGSGANAER MITRVHSQRE    480
RLNETLVSER NEVLALLSRV EAKGKGILQQ NQIIAEFEAL PEQTRKKLEG GPFFDLLKST    540
QEAIVLPPWV ALAVRPRPGV WEYLRVNLHA LVVEELQPAE FLHFKEELVD GVKNGNFTLE    600
LDFEPFNASI PRPTLHKYIG NGVDFLNRHL SAKLFHDKES LLPLLKFLRL HSHQGKNLML    660
SEKIQNLNTL QHTLRKAEEY LAELKSETLY EEFEAKFEEI GLERGWGDNA ERVLDMIRLL    720
LDLLEAPDPC TLETFLGRVP MVFNVVILSP HGYFAQDNVL GYPDTGGQVV YILDQVRALE    780
IEMLQRIKQQ GLNIKPRILI LTRLLPDAVG TTCGERLERV YDSEYCDILR VPFRTEKGIV    840
RKWISRFEVW PYLETYTEDA AVELSKELNG KPDLIIGNYS DGNLVASLLA HKLGVTQCTI    900
AHALEKTKYP DSDIYWKKLD DKYHFSCQFT ADIFAMNHTD FIIITSTFQEI AGSKETVGQY    960
ESHTAFTLPG LYRVVHGIDV FDPKFNIVSP GADMSIYFPY TEEKRRLTKF HSEIEELLYS   1020
DVENKEHLCV LKDKKKPILF TMARLDRVKN LSGLVEWYGK NTRLRELANL VVVGGDRRKE   1080
SKDNEEKAEM KKMYDLIEEY KLNGQFRWIS SQMDRVRNGE LYRYICDTKG AFVQPALYEA   1140
FGLTVVEAMT CGLPTFATCK GGPAEIIVHG KSGFHIDPYH GDQAADTLAD FFTKCKEDPS   1200
HWDEISKGGL QRIEEKYTWQ IYSQRLLTLT GVYGFWKHVS NLDRLEARRY LEMFYALKYR   1260
PLAQAVPLAQ DD                                                      1272

SEQ ID NO: 11          moltype = AA  length = 1269
FEATURE                Location/Qualifiers
source                 1..1269
                       mol_type = protein
                       organism = Synthetic construct
SEQUENCE: 11
MDGNSSSSPL HVVICPWLAL GHLLPCLDIA ERLASRGHRV SFVSTPRNIA RLPPLRPAVA     60
PLVDFVALPL PHVDGLPEGA ESTNDVPYDK FELHRKAFDG LAAPFSEFLR AACAEGAGSR    120
PDWLIVDTFH HWAAAAAVEN KVPCVMLLLG AATVIAGFAR GVSEHAAAAV GKERPAAEAP    180
SFETERRKLM TTQNASGMTV AERYFLTLMR SDLVAIRSCA EWEPESVAAL TTLAGKPVVP    240
LGLLPPSPEG GRGVSKEDAA VRWLDAQPAK SVVYVALGSE VPLRAEQVHE LALGLELSGA    300
RFLWALRKPT DAPDAAVLPP GFEERTRGRG LVVTGWVPGL GVLAHGAVAA FLTHCGWNST    360
IEGLLFGHPL IMLPISSDQG PNARLMEGRK VGMQVPRDES DGSFRREDVA ATVRAVAVEE    420
DGRRVFTANA KKMQEIVADG ACHERCIDGF IQQLRSYKAG SGANAERMIT RVHSQRERLN    480
ETLVSERNEV LALLSRVEAK GKGILQQNQI IAEFEALPEQ TRKKLEGGPF FDLLKSTQEA    540
IVLPPWVALA VRPRPGVWEY LRVNLHALVV EELQPAEFLH FKEELVDGVK NGNFTLELDF    600
EPFNASIPRP TLHKYIGNGV DFLNRHLSAK LFHDKESLLP LLKFLRLHSH QGKNLMLSEK    660
IQNLNTLQHT LRKAEEYLAE LKSETLYEEF EAKFEEIGLE RGWGDNAERV LDMIRLLLDL    720
LEAPDPCTLE TFLGRVPMVF NVVILSPHGY FAQDNVLGYP DTGGQVVYIL DQVRALEIEM    780
LQRIKQQGLN IKPRILILTR LLPDAVGTTC GERLERVYDS EYCDILRVPF RTEKGIVRKW    840
ISRFEVWPYL ETYTEDAAVE LSKELNGKPD LIIGNYSDGN LVASLLAHKL GVTQCTIAHA    900
LEKTKYPDSD IYWKKLDDKY HFSCQFTADI FAMNHTDFII TSTFQEIAGS KETVGQYESH    960
TAFTLPGLYR VVHGIDVFDP KFNIVSPGAD MSIYFPYTEE KRRLTKFHSE IEELLYSDVE   1020
NKEHLCVLKD KKKPILFTMA RLDRVKNLSG LVEWYGKNTR LRELANLVVV GGDRRKESKD   1080
NEEKAEMKKM YDLIEEYKLN GQFRWISSQM DRVRNGELYR YICDTKGAFV QPALYEAFGL   1140
TVVEAMTCGL PTFATCKGGP AEIIVHGKSG FHIDPYHGDQ AADTLADFFT KCKEDPSHWD   1200
EISKGGLQRI EEKYTWQIYS QRLLTLTGVY GFWKHVSNLD RLEARRYLEM FYALKYRPLA   1260
QAVPLAQDD                                                          1269

SEQ ID NO: 12          moltype = AA  length = 54
FEATURE                Location/Qualifiers
source                 1..54
```

```
                        mol_type = protein
                        note = Pentadiplandra brazzeana Baillon
                        organism = unidentified
SEQUENCE: 12
QDKCKKVYEN YPVSKCQLAN QCNYDCKLDK HARSGECFYD EKRNLQCICD YCEY              54

SEQ ID NO: 13           moltype =    length =
SEQUENCE: 13
000

SEQ ID NO: 14           moltype = AA   length = 4
FEATURE                 Location/Qualifiers
source                  1..4
                        mol_type = protein
                        organism = Synthetic construct
SEQUENCE: 14
KREA                                                                     4

SEQ ID NO: 15           moltype = AA   length = 12
FEATURE                 Location/Qualifiers
source                  1..12
                        mol_type = protein
                        organism = Synthetic construct
SEQUENCE: 15
KREAEAEAEA EA                                                           12
```

SWEETENERS

RELATED APPLICATION

This application claims the benefit under 35 U.S.C. § 119 (e) to U.S. Provisional Application No. 63/323,003 entitled "SWEETENERS", filed on Mar. 23, 2022, and U.S. Provisional Application No. 63/449,266 entitled "SWEETENERS", filed Mar. 1, 2023; the contents of each of which are incorporated herein by reference in their entirety.

REFERENCE TO AN ELECTRONIC SEQUENCE LISTING

The contents of the electronic sequence listing (S210370006US02-SEQ-ZJG.xml; Size: 21,694 bytes; and Date of Creation: Mar. 22, 2023) is herein incorporated by reference in its entirety.

FIELD OF THE INVENTION

The present disclosure relates, at least in part to, sweeteners based on the steviol glycoside, Rebaudioside M, combined with brazzein protein, as well as compositions thereof, such as oral products, consumables, beverages and pharmaceuticals. More specifically it relates, at least in part to, particular formulations of rebaudiosides and brazzein that can elicit a pleasant oral sensory experience.

BACKGROUND

Zero- or low-calorie sweetener or sugar substitutes that can be used in foods and/or beverages to replace or reduce high-calorie sweeteners and/or sugar content are desirable.

SUMMARY

The present disclosure relates, at least in part, to compositions (e.g., formulations) comprising rebaudiosides (e.g., rebaudioside M) and brazzein protein that have beneficial properties. In some embodiments, the composition provided herein can modify the taste perception of orally consumable products (such as that they can exhibit enhanced sweetness, improved onset of sweetness, improved time and intensity of sweetness, and/or mask bitterness and/or off notes). In some embodiments, the compositions (e.g., formulations) comprise rebaudioside M (Reb M) in varying quantities, as well as brazzein, and can exhibit taste characteristics similar to sugar sweetener systems in carbonated (cola and non-cola) and non-carbonated beverages and concentrates, protein-based products, liquid dairy, yogurt, condiments, baked goods, jams, jellies, and spreads. In some embodiments, the compositions (e.g., formulations) provided herein further comprises ferulic acid. In some embodiments, the formulations can provide for higher solubility than the individual use of Reb M with a taste profile closer to sucrose than individual rebaudiosides, specifically, Reb M alone. In some embodiments, in formulations that also comprise ferulic acid, the ferulic acid can act as an antioxidant, stabilizing the rebaudiosides with which it is formulated.

Accordingly, some aspects of the present disclosure relate to a composition comprising Reb M and brazzein.

In some embodiments, Reb M is present in the composition in an amount that has a sweetness equivalent (SE) between about 0.5% and about 15% sucrose. In some embodiments, Reb M is present in the composition in an amount that has a SE between about 2% and about 10% sucrose. In some embodiments, Reb M is present in the composition in an amount that has a SE of about 5% sucrose.

In some embodiments, brazzein is present in the composition in an amount that is between about 1 ppm and about 200 ppm. In some embodiments, brazzein is present in the composition in an amount that is between about 10 ppm and about 45 ppm. In some embodiments, brazzein is present in the composition in an amount that is between about 10 ppm and about 30 ppm. In some embodiments, brazzein is present in the composition in an amount that is about 25 ppm.

In some embodiments, the composition comprises Reb M in an amount that has a SE of 5% sucrose and brazzein in an amount that is 25 ppm.

In some embodiments, a composition described herein further comprises ferulic acid. In some embodiments, ferulic acid is present in the composition in an amount that is between about 0.8 ppm to about 30 ppm.

Some aspects of the present disclosure provide compositions comprising rebaudioside M (Reb M), brazzein, and ferulic acid. In some embodiments, Reb M is present in the composition in an amount that has a sweetness equivalent (SE) between about 0.5% and about 15% sucrose, brazzein is present in the composition in an amount that is between about 1 ppm and about 200 ppm (e.g., between about 1 ppm and about 45 ppm, or between about 1 ppm and about 30 ppm), and ferulic acid is present in the composition in an amount that is between about 0.8 ppm to about 12 ppm. In some embodiments, Reb M is present in the composition in an amount that has a sweetness equivalent (SE) of about 5% sucrose, brazzein is present in the composition in an amount that is about 25 ppm, and ferulic acid is present in the composition in an amount that is about 6 ppm.

In some embodiments, the composition further comprises rebaudioside B (Reb B), rebaudioside D (Reb D), rebaudioside E (Reb E), rebaudioside I (Reb I), rebaudioside N (Reb N), or combinations thereof. In some embodiments, the composition further comprises rebaudioside B (Reb B). In some embodiments, the composition further comprises rebaudioside D (Reb D). In some embodiments, the composition further comprises rebaudioside E (Reb E). In some embodiments, the composition further comprises rebaudioside I (Reb I). In some embodiments, the composition further comprises rebaudioside N (Reb N). In some embodiments, the composition further comprises rebaudioside B (Reb B), rebaudioside D (Reb D), rebaudioside E (Reb E), rebaudioside I (Reb I), and rebaudioside N (Reb N).

In some embodiments, the composition further comprises L-glucose. In some embodiments, the composition further comprises allulose (D-psicose).

In some embodiments, the composition further comprises erythritol, isomalt, inulin, gum arabic, aspartame, sucralose, acesulfame potassium, tagatose, kojibiose, trehalose, sucrose, lactose, fructose, D-glucose, galactose, or combinations thereof. In some embodiments, the composition further comprises erythritol. In some embodiments, the composition further comprises isomalt. In some embodiments, the composition further comprises inulin. In some embodiments, the composition further comprises gum arabic. In some embodiments, the composition further comprises aspartame. In some embodiments, the composition further comprises sucralose. In some embodiments, the composition further comprises acesulfame potassium. In some embodiments, the composition further comprises tagatose. In some embodiments, the composition further comprises kojibiose. In some embodiments, the composition further comprises trehalose. In some embodiments, the composition further comprises sucrose. In some embodiments, the composition further comprises lactose. In some embodiments, the composition further comprises fructose. In some embodiments, the composition further comprises D-glucose. In some embodiments, the composition further comprises galactose.

Some aspects of the present disclosure further relate to a consumable comprising any of the compositions described herein. In some embodiments, the consumable comprises about 0.2-0.3 wt. % the composition, on an anhydrous wt./wt. basis.

Some aspects of the present disclosure further relate to an oral composition comprising any of the compositions described herein.

Some aspects of the present disclosure further relate to a pharmaceutical composition comprising any of the compositions described herein and a pharmaceutically acceptable excipient.

Some aspects of the present disclosure further relate to a beverage comprising any of the compositions described herein.

Some aspects of the present disclosure further relate to a food comprising any of the compositions described herein.

Some aspects of the present disclosure further relate to an animal feed comprising any of the compositions described herein.

Some aspects of the present disclosure further relate to oral hygiene products. In some embodiments, oral hygiene products are selected from toothpaste or mouthwash.

Some aspects of the present disclosure further relate to a liquid comprising any of the compositions described herein. In some embodiments, the liquid further comprises a solvent. In some embodiments, the solvent is a liquid, food grade and/or organic solvent. In some embodiments, the solvent comprises ethyl alcohol, propylene glycol, glycerin, ferulic acid, or water and/or combinations thereof. In some embodiments, the solvent is propylene glycol or ferulic acid.

Some aspects of the present disclosure further relate to a powder comprising any of the compositions described herein. In some embodiments, the powder further comprises dextrin and/or maltodextrin.

Some aspects of the present disclosure further relate to a table-top sweetener comprising any of the compositions described herein. In some embodiments, the table-top sweetener is in product format. In some embodiments, the table-top sweetener is in a powder format and can be added to a beverage (e.g., tea or coffee).

Some aspects of the present disclosure further relate to a composition, consumable, oral composition, pharmaceutical composition, beverage, food composition, animal feed product, liquid or powder described herein, wherein at least one of Reb M, brazzein, or ferulic acid is made by a genetically modified microorganism. In some embodiments, the genetically modified microorganism comprises one or more proteins having UDP-glycosyltransferase (UGT) and/or sucrose synthase (SUS) activity.

Some aspects of the present disclosure further relate to a method for creating or enhancing the sweetness of a consumable, oral composition, pharmaceutical composition, beverage, food composition, animal feed product, liquid or powder, the method comprising adding an amount of a composition described herein to produce the desired degree of sweetness for the consumable, oral composition, pharmaceutical composition, beverage, food composition, animal feed product, liquid or powder.

The present disclosure, in some aspects, provide compositions comprising rebaudioside M (Reb M) and brazzein, and products comprising such compositions. In some embodiment, in any one of the composition or products provided herein, brazzein is present in the composition in an amount that is between 1 ppm and 100 ppm (e.g., 1-100, 10-90, 20-80, 30-70, 40-60, or 50-55 ppm). In some embodiment, in any one of the composition or products provided herein, Reb M is present in the composition in an amount that is between 1 ppm and 600 ppm (e.g., 1-600, 50-550, 100-500, 150-450, 200-400, 250-350, 200-300 ppm).

In some embodiment, any one of the composition or products provided herein further comprises one or more of rebaudioside A (Reb A), rebaudioside B (Reb B), rebaudioside D (Reb D), rebaudioside E (Reb E), rebaudioside I (Reb I), and combinations thereof. For example, in some embodiment, any one of the composition or products provided herein further comprises Reb A. In some embodiment, any one of the composition or products provided herein further comprises Reb B. In some embodiment, any one of the composition or products provided herein further comprises Reb D. In some embodiment, any one of the composition or products provided herein further comprises Reb E. In some embodiment, any one of the composition or products provided herein further comprises Reb I. In some embodiment, any one of the composition or products provided herein further comprises Reb A and Reb B. In some embodiment, any one of the composition or products provided herein further comprises Reb A and Reb D. In some embodiment, any one of the composition or products provided herein further comprises Reb A and Reb E. In some embodiment, any one of the composition or products provided herein further comprises Reb A and Reb I. In some embodiment, any one of the composition or products provided herein further comprises Reb A, Reb B, and Reb D. In some embodiment, any one of the composition or products provided herein further comprises Reb A, Reb B, and Reb E. In some embodiment, any one of the composition or products provided herein further comprises Reb A, Reb B, and Reb I. In some embodiment, any one of the composition or products provided herein further comprises Reb B, Reb D, and Reb E. In some embodiment, any one of the composition or products provided herein further comprises Reb B, Reb D, and Reb I. In some embodiment, any one of the composition or products provided herein further comprises Reb D, Reb R, and Reb I. In some embodiment, any one of the composition or products provided herein further comprises Reb A, Reb B, Reb D, and Reb E. In some embodiment, any one of the composition or products provided herein further comprises Reb A, Reb B, Reb D, and Reb I. In some embodiment, any one of the composition or products provided herein further comprises Reb B, Reb D, Reb E and Reb I. In some embodiment, any one of the composition or products provided herein further comprises Reb A, Reb D, Reb E, and Reb I. In some embodiment, any one of the composition or products provided herein further comprises Reb A, Reb B, Reb D, Reb E and Reb I.

In some embodiment, any one of the composition or products provided herein further comprises Reb D, wherein Reb D is present in the composition in an amount that is between 1 ppm and 500 ppm (e.g., 1-500, 50-450, 100-400, 150-350, 200-300 ppm).

In some embodiment, any one of the composition or products provided herein further comprises Reb E, wherein Reb E is present in the composition in an amount that is between 1 ppm and 100 ppm (e.g., 1-100, 10-90, 20-80, 30-70, 40-60, 50-55 ppm).

In some embodiment, any one of the composition or products provided herein further comprises Reb I, wherein Reb I is present in the composition in an amount that is between 1 ppm and 100 ppm (e.g., 1-100, 10-90, 20-80, 30-70, 40-60, 50-55 ppm).

In some embodiment, any one of the composition or products provided herein further comprises Reb B, wherein Reb B is present in the composition in an amount that is between 1 ppm and 200 ppm (1-200, 20-180, 40-160, 60-140, 80-120, 90-110 ppm).

In some embodiment, any one of the composition or products provided herein further comprises Reb A, wherein Reb A is present in the composition in an amount that is between 1 ppm and 200 ppm (1-200, 20-180, 40-160, 60-140, 80-120, 90-110 ppm).

In some embodiment, any one of the composition or products provided herein has a sweetness intensity equivalent to the sweetness intensity of a solution comprising 1% to 15% (e.g., 1-15%, 1-10%, 1-5%, 1-2.5%, 2.5-15%, 2.5-10, 2.5-5%, 5-15%, 5-10%, or 10-15%) (w/v-%) sucrose.

In some embodiment, any one of the composition or products provided herein has a sweetness intensity equivalent to the sweetness intensity of a solution comprising 1% to 5% (e.g., 1-5%, 1-4%, 1-3%, 1-2%, 2-5%, 2-45, 2-3%, 3-5%, 3-5%, or 4-5%) (w/v-%) sucrose.

In some embodiment, any one of the composition or products provided herein further comprises one or more of thaumatin, glycerin, caffeine, taurine, niacin (Vitamin B3), pyridoxine (Vitamin B6), pantothenic acid (Vitamin B5), cobalamin (Vitamin B12), ferulic acid, and combinations thereof.

In some embodiment, any one of the composition or products provided herein that further comprises one or more of thaumatin, glycerin, caffeine, taurine, niacin (Vitamin B3), pyridoxine (Vitamin B6), pantothenic acid (Vitamin B5), cobalamin (Vitamin B12), or ferulic acid, and, optionally, wherein:
(i) thaumatin is present in the composition in an amount that is between 1 ppm and 10 ppm (e.g., 1-10, 2-9, 3-8, 4-7. 5-6 ppm);
(ii) glycerin present in the composition in an amount that is between 500 ppm and 4000 ppm (e.g., 500 and 4000, 500 and 3000, 500 and 2000, 2000 and 4500, 2000 and 3500, or 3000-4000 ppm);
(iii) caffeine is present in the composition in an amount that is between 1 ppm and 800 ppm (e.g., 1-800, 100-700, 200-600, 300-500, 400-450 ppm);
(iv) taurine is present in the composition in an amount that is between 500 ppm and 18000 ppm (e.g., 500 and 8000, 2000 and 7000, 3000 and 6000, 4000 and 5000 ppm);
(v) niacin (Vitamin B3) is present in the composition in an amount that is between 1 ppm and 800 ppm (e.g., 1-800, 100-700, 200-600, 300-500, 400-450 ppm);
(vi) pyridoxine (Vitamin B6) is present in the composition in an amount that is between 1 ppm and 200 ppm (e.g., 1-200, 20-180, 40-160, 60-140, 80-120, 90-110 ppm);
(vii) pantothenic acid (Vitamin B5) is present in the composition in an amount that is between 1 ppm and 200 ppm (e.g., 1-200, 20-180, 40-160, 60-140, 80-120, 90-110 ppm);
(viii) cobalamin (Vitamin B12) is present in the composition in an amount that is between 1 ppm and 100 ppm (e.g., 1-100, 10-90, 20-80, 30-70, 40-60, 50-55 ppm); and/or
(xi) ferulic is present in the composition in an amount that is between 0.5 ppm and 30 ppm (e.g., 0.5-30, 5-25, 10-20, 15-18 ppm).

In some embodiment, any one of the composition or products provided herein further comprises one or more of L-glucose, allulose (D-psicose), erythritol, isomalt, inulin, gum arabic, aspartame, sucralose, acesulfame potassium, tagatose, kojibiose, trehalose, sucrose, lactose, fructose, D-glucose, maltose, galactose, and combinations thereof.

In some embodiment, any one of the composition or products provided herein further comprises one or more of a *stevia* extract, a steviol glycoside, stevioside, rebaudioside C, rebaudioside F, dulcoside A, rubusoside, steviolbioside, high fructose corn syrup, xylose, arabinose, rhamnose, xylitol, mannitol, maltitol, sorbitol, inositol, AceK, aspartame, neotame, saccharine, naringin dihydrochalcone (NarDHC), neohesperidin dihydrochalcone (NDHC), mogroside IV, siamenoside I, mogroside V, monatin, monellin, L-alanine, glycine, Lo Han Guo, hernandulcin, phyllodulcin, trilobtain, phloretin, 3-Hydroxybenzoic Acid, 3,4-Dihydroxybenzoic Acid, 2,4-Dihyroxybenzoaic Acid, eriodictyol-8-C-β-glucoside, homoeriodictyol 4'-O-glucoside, homoeriodictyol 7-O-glucoside, and combinations thereof.

In some embodiment, any one of the composition or products provided herein further comprises one or more additives selected from the group consisting of a carbohydrate, a polyol, an amino acid or salt thereof, a poly-amino acid or salt thereof, a sugar acid or salt thereof, a nucleotide, an organic acid, an inorganic acid, an organic salt, an organic acid salt, an organic base salt, an inorganic salt, a bitter compound, a flavorant, a flavoring ingredient, an astringent compound, a protein, a protein hydrolysate, a surfactant, an emulsifier, a flavonoids, an alcohol, a polymer, and combinations thereof.

In some embodiment, any one of the composition or products provided herein comprises brazzein and Reb M, wherein brazzein is present in the composition in an amount that is between 1 ppm and 30 ppm (e.g., 1-30, 5-25, 10-20, 5-15, or 10-30 ppm) and Reb M is present in the composition in an amount that is between 1 ppm and 1000 ppm (e.g., 1-1000, 100-900, 200-800, 300-700, 400-600, or 500-550 ppm).

In some embodiment, any one of the composition or products provided herein comprises brazzein and Reb M, wherein brazzein is present in the composition in an amount that is between 1 ppm and 30 ppm (e.g., 1-30, 5-25, 10-20, 5-15, or 10-30 ppm) and Reb M is present in the composition in an amount that is between 250 ppm and 600 ppm (e.g., 250-600, 300-550, 350-500, or 400-450 ppm).

In some embodiment, in any one of the composition or products provided herein that comprises brazzein and Reb M, brazzein is present in the composition in an amount that is between 4 ppm and 20 ppm (e.g., 4-20, 6-18, 8-16, 10-14, or 12-13 ppm) and Reb M is present in the composition in an amount that is between 380 ppm and 450 ppm (e.g., 380-450, 390-440, 400-430, or 410-420 ppm).

In some embodiment, in any one of the composition or products provided herein that comprises brazzein and Reb M, brazzein is present in the composition in an amount that is between 4 ppm and 20 ppm (e.g., 4-20, 6-18, 8-16, 10-14, or 12-13 ppm) and Reb M is present in the composition in an amount that is between 480 ppm and 550 ppm (e.g., 480-550, 490-540, 500-530, or 510-520 ppm).

In some embodiment, in any one of the composition or products provided herein that comprises brazzein and Reb M, brazzein is present in the composition in an amount that is between 4 ppm and 20 ppm (e.g., 4-20, 6-18, 8-16, 10-14, or 12-13 ppm) and Reb M is present in the composition in an amount that is between 440 ppm and 540 ppm (e.g., 440-540, 450-530, 460-520, 470-510, 480-500, or 485-490 ppm).

In some embodiment, in any one of the composition or products provided herein that 5 comprises brazzein and Reb M, brazzein is present in the composition in an amount that is between 5 ppm and 25 ppm (e.g., 5-25, 10-20, or 13-18 ppm) and Reb M is present in the composition in an amount that is between 280 ppm and 380 ppm (e.g., 280-380, 300-360, or 320-340 ppm).

In some embodiment, in any one of the composition or products provided herein that comprise brazzein and Reb M, brazzein is present in the composition in an amount that is between 7 ppm and 14 ppm (e.g., 7-14, 6-13, 5-12, 6-11, 7-10, or 8-9 ppm) and Reb M is present in the composition in an amount that is between 400 ppm and 450 ppm (e.g., 400-450, 410-440, or 420-430 ppm).

In some embodiment, in any one of the composition or products provided herein comprises brazzein and Reb M, brazzein is present in the composition in an amount that is between 7 ppm and 14 ppm (e.g., 7-14, 6-13, 5-12, 6-11, 7-10, or 8-9 ppm) and Reb M is present in the composition in an amount that is between 500 ppm and 550 ppm (e.g., 500-550, 510-540, or 520-530 ppm).

In some embodiment, in any one of the composition or products provided herein that comprises brazzein and Reb M, brazzein is present in the composition in an amount that is about 7 ppm and Reb M is present in the composition in an amount that is about 493 ppm.

In some embodiment, in any one of the composition or products provided herein that comprises brazzein and Reb M, brazzein is present in the composition in an amount that is about 25 ppm and Reb M is present in the composition in an amount that is about 320 ppm.

In some embodiment, in any one of the composition or products provided herein that comprises brazzein and Reb M, the composition has a sweetness intensity greater than the sweetness intensity of a solution without brazzein.

In some embodiment, any one of the composition or products provided herein comprises brazzein Reb M, and Reb D, wherein brazzein is present in the composition in an amount that is between 1 ppm and 50 ppm (e.g., 1-50, 5-45, 10-40, 15-35, or 20-30 ppm), Reb M is present in the composition in an amount that is between 200 ppm and 500 ppm (e.g., 200-500, 250-450, 300-400, or 325-375 ppm), and Reb D is present in the composition in an amount that is between 20 ppm and 200 ppm (e.g., 20-200, 40-180, 60-160, 80-140, or 100-120 ppm).

In some embodiment, in any one of the composition or products provided herein that comprises brazzein Reb M, and Reb D, brazzein is present in the composition in an amount that is between 3 ppm and 30 ppm (e.g., 3-30, 5-25, 10-20, or 13-18 ppm), Reb M is present in the composition in an amount that is between 300 ppm and 400 ppm (e.g., 300-400, 320-380, or 340-360 ppm), and Reb D is present in the composition in an amount that is between 60 ppm and 140 ppm (e.g., 60-140, 80-120, or 90-110 ppm).

In some embodiment, in any one of the composition or products provided herein that comprises brazzein Reb M, and Reb D, brazzein is present in the composition in an amount that is between 4 ppm and 20 ppm (e.g., 4-20, 6-18, 8-16, 10-14, or 12-13 ppm), Reb M is present in the composition in an amount that is between 300 ppm and 400 ppm (e.g., 300-400, 320-380, or 340-360 ppm), and Reb D is present in the composition in an amount that is between 50 ppm and 150 ppm (e.g., 50-150, 60-140, 70-130, 80-120, 90-110, or 95-105 ppm).

In some embodiment, any one of the composition or products provided herein comprises brazzein Reb M, and Reb D and has a sweetness intensity equivalent to the sweetness intensity of a solution comprising about 200 ppm sucralose.

In some embodiment, any one of the composition or products provided herein comprises brazzein, Reb M, Reb D, Reb E, and Reb I, wherein brazzein is present in the composition in an amount that is between 1 ppm and 40 ppm (e.g., 1-40, 10-30, or 20-25 ppm), Reb M is present in the composition in an amount that is between 1 ppm to 500 ppm, Reb D is present in the composition in an amount that is between 1 ppm and 350 ppm (e.g., 1-350, 50-300, 100-250, or 150-200 ppm), Reb E is present in the composition in an amount that is between 1 ppm and 100 ppm (e.g., 1-100, 10-90, 20-80, 30-70, 40-60, or 50-55 ppm), and Reb I is present in the composition in an amount that is between 1 ppm and 100 ppm (e.g., 1-100, 10-90, 20-80, 30-70, 40-60, or 50-55 ppm).

In some embodiment, in any one of the composition or products provided herein that comprises brazzein, Reb M, Reb D, Reb E, and Reb I, brazzein is present in the composition in an amount that is between 1 ppm and 20 ppm (e.g., 1-20, 5-15, 8-13, or 10-18 ppm), Reb D is present in the composition in an amount that is between 1 ppm to 10 ppm (e.g., 1-10, 2-9, 3-8, 4-7, or 5-6 ppm), Reb E is present in the composition in an amount that is between 1 ppm and 20 ppm (e.g., 1-20, 5-15, 8-13, or 10-18 ppm), Reb M is present in the composition in an amount that is between 1 ppm and 14 ppm (e.g., 1-14, 2-13, 3-12, 4-11, 5-10, 6-9, or 7-8 ppm), and Reb I is present in the composition in an amount that is between 1 ppm and 7 ppm (e.g., 1-7, 2-6, 3-6, or 4-5 ppm).

In some embodiment, in any one of the composition or products provided herein that comprises brazzein, Reb M, Reb D, Reb E, and Reb I, brazzein is present in the composition in an amount that is between 4 ppm and 30 ppm (e.g., 4-30, 5-25, 10-20, or 15-25 ppm), Reb M is present in the composition in an amount that is between 300 ppm to 400 ppm (e.g., 300-400, 320-380, or 340-360 ppm), Reb D is present in the composition in an amount that is between 30 ppm and 80 ppm (e.g., 30-80, 40-70, or 50-60 ppm), Reb E is present in the composition in an amount that is between 20 ppm and 80 ppm (e.g., 20-80, 30-70, 40-50, or 50-55 ppm), and Reb I is present in the composition in an amount that is between 30 ppm and 80 ppm (e.g., 30-80, 40-70, or 50-60 ppm), optionally wherein the composition further comprises thaumatin at 1-5 ppm (e.g., 1-5, 2-4, or 3-5 ppm).

In some embodiment, in any one of the composition or products provided herein that comprises brazzein, Reb M, Reb D, Reb E, and Reb I, brazzein is present in the composition in an amount that is between 4 ppm and 20 ppm (e.g., 4-20, 6-18, 8-16, 10-14, or 12-13 ppm), Reb M is present in the composition in an amount that is between 250 ppm to 450 ppm (e.g., 250-450, 300-400, or 325-375 ppm), Reb D is present in the composition in an amount that is between 30 ppm and 80 ppm (e.g., 30-80, 40-70, or 50-60 ppm), Reb E is present in the composition in an amount that is between 20 ppm and 80 ppm (e.g., 20-80, 30-70, 40-50, or 50-55 ppm), and Reb I is present in the composition in an amount that is between 30 ppm and 80 ppm (e.g., 30-80, 40-70, or 50-60 ppm).

In some embodiment, in any one of the composition or products provided herein that comprises brazzein, Reb M, Reb D, Reb E, and Reb I, brazzein is present in the composition in an amount that is between 4 ppm and 30 ppm (e.g., 4-30, 10-25, or 15-20 ppm), Reb M is present in the composition in an amount that is between 250 ppm to 500 ppm (e.g., 250-500, 300-450, 350-400, or 375-425 ppm), Reb D is present in the composition in an amount that is between 25 ppm and 150 ppm (e.g., 25-150, 50-100, or 75-125 ppm), Reb E is present in the composition in an amount that is between 25 ppm and 75 ppm (e.g., 25-75, 30-70, 40-60, or 50-55 ppm), and Reb I is present in the composition in an amount that is between 25 ppm and 75 ppm; optionally wherein the composition further comprises glycerin at 500 ppm and 4000 ppm (e.g., 500-4000, 1000-3500, 1500-3000, or 2000-2500 ppm); further optionally wherein the composition has a sweetness intensity level equivalent to sweetness intensity of a solution comprising 1-3% (e.g., 1-3, 1-2, or 2-3%) w/w of sucrose.

In some embodiment, in any one of the composition or products provided herein that comprises brazzein, Reb M, Reb D, Reb E, and Reb I, brazzein is present in the composition in an amount that is between 3 ppm and 30 ppm (e.g., 3-30, 5-25, 10-20, or 15-25 ppm), Reb M is present in the composition in an amount that is between 100 ppm to 400 ppm (e.g., 100-400, 150-350, 200-300, or 225-275 ppm), Reb D is present in the composition in an amount that is between 50 ppm and 300 ppm (e.g., 50-300, 100-250, or 150-200 ppm), Reb E is present in the composition in an amount that is between 20 ppm and 70 ppm (e.g., 20-70, 30-60, or 40-50 ppm), and Reb I is present in the composition in an amount that is between 20 ppm and 60 ppm (e.g., 20-60, 30-50, or 40-45 ppm); optionally wherein the composition further comprises malic acid at 0.1-0.4% (e.g., 0.1-0.4, 0.1-0.3, 0.1-0.2, 0.2-0.4, 0.2-0.3, or 0.3-0.4%) w/w; further optionally wherein the composition has a sweetness intensity level equivalent to sweetness intensity of a solution comprising 1-3% (e.g., 1-3, 1-2, or 2-3%) w/w of sucrose.

In some embodiment, any one of the composition or products provided herein that comprises brazzein, Reb M, Reb D, Reb E, and Reb I and has a sweetness intensity equivalent to the sweetness intensity of a solution comprising 1% to 5% (1-5, 2-4, or 3-3.5%) (w/v-%) sucrose.

In some embodiment, any one of the composition or products provided herein that comprises brazzein, Reb M, Reb D, Reb E, and Reb I and has a sweetness intensity equivalent to the sweetness intensity of a solution comprising 1% to 15% (1-15%, 1-10%, 1-5%, 1-2.5%, 2.5-15%, 2.5-10, 2.5-5%, 5-15%, 5-10%, or 10-15%) (w/v-%) sucrose.

In some embodiment, any one of the composition or products provided herein comprises brazzein, Reb M, Reb D, Reb E, Reb I, and Reb B, wherein brazzein is present in the composition in an amount that is between 4 ppm and 20 ppm (e.g., 4-20, 6-18, 8-16, 10-14, or 12-13 ppm), Reb M is present in the composition in an amount that is between 2 ppm to 400 ppm (e.g., 2-400, 50-350, 100-300, 150-250, or 200-275 ppm), Reb D is present in the composition in an amount that is between 5 ppm and 50 ppm (e.g., 5-50, 10-40, 15-30, or 20-25 ppm), Reb E is present in the composition in an amount that is between 5 ppm and 50 ppm (e.g., 5-50, 10-40, 15-30, or 20-25 ppm), Reb I is present in the composition in an amount that is between 5 ppm and 50 ppm (e.g., 5-50, 10-40, 15-30, or 20-25 ppm), and Reb B is present in the composition in an amount that is between 5 ppm and 100 ppm (e.g., 5-100, 10-90, 20-80, 30-70, 40-50, or 50-55 ppm).

In some embodiment, any one of the composition or products provided herein that comprises brazzein, Reb M, Reb D, Reb E, Reb I, and Reb B, further comprises one or more of caffeine, taurine, niacin (Vitamin B3), pyridoxine (Vitamin B6), pantothenic acid (Vitamin B5), cobalamin (Vitamin B12), or combination thereof, optionally wherein caffeine is present in the composition in an amount that is between 100 ppm-600 ppm (e.g., 100-600, 200-500, or 300-400 ppm), taurine is present in the composition in an amount that is between 500 ppm-12000 ppm (e.g., 500-12000, 1000-10000, 2000-9000, 3000-8000, 4000-7000, or 5000-6000 ppm), niacin (Vitamin B3) is present in the composition in an amount that is between 5-680 ppm (e.g., 5-680, 50-650, 100-600, 150-550, 200-500, 250-450, or 300-400 ppm), pyridoxine (Vitamin B6) is present in the composition in an amount that is between 5-180 ppm (e.g., 5-180, 10-150, or 50-100 ppm), pantothenic acid (Vitamin B5) is present in the composition in an amount that is between 5-120 ppm (e.g., 5-120, 10-100, 20-80, 30-60, or 40-50 ppm), cobalamin (Vitamin B12) is present in the composition in an amount that is between 5-80 ppm (e.g., 5-80, 10-70, 20-60, 30-50, 40-45 ppm).

In some embodiment, any one of the composition or products provided herein comprises brazzein, Reb M, Reb D, Reb E, Reb I, Reb B, and Reb A, wherein brazzein is present in the composition in an amount that is between 1 ppm and 50 ppm (e.g., 1-5-ppm, 5-50, 10-40, 15-30, or 20-25 ppm), Reb M is present in the composition in an amount that is between 50 ppm to 400 ppm (e.g., 50-400, 100-350, 150-300, or 200-250 ppm), Reb D is present in the composition in an amount that is between 1 ppm and 350 ppm (e.g., 1-350, 50-300, 100-250, or 150-200 ppm), Reb E is present in the composition in an amount that is between 5 ppm and 100 ppm (e.g., 5-100, 10-90, 20-80, 30-70, 40-60, or 45-50 ppm), Reb I is present in the composition in an amount that is between 5 ppm and 100 ppm (e.g., 5-100, 10-90, 20-80, 30-70, 40-60, or 45-50 ppm), Reb A is present in the composition in an amount that is between 1 ppm and 100 ppm (e.g., 1-100, 5-100, 10-90, 20-80, 30-70, 40-60, or 45-50 ppm), Reb B is present in the composition in an amount that is between 1 ppm and 100 ppm (e.g., 1-100, 5-100, 10-90, 20-80, 30-70, 40-60, or 45-50 ppm).

In some embodiment, in any one of the composition or products provided herein that comprises brazzein, Reb M, Reb D, Reb E, Reb I, Reb B, and Reb A, brazzein is present in the composition in an amount that is between 3 ppm and 30 ppm (e.g., 3-30, 5-25, 10-20, or 13-18 ppm), Reb M is present in the composition in an amount that is between 300 ppm to 400 ppm (e.g., 300-400, 320-380, or 340-360 ppm), Reb D is present in the composition in an amount that is between 60 ppm and 140 ppm (e.g., 60-140, 70-130, 80-120, 90-110, or 100-120 ppm), Reb E is present in the composition in an amount that is between 30 ppm and 70 ppm (e.g., 30-70, 40-60 or 50-55 ppm), Reb I is present in the composition in an amount that is between 30 ppm and 70 ppm (e.g., 30-70, 40-60 or 50-55 ppm), Reb A is present in the composition in an amount that is between 1 ppm and 10 ppm (e.g., 1-10, 2-9, 3-8, 4-7, or 5-6 ppm), Reb B is present in the composition in an amount that is between 30 ppm and 70 ppm (e.g., 30-70, 40-60, or 50-55 ppm).

In some embodiment, in any one of the composition or products provided herein that comprises brazzein, Reb M, Reb D, Reb E, Reb I, Reb B, and Reb A, brazzein is present in the composition in an amount that is between 7 ppm and 40 ppm (e.g., 7-40, 10-35, 15-30, or 20-25 ppm), Reb M is present in the composition in an amount that is between 220 ppm to 300 ppm (e.g., 220-300, 240-280, or 250-260 ppm), Reb D is present in the composition in an amount that is between 2 ppm and 40 ppm (e.g., 2-40, 5-35, 10-30, 15-25, or 20-30 ppm), Reb E is present in the composition in an amount that is between 5 ppm and 50 ppm (e.g., 5-50, 10-45, 15-40, 20-35, or 25-30 ppm), Reb I is present in the composition in an amount that is between 5 ppm and 50 ppm (e.g., 5-50, 10-45, 15-40, 20-35, or 25-30 ppm), Reb A is present in the composition in an amount that is between 5 ppm and 100 ppm (e.g., 5-100, 10-90, 20-80, 30-70, 40-60, or 50-55 ppm), Reb B is present in the composition in an amount that is between 5 ppm and 100 ppm (e.g., 5-100, 10-90, 20-80, 30-70, 40-60, or 50-55 ppm).

In some embodiment, in any one of the composition or products provided herein that comprises brazzein, Reb M, Reb D, Reb E, Reb I, Reb B, and Reb A, brazzein is present in the composition in an amount that is between 7 ppm and 40 ppm (e.g., 7-40, 10-35, 15-30, or 20-25 ppm), Reb M is present in the composition in an amount that is between 220 ppm to 300 ppm (e.g., 220-300, 240-280, or 250-260 ppm), Reb D is present in the composition in an amount that is between 5 ppm and 300 ppm (e.g., 5-300, 50-250, 100-200, or 150-250 ppm), Reb E is present in the composition in an amount that is between 5 ppm and 80 ppm (e.g., 5-80, 10-70, 20-60, 30-50, or 40-45 ppm), Reb I is present in the composition in an amount that is between 15 ppm and 50 ppm (e.g., 15-50, 20-45, 25-40, or 30-35 ppm), Reb A is present in the composition in an amount that is between 5 ppm and 100 ppm (e.g., 5-100, 10-90, 20-80, 30-70, 40-60, or 50-55 ppm), Reb B is present in the composition in an amount that is between 5 ppm and 100 ppm (e.g., 5-100, 10-90, 20-80, 30-70, 40-60, or 50-55 ppm).

In some embodiment, in any one of the composition or products provided herein that comprises brazzein, Reb M, Reb D, Reb E, Reb I, Reb B, and Reb A, brazzein is present in the composition in an amount that is between 1 ppm and 40 ppm (e.g., 1-40, 5-35, 10-30, 15-25, or 20-30 ppm), Reb M is present in the composition in an amount that is between 50 ppm to 400 ppm (e.g., 50-400, 100-350, 150-300, 200-250 ppm), Reb D is present in the composition in an amount that is between 50 ppm and 300 ppm (e.g., 50-300, 100-250, or 150-200 ppm), Reb E is present in the composition in an amount that is between 5 ppm and 50 ppm (e.g., 5-50, 10-45, 15-40, 20-35, or 25-30 ppm), Reb I is present in the composition in an amount that is between 5 ppm and 50 ppm (e.g., 5-50, 10-45, 15-40, 20-35, or 25-30 ppm), Reb A is present in the composition in an amount that is between 5 ppm and 100 ppm (e.g., 5-100, 10-90, 20-80, 30-70, 40-60, or 50-55 ppm), Reb B is present in the composition in an amount that is between 5 ppm and 100 ppm (e.g., 5-100, 10-90, 20-80, 30-70, 40-60, or 50-55 ppm), optionally wherein the composition further comprises malic acid at 0.05-0.35% (e.g., 0.05-0.35, 0.1-0.3, 0.2 or 0.25%) (w/w) or citric acid a 0.05-0.4% (e.g., 0.05-0.4, 0.1-0.3, or 0.2-0.25%) (w/w), further optionally wherein the composition further comprises apple juice at 10-50% (e.g., 10-50, 20-40, or 30-35%) (v/v).

In some embodiment, any one of the composition or products provided herein that comprises brazzein, Reb M, Reb D, Reb E, Reb I, Reb B, and Reb A has a sweetness intensity greater than the sweetness intensity of a solution without brazzein.

Some aspects of the present disclosure, relate to, a consumable comprising the composition or the present disclosure. Some aspects of the present disclosure, relate to, an oral composition comprising the composition of the present disclosure. Some aspects of the present disclosure, relate to, a pharmaceutical composition comprising the composition of the present disclosure. Some aspects of the present disclosure, relate to, a beverage comprising the composition of the present disclosure. Some aspects of the present disclosure, relate to, a food composition comprising the composition of the present disclosure. Some aspects of the present disclosure, relate to, an animal feed product comprising the composition of the present disclosure. Some aspects of the present disclosure, relate to, a liquid comprising the composition of the present disclosure. Some aspects of the present disclosure, relate to, oral hygiene products (e.g., toothpaste or mouthwash) comprising the composition of the present disclosure.

In some embodiments, the liquid further comprises a solvent. In some embodiments, the solvent is a liquid, food grade and/or organic solvent. In some embodiments, the solvent comprises ethyl alcohol, propylene glycol, glycerin, ferulic acid, or water and/or combinations thereof. In some embodiments, the solvent is propylene glycol or ferulic acid.

In some embodiments, the powder comprising the composition of the present disclosure. In some embodiments, the powder further comprises dextrin and/or maltodextrin.

Some aspects of the present disclosure, relate to, a tabletop sweetener comprising the composition of the present disclosure.

In some embodiments, in any one of the compositions, consumables, oral compositions, pharmaceutical compositions, beverages, food compositions, animal feed products, liquids or powders, oral hygiene products (e.g., toothpaste or mouthwash) of the present disclosure, at least one of Reb M, and brazzein is made by a genetically modified microorganism, optionally wherein the genetically modified microorganism comprises one or more proteins having UDP-glycosyltransferase (UGT) and/or sucrose synthase (SUS) activity.

Some aspects of the present disclosure, relate to, a method for creating or enhancing the sweetness of a consumable, oral composition, pharmaceutical composition, beverage, food composition, animal feed product, liquid or powder, the method comprising adding an amount of any one of the compositions provided herein to produce the desired degree of sweetness for the consumable, oral composition, pharmaceutical composition, beverage, food composition, animal feed product, liquid or powder.

In some embodiments, the food composition is selected from cocoa, an umami and/or savoury food, and tomato ketchup. In some embodiments, the umami and/or savoury food is a sauce or snack.

In some embodiments, the beverage further comprises an alcoholic beverage, citric acid, malic acid, fruit juice, fruit juice flavored drink, apple juice, carbonated apple juice, flavored water, enhanced water, acidified water, soft drink cola, lemonade or lemon and lime. In some embodiments, the beverage further comprises alcohol.

Other features and advantages of the present disclosure will become apparent in the following detailed description of preferred embodiments of the disclosure.

BRIEF DESCRIPTION OF THE DRAWINGS

FIGS. 3A-3B show ingredients of a cola formulation comprising Reb M (95%) and brazzein (FIG. 3A) and Reb M (95%) (FIG. 3B).

FIGS. 4A-4B show ingredients of a cola formulation comprising Reb M, Reb D, Reb E, Reb I and brazzein (FIG. 4A) and Reb M, Reb D, Reb E, and Reb I (FIG. 4B).

FIGS. 5A-5B show ingredients of a tomato ketchup formulation comprising Reb M, Reb D, Reb E, Reb I and a composition containing Lactic Acid at 5-50 ppm, Brazzein at 3-20 ppm, Thaumatin at 2-20 ppm, and Vanallin at 1-20 ppm (FIG. 5A) and Reb M, Reb D, Reb E, and Reb I (FIG. 5B).

Figure 6:
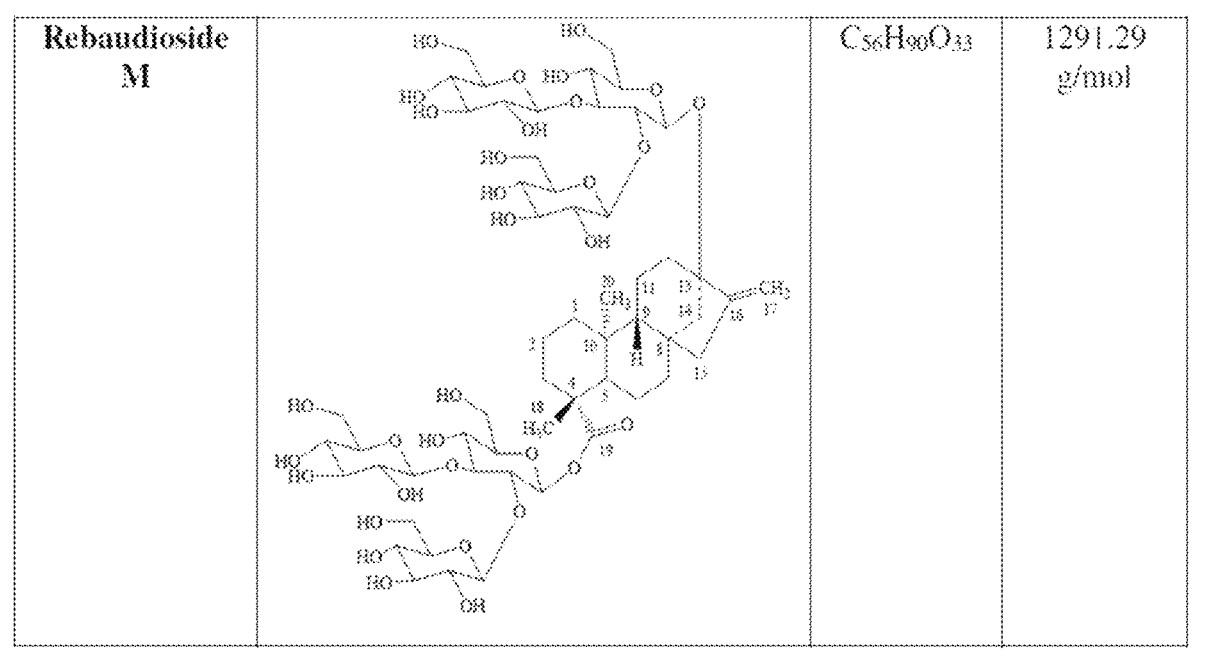

FIG. 6 shows the structure of a steviol glycoside Rebaudioside M.

DETAILED DESCRIPTION

Figure 1:
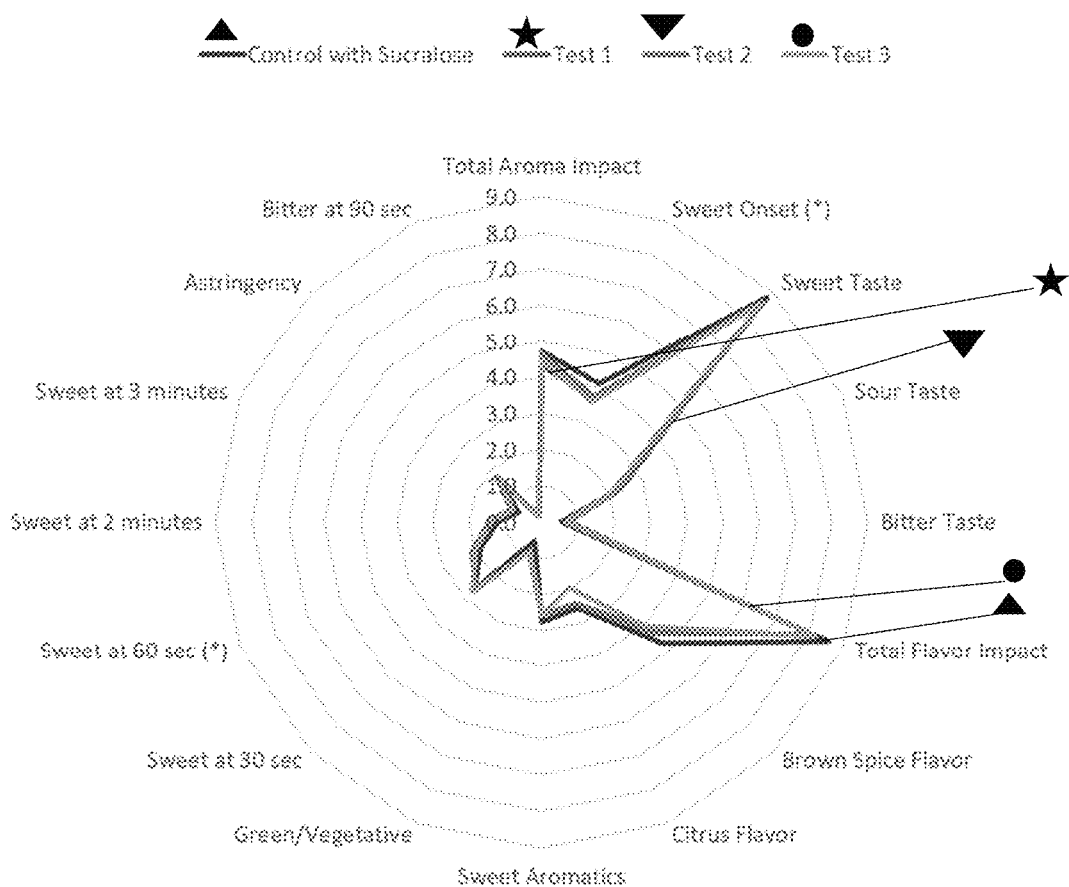
FIG. 1 shows a line diagram of how different combinations (Reb D, Reb M and Brazzein or Reb M, Reb D, Reb E, Reb I and Brazzein or Reb M and Brazzein) compared to control sucralose across different sensory and taste factors.

It is to be understood that this disclosure is not limited to particularly exemplified materials or process parameters as such may, of course, vary. It is also to be understood that the terminology used herein is for the purpose of describing particular embodiments of the disclosure only, and is not intended to be limiting of the use of alternative terminology to describe the present disclosure.

All publications, patents and patent applications cited herein, whether supra or infra, are hereby incorporated by reference in their entirety for all purposes.

As used herein, the term "comprise" or variations thereof such as "comprises" or "comprising" are to be read to indicate the inclusion of any recited integer (e.g. a feature, element, characteristic, property, method/process step or limitation) or group of integers (e.g. features, elements, characteristics, properties, method/process steps or limitations) but not the exclusion of any other integer or group of integers. Thus, as used herein, the term "comprising" is inclusive and does not exclude additional, unrecited integers or method/process steps.

In embodiments of any one of the compositions and methods provided herein, "comprising" may be replaced with "consisting essentially of" or "consisting of". The phrase "consisting essentially of" is used herein to require the specified integer(s) or steps as well as those which do not materially affect the character or function of the claimed invention. As used herein, the term "consisting" is used to indicate the presence of the recited integer (e.g. a feature, element, characteristic, property, method/process step or limitation) or group of integers (e.g. features, elements, characteristics, properties, method/process steps or limitations) alone.

Definitions

Unless defined otherwise, all technical and scientific terms used herein have the same meaning as commonly understood by one of ordinary skill in the art to which the disclosure belongs. Although any methods and materials similar to or equivalent to those described herein may be used in the practice or testing of the present disclosure, the preferred materials and methods are described below.

As used herein, "synthetic" or "organically synthesized" or "chemically synthesized" or "organically synthesizing" or "chemically synthesizing" or "organic synthesis" or "chemical synthesis" are used to refer to preparing the compounds through a series of chemical reactions; this does not include extracting the compound, for example, from a natural source.

The term "orally consumable product" as used herein refers to any beverage, food product, dietary supplement, nutraceutical, pharmaceutical composition, dental hygienic composition and cosmetic product which are contacted with the mouth of man or animal, including substances that are taken into and subsequently ejected from the mouth and substances which are drunk, eaten, swallowed, or otherwise ingested; and that are considered safe for human or animal consumption when used in a generally acceptable range of concentrations.

The term "food product" or "food composition" as used herein includes fruits, vegetables, juices, meat products such as ham, bacon and sausage; egg products, fruit concentrates, gelatins and gelatin-like products such as jams, jellies, preserves, and the like; milk products such as ice cream, sour cream, yogurt, and sherbet; icings, syrups including molasses; corn, wheat, rye, soybean, oat, rice and barley products, cereal products, nut meats and nut products, cakes, cookies, confectionaries such as candies, gums, fruit flavored drops, and chocolates, chewing gum, mints, creams, icing, ice cream, pies and breads. "Food product" also refers to condiments such as herbs, spices and seasonings, flavor enhancers, such as monosodium glutamate. "Food product" further also includes prepared packaged products, such as dietetic sweeteners, liquid sweeteners, tabletop flavorings, granulated flavor mixes which upon reconstitution with water provide non-carbonated drinks, instant pudding mixes, instant coffee and tea, coffee whiteners, malted milk mixes, pet foods, livestock feed, tobacco, and materials for baking applications, such as powdered baking mixes for the preparation of breads, cookies, cakes, pancakes, donuts and the like. "Food product" also includes diet or low-calorie food and beverages containing little or no sucrose.

As used herein, the term "sweetness intensity" refers to the relative strength of sweet sensation as can be observed or experienced by an individual, e.g., a human, or a degree or amount of sweetness detected by a taster, for example on a Brix scale.

As used herein, the term "enhancing the sweetness" refers to the effect of a sweetener in increasing, augmenting, intensifying, accentuating, magnifying, and/or potentiating the sensory perception of one or more sweetness characteristics of an orally consumable product as provided herein as compared to a corresponding orally consumable product that does not contain the sweetener.

As used herein, the term "off-taste(s)" refers to an amount or degree of taste that is not characteristically, desirable, or usually found or expected in an orally consumable product. For example, an off-taste is an undesirable taste of a sweetened consumable, such as, a bitter taste, a licorice-like taste, a metallic taste, an aversive taste, an astringent taste, a delayed sweetness onset, a lingering sweet aftertaste, and the like, etc.

As used herein, the term "wt. %" refers to the weight % of a compound (e.g., a Rebaudioside, brazzein protein, or ferulic acid) relative to the total weight of all compounds in a composition.

As used herein, the term "ppm" refers to part(s) per million by weight, for example, the weight of a compound, such as a Rebaudioside, brazzein protein, or ferulic acid (in milligrams) per kilogram, of a composition, such as an orally consumable product, containing such compound (i.e., mg/kg) or the weight of a compound, such as a rebaudioside, brazzein protein, or ferulic acid (in milligrams) per liter, of a composition, such as an orally consumable product, containing such compound (i.e., mg/L); or by volume, for example the volume of a compound, such as a Rebaudioside, brazzein protein, or ferulic acid (in milliliters) per liter, of a composition, such as an orally consumable product containing such compound (i.e., mL/L).

As used herein, the term "carbohydrate sweetener" includes caloric sweeteners, such as, sucrose, fructose, glucose, high fructose corn syrup (containing fructose and glucose), xylose, arabinose, rhamnose, and sugar alcohols, such as erythritol, xylitol, mannitol, sorbitol, and inositol.

As used herein, the term "flavoring" or the like refers to any food-grade material that may be added to or present in an orally consumable product to provide a desired flavor.

The term "isolated" is used according to its ordinary and customary meaning as understood by a person of ordinary skill in the art, and when used in the context of an isolated nucleic acid or an isolated polypeptide, is used without limitation to refer to a nucleic acid or polypeptide that, by the hand of man, exists apart from its native environment and is therefore not a product of nature. An isolated nucleic acid or polypeptide can exist in a purified form or can exist in a non-native environment such as, for example, in a transgenic host cell.

The terms "recombinant," "heterologous," and "exogenous," when used herein in connection with polynucleotides, are used according to their ordinary and customary meanings as understood by a person of ordinary skill in the art, and are used without limitation to refer to a polynucleotide (e.g., a DNA sequence or a gene) that originates from a source foreign to the particular host cell or, if from the same source, is modified from its original form. Thus, a heterologous gene in a host cell includes a gene that is endogenous to the particular host cell but has been modified through, for example, the use of site-directed mutagenesis or other recombinant techniques. The terms also include non-naturally occurring multiple copies of a naturally occurring DNA sequence. Thus, the terms refer to a DNA segment that is foreign or heterologous to the cell, or homologous to the cell but in a position or form within the host cell in which the element is not ordinarily found.

Similarly, the terms "recombinant," "heterologous," and "exogenous," when used herein in connection with a polypeptide or amino acid sequence, means a polypeptide or amino acid sequence that originates from a source foreign to the particular host cell or, if from the same source, is modified from its original form. Thus, recombinant DNA segments can be expressed in a host cell to produce a recombinant polypeptide.

As used herein, the singular form "a", "an", and "the" includes plural references unless indicated otherwise.

Reference to "about" a value or parameter herein refers to the usual error range (e.g., no more than +10%) for the respective value readily known to the skilled person in this technical field. Reference to "about" for a value or parameter herein includes (and describes) aspects that are directed to that value or parameter per se. For example, description referring to "about X" includes description of "X." In an embodiment of any one of the compositions or methods provided herein, any amount can recited herein can refer to the amount alone and without "about".

Compositions

Many studies have focused on the connection of sugar consumption with obesity and other pathologies such as diabetes. Consumers and food companies alike are interested in calorie reduction through the use of sugar alternatives. There is also significant interest in the reduction of calories for companion animals or the use of sweeteners to make certain feed products more palatable.

Non-caloric natural and synthetic high-potency sweeteners are known, but they often possess flavor profiles that are not as desirable to consumers as natural caloric sweeteners. Thus, it is desirable to develop improved non-caloric sweeteners that can be substituted for sugar and that have a more desirable taste profile. The species *Stevia rebaudiana* ("*Stevia*") is the source of certain naturally occurring sweet steviol glycosides. Considerable research and development has focused on the use of sweet steviol glycosides of *Stevia* as non-caloric sweeteners, but each of the various steviol glycosides have their limitations in terms of taste, solubility or off-flavor. Steviol glycoside (e.g., rebaudiosides) compositions with beneficial properties (such as improved solubility, flavor (e.g., masked bitterness), caloric profile, etc.) have been discovered.

In some embodiments, steviol glycoside (e.g., rebaudiosides) compositions can provide the "full" sweetness needed for many food and beverage applications. This typically is difficult to achieve with a single rebaudioside given the off-flavors which may attend to many rebaudiosides, such as for example Reb A, due to its perceptible bitterness at concentrations above about 200 ppm. In some embodiments, steviol glycoside (e.g., rebaudiosides) compositions can provide high intensity sweeteners that may be added to the food product, beverage, or other consumables, such an oral or pharmaceutical composition.

While in general the compositions (e.g., formulations) provided herein can be used for lower or non-caloric purposes, there may be instances where when used with other compounds such as protein or protein sweetener the result may be an increase in the calorific value per unit sweetness of a composition as provided herein. In some embodiments, as provided herein, a protein sweetener that may be used in a steviol glycoside (e.g., rebaudioside) composition is brazzein.

In addition, a number of findings from the combination of brazzein with rebaudiosides has been surprisingly discovered. The findings include:

1. Added brazzein can mitigate the sweet lingering from *Stevia* in a beverage matrix when compared to an equal level of *Stevia* without brazzein in the same beverage matrix.
2. Added brazzein to a beverage matrix can mask the taste of functional ingredients such as caffeine, B-Vitamins and taurine.
3. Added brazzein to alcoholic beverages, such as hard seltzers, cocktails, and liqueurs, can help to mask the 'burn' and/or bitterness of alcohol while also boosting characterizing flavor in the beverage.
4. Added brazzein to beverages containing malic acid can work synergistically such that the late onset of malic acid can mask undesired long-lasting brazzein sweetness and also bring back characteristic flavour profile.
5. Brazzein when paired with rebaudiosides can reach a higher total sweet intensity compared to what another sweetener, such as *Stevia*, sucrose or sucralose, is capable of on its own. Adding more *Stevia* to a beverage does little to increase the total sweet intensity of the product and just adds more negative taste attributes. By adding brazzein a higher level of sweetness that would not otherwise be possible can be achieved. This has been found in colas, carbonated apple juice drinks and in lemon and/or lime beverages (e.g., sparkling lemonade). An example of this is brazzein combined with Reb M in a cola matrix as compared to what *Stevia* is capable on its own. Another example of this is brazzein combined with Reb M and Reb D in a cola matrix, which can have a sweetening character that is more similar to Sucralose. A further example is brazzein combined with Reb M, Reb D, Reb E, Reb I, Reb A, and Reb B in a cola matrix, which can have a higher total sweet intensity compared to what Sucralose is capable of on its own. Yet another example of this is brazzein with Reb D, Reb E and Reb M, which can closely replicate the quality of sweetness that is as good or better than sucrose. It can replace the sweetness of sucrose and boost the perception of the inherent characterizing flavors of the product at a level equal or higher than sucrose. It can do this without any increase in flavor notes that are not desirable, such as bitterness, earthy notes, or lingering sweetness.

6. Brazzein's delayed sweetness when paired with Reb D and Reb M in cocoa products can boost the perception of chocolate flavor while reducing the perception of bitterness that can overwhelm the taste of chocolate. The mitigation of bitterness can result in the increase of sweet perception that cannot be achieved with other sweeteners. Brazzein can also mitigate inherent astringency from cocoa products. As another example, brazzein when paired with Reb B, Reb M, Reb D, Reb E, and Reb I, the temporal sweetness can very closely match the temporal sweetness of a full sugar chocolate.

7. Addition of brazzein can improve the organoleptic properties of savoury food products. For example, the addition of brazzein to Reb M, Reb D, Reb E, Reb I and glycerin was found to improve the aforementioned properties. Brazzein can enhance the existing umami and savoury taste in sauces and snacks. Brazzein can not only replace or intensify sweetness, such as of sucrose, but can also boost the perception of the inherent characterizing flavors of the product at a level equal to or higher than sucrose. It can do this without any increase in flavor notes that are not desirable, such as bitterness, earthy notes, or lingering sweetness.

Accordingly, in some aspects, the present disclosure provides compositions (e.g., formulations) comprising rebaudioside M (Reb M) and brazzein. The amount of Reb M and brazzein in such a composition may vary. In some embodiments, a composition comprises Reb M and brazzein according to weight, e.g., on an anhydrous weight/weight basis (wt. %) or on a parts per million (ppm) weight basis, or according to sweetness, e.g., on the basis of sweetness equivalent (SE). Techniques for determining the sweetness equivalent (SE) of various compounds is well known in the art.

In some embodiments, a composition comprises an amount of Reb M that has a SE between about 0.5% and about 15% sucrose, between about 1% and about 12.5% sucrose, between about 2% and about 10% sucrose, between about 3% and about 7.5% sucrose, or between about 4% and about 6% sucrose. In some embodiments, a composition comprises an amount of Reb M that has a SE of about 5% sucrose. In some embodiments, a composition comprises an amount of Reb M that has a SE of 5% sucrose.

In some embodiments, any one of the compositions described herein comprise Reb M in an amount that is between 1-600, 1-500, 1-400, 1-300, 1-50, 1-25, 1-10, 10-600, 10-500, 10-400, 10-300, 10-50, 10-25, 25-600, 25-500, 25-400, 25-300, 25-50, 50-600, 50-500, 50-400, 50-300, 300-600, 300-500, 300-400, 400-500, 400-600, or 500-600 ppm. In some embodiments, Reb M is present in the composition in an amount of about 1, 10, 15, 25, 50, 60 200, 300, 320, 350, 400, 493, 500, or 600 ppm. In some embodiments, Reb M is present in the composition in an amount of about 1-450 ppm. In some embodiments, Reb M is present in the composition in an amount of about 200-600 ppm. In some embodiments, Reb M is present in the composition in an amount of about 200-500 ppm. In some embodiments, Reb M is present in the composition in an amount of about 1-30 ppm. In some embodiments, Reb M is present in the composition in an amount of about 40-550 ppm. In some embodiments, Reb M is present in the composition in an amount of about 60 ppm.

In some embodiments, a composition comprises an amount of brazzein that is between about 1 ppm and about 200 ppm, between about 5 ppm and about 180 ppm, between about 10 ppm and about 160 ppm, between about 15 ppm and about 140 ppm, between about 20 ppm and about 120 ppm, between about 25 ppm and about 100 ppm, between about 30 ppm and about 80 ppm, between about 35 ppm and about 60 ppm, or between about 40 ppm and about 50 ppm. In some embodiments, a composition comprises an amount of brazzein that is between about 1 ppm and about 45 ppm, between about 2 ppm and about 40 ppm, between about 3 ppm and about 25 ppm, between about 5 ppm and about 35 ppm, between about 1 ppm and about 30 ppm, between about 10 ppm and about 30 ppm, between about 15 ppm and about 30 ppm, or between about 20 ppm and about 30 ppm. In some embodiments, a composition comprises an amount of brazzein that is between about 3 ppm and about 25 ppm. In some embodiments, a composition comprises an amount of brazzein that is about 25 ppm. In some embodiments, a composition comprises an amount of brazzein that is 25 ppm.

In some embodiments, any one of the compositions described herein comprise brazzein in an amount that is between 1-100, 1-50, 1-40, 1-30, 1-25, 1-20, 1-15, 1-10, 10-100, 10-50, 10-40, 10-30, 10-25, 10-20, 10-15, 15-100, 15-50, 15-40, 15-30, 15-25, 15-20, 20-100, 20-50, 20-40, 20-30, 20-25, 25-100, 25-50, 25-40, 25-30, 30-100, 30-50, 30-40, 40-100, 40-50, or 50-100 ppm. In some embodiments, brazzein is present in the composition in an amount of about 1, 3, 4, 5, 6, 7, 10, 14, 15, 20, 25, 30, 40, 50, or 100 ppm. In some embodiments, brazzein is present in the composition in an amount of about 1-14 ppm.

In some embodiments, a composition comprises an amount of Reb M that has a SE between about 0.5% and about 15% (e.g., between about 0.5% and about 15%, between about 1% and about 12.5%, between about 2% and about 10%, between about 3% and about 7.5%, or between about 4% and about 6%) sucrose, and an amount of brazzein that is between about 1 ppm and about 200 ppm (e.g., between about 1 ppm and about 45 ppm, between about 2 ppm and about 40 ppm, between about 5 ppm and about 35 ppm, between about 1 ppm and about 30 ppm, between about 10 ppm and about 30 ppm, between about 15 ppm and about 30 ppm, or between about 20 ppm and about 30 ppm). In some embodiments, a composition comprises an amount of Reb M that has a SE of about 5% sucrose and an amount of brazzein that is 25 ppm.

In some embodiments, a composition comprises between about 75-95 wt. % (e.g., 75-95 wt. %, 75-90 wt. %, 75-85 wt. %, 75-80 wt. %, 80-95 wt. %, 80-90 wt. %, 80-85 wt. %, 85-95 wt. %, 85-90 wt. %, or 90-95 wt. %) Reb M. In some embodiments, a composition comprises between about 5-25 wt. % (e.g., 5-25 wt. %, 5-20 wt. %, 5-15 wt. %, 5-10 wt. %, 10-25 wt. %, 10-20 wt. %, 10-15 wt. %, 15-25 wt. %, 15-20 wt. %, or 20-25 wt. %) brazzein. In some embodiments, a composition comprises between about 75-95 wt. % (e.g., 75-95 wt. %, 75-90 wt. %, 75-85 wt. %, 75-80 wt. %, 80-95 wt. %, 80-90 wt. %, 80-85 wt. %, 85-95 wt. %, 85-90 wt. %, or 90-95 wt. %) Reb M and between about 5-25 wt. % (e.g., 5-25 wt. %, 5-20 wt. %, 5-15 wt. %, 5-10 wt. %, 10-25 wt. %, 10-20 wt. %, 10-15 wt. %, 15-25 wt. %, 15-20 wt. %, or 20-25 wt. %) brazzein. All percentages being on an anhydrous wt./wt. basis.

In some embodiments, any one of the compositions described herein comprise Reb M and brazzein, where brazzein is present in the composition in an amount that is between 1 and 50 ppm, and Reb M is present in the composition in an amount that is between 200 and 600 ppm. In some embodiments, brazzein is present in the composition in an amount that is between 4 and 20 ppm, and Reb M is present in the composition in an amount that is between 380 and 450 ppm. In some embodiments, brazzein is present in the composition in an amount that is between 4 and 20 ppm, and Reb M is present in the composition in an amount that is between 480 and 550 ppm. In some embodiments, brazzein is present in the composition in an amount that is between 4 and 20 ppm, and Reb M is present in the composition in an amount that is between 440 and 540 ppm. In some embodiments, brazzein is present in the composition in an amount that is about 5, 6, 7, 8, 9, or 10 ppm, and Reb M is present in the composition in an amount that is about 475, 480, 485, 490, 493, 495, or 500 ppm. In some embodiments, brazzein is present in the composition in an amount that is about 25, and Reb M is present in the composition in an amount that is about 320 ppm. In some embodiments, brazzein is present in the composition in an amount that is between 5 and 25 ppm, and Reb M is present in the composition in an amount that is between 280 and 380 ppm. In some embodiments, brazzein is present in the composition in an amount that is between 7 and 14 ppm, and Reb M is present in the composition in an amount that is between 400 and 450 ppm. In some embodiments, brazzein is present in the composition in an amount that is between 7 and 14 ppm, and Reb M is present in the composition in an amount that is between 500 and 550 ppm. In some embodiments, any of the compositions comprising Reb M and brazzein is, is in or comprises a cola matrix.

In some embodiments, any one of the compositions herein further comprises rebaudioside A (Reb A), rebaudioside B (Reb B), rebaudioside D (Reb D), rebaudioside E (Reb E), rebaudioside I (Reb I), rebaudioside N (Reb N), or combinations thereof. In some embodiments, any one of the compositions described herein further comprises rebaudioside B (Reb B). In some embodiments, any one of the compositions comprising described herein further comprises rebaudioside D (Reb D). In some embodiments, any one of the compositions described herein further comprises rebaudioside E (Reb E). In some embodiments, any one of the compositions described herein further comprises rebaudioside I (Reb I). In some embodiments, any one of the compositions described herein further comprises rebaudioside N (Reb N). In some embodiments, any one of the compositions described herein further comprises one or more (e.g., 1, 2, 3, 4, or 5) of rebaudioside B (Reb B), rebaudioside D (Reb D), rebaudioside E (Reb E), rebaudioside I (Reb I), and rebaudioside N (Reb N). In some embodiments, any one of the compositions described herein further comprises rebaudioside B (Reb B), rebaudioside D (Reb D), rebaudioside E (Reb E), rebaudioside I (Reb I), and rebaudioside N (Reb N). In some embodiments, any one of the compositions described herein further comprises L-glucose. In some embodiments, the composition further comprises allulose (D-psicose).

In some embodiments, any one of the compositions described herein comprises Reb D in an amount that is between 1-500, 1-400, 1-300, 1-150, 1-140, 1-100, 1-80, 1-60, 1-40, 1-30, 1-20, 1-10, 10-500, 10-400, 10-300, 10-150, 10-140, 10-100, 10-80, 10-60, 10-40, 10-30, 10-20, 20-500, 20-400, 20-300, 20-150, 20-140, 20-100, 20-80, 20-60, 20-40, 20-30, 30-500, 30-400, 30-300, 30-150, 30-140, 30-100, 30-80, 30-60, 30-40, 40-500, 40-400, 40-300, 40-150, 40-140, 40-100, 40-80, 40-60, 60-500, 60-400, 60-300, 60-150, 60-140, 60-100, 60-80, 80-500, 80-400, 80-300, 80-150, 80-140, 80-100, 100-500, 100-400, 100-300, 100-150, 100-140, 140-500, 140-400, 140-300, 140-150, 150-500, 150-400, 150-300, 300-400, 300-500, or 400-500 ppm. In some embodiments, Reb D is present in the composition in an amount of about 1, 10, 20, 30, 40, 60, 80, 100, 140, 150, 300, 400, or 500 ppm. In some embodiments, Reb D is present in the composition in an amount of about 1-350 ppm. In some embodiments, Reb D is present in the composition in an amount of about 20-200 ppm. In some embodiments, Reb D is present in the composition in an amount of about 60 ppm.

In some embodiments, any one of the compositions described herein comprises Reb E in an amount that is between 1-100, 1-80, 1-75, 1-70, 1-60, 1-50, 1-30, 1-25, 1-20, 1-10, 1-5, 5-100, 5-80, 5-75, 5-70, 5-60, 5-50, 5-30, 5-25, 5-20, 5-10, 10-100, 10-80, 10-75, 10-70, 10-60, 10-50, 10-30, 10-25, 10-20, 20-100, 20-80, 20-75, 20-70, 20-60, 20-50, 20-30, 20-25, 25-100, 25-80, 25-75, 25-70, 25-60, 25-50, 25-30, 30-100, 30-80, 30-75, 30-70, 30-60, 30-50, 50-100, 50-80, 50-75, 50-70, 50-60, 60-100, 60-80, 60-75, 60-70, 70-100, 70-80, 70-75, 75-100, 75-80, or 80-100 ppm. In some embodiments, Reb E is present in the composition in an amount of about 1, 5, 10, 20, 25, 30, 50, 60, 70, 75, 80, or 100 ppm. In some embodiments, Reb E is present in the composition in an amount of about 10-85 ppm. In some embodiments, Reb E is present in the composition in an amount of about 1-85 ppm. In some embodiments, Reb E is present in the composition in an amount of about 60 ppm.

In some embodiments, any one of the compositions described herein comprises Reb I in an amount that is between 1-100, 1-80, 1-75, 1-70, 1-60, 1-50, 1-30, 1-25, 1-20, 1-10, 1-5, 5-100, 5-80, 5-75, 5-70, 5-60, 5-50, 5-30, 5-25, 5-20, 5-10, 10-100, 10-80, 10-75, 10-70, 10-60, 10-50, 10-30, 10-25, 10-20, 20-100, 20-80, 20-75, 20-70, 20-60, 20-50, 20-30, 20-25, 25-100, 25-80, 25-75, 25-70, 25-60, 25-50, 25-30, 30-100, 30-80, 30-75, 30-70, 30-60, 30-50, 50-100, 50-80, 50-75, 50-70, 50-60, 60-100, 60-80, 60-75, 60-70, 70-100, 70-80, 70-75, 75-100, 75-80, or 80-100 ppm. In some embodiments, Reb I is present in the composition in an amount of about 1, 5, 10, 20, 25, 30, 50, 60, 70, 75, 80, or 100 ppm. In some embodiments, Reb I is present in the composition in an amount of about 1-7 ppm. In some embodiments, Reb I is present in the composition in an amount of about 60 ppm.

In some embodiments, any one of the compositions described herein comprises Reb B in an amount that is between 1-200, 1-100, 1-80, 1-70, 1-50, 1-30, 1-5, 5-200, 5-100, 5-80, 5-70, 5-50, 5-30, 30-200, 30-100, 30-80, 30-70, 30-50, 50-200, 50-100, 50-80, 50-70, 70-200, 70-100, 70-80, 80-100, 80-200, or 100-200 ppm. In some embodiments, Reb B is present in the composition in an amount of about 1, 5, 30, 49, 50, 70, 80, 100, 150, or 200 ppm. In some embodiments, Reb B is present in the composition in an amount of about 1-150 ppm. In some embodiments, in any of the compositions described herein, Reb B is present in the composition in an amount about 45, 46, 47, 48, 49, 50, 51, or 52 ppm.

In some embodiments, any one of the compositions described herein comprises Reb A in an amount that is between 1-200, 1-100, 1-80, 1-70, 1-50, 1-30, 1-10 1-5, 5-200, 5-100, 5-80, 5-70, 5-50, 5-30, 10-200, 10-100, 10-80, 10-70, 10-50, 10-30, 30-200, 30-100, 30-80, 30-70, 30-50, 50-200, 50-100, 50-80, 50-70, 70-200, 70-100, 70-80, 80-100, 80-200, or 100-200 ppm. In some embodiments, Reb A is present in the composition in an amount of about 1, 5, 30, 50, 70, 80, 100, 150, or 200 ppm. In some embodiments, Reb A is present in the composition in an amount of about 1-150 ppm. In some embodiments, Reb A is present in the composition in an amount about 25, 26, 27, 28, 29, 30, 31, 32, 33, 34, or 35 ppm.

In some embodiments, the composition comprises Reb M, brazzein and Reb D. In some embodiments, the composition comprises Reb M, brazzein, Reb D and Reb E. In some embodiments, the composition comprises Reb M, brazzein, Reb D, Reb E and Reb I. In some embodiments, the composition comprises Reb M, brazzein, Reb D, Reb E, Reb I and Reb B. In some embodiments, the composition comprises Reb M, brazzein, Reb D, Reb E, Reb I, Reb B and Reb A. In any one of the foregoing compositions, the amounts of brazzein and the rebaudiosides are any one of the amounts provided herein, respectively.

In some embodiments, any one of the compositions described herein comprises rebaudioside M (Reb M), brazzein and Reb D. In some embodiments, brazzein is present in the composition in an amount that is between 1 and 50 ppm, Reb M is present in the composition in an amount that is between 200 and 500 ppm, and Reb D is present in the composition in an amount that is between 20 and 200 ppm. In some embodiments, brazzein is present in the composition in an amount that is between 1 and 30 ppm, Reb M is present in the composition in an amount that is between 100 and 400 ppm, and Reb D is present in the composition in an amount that is between 50 and 300 ppm. In some embodiments, brazzein is present in the composition in an amount that is between 3 and 30 ppm, Reb M is present in the composition in an amount that is between 300 and 400 ppm, and Reb D is present in the composition in an amount that is between 60 and 140 ppm. In some embodiments, brazzein is present in the composition in an amount that is between 1 and 14 ppm, Reb M is present in the composition in an amount that is about 360 ppm, and Reb D is present in the composition in an amount that is about 100 ppm. In some embodiments, brazzein is present in the composition in an amount that is between 4 ppm and 20 ppm, Reb M is present in the composition in an amount that is between 300 and 400 ppm, and Reb D is present in the composition in an amount that is between 50 and 150 ppm. In some embodiments, brazzein is present in the composition in an amount that is about 7 ppm, Reb M is present in the composition in an amount that is about 350 ppm, and Reb D is present in the composition in an amount about 100 ppm. In some embodiments of any one of the compositions provided herein, Reb M, brazzein and Reb D have a sweetness intensity equivalent to the sweetness intensity of a solution comprising 200 ppm sucralose.

In some embodiments, any one of the compositions described herein comprises Reb M, brazzein, Reb D and Reb E. In some embodiments, brazzein is present in the composition in an amount that is between 1 and 50 ppm, Reb M is present in the composition in an amount that is between 1 and 30 ppm, Reb D is present in the composition in an amount that is between 1 and 30 ppm, and Reb E is present in the composition in an amount that is between 1 and 30 ppm. In some embodiments, brazzein is present in the composition in an amount that is between 1 and 20 ppm, Reb M is present in the composition in an amount that is between 1 and 10 ppm, Reb D is present in the composition in an amount that is between 1 and 10 ppm, and Reb E is present in the composition in an amount that is between 1 and 20 ppm. In some embodiments, brazzein is present in the composition in an amount that is between 1 and 14 ppm, Reb M is present in the composition in an amount that is between 1 and 7 ppm, Reb D is present in the composition in an amount that is between 1 and 5 ppm, and Reb E is present in the composition in an amount that is between 1 and 7 ppm. In some embodiments of any one of the compositions described herein Reb M, brazzein, Reb D and Reb E have a sweetness intensity of a solution comprising 1% to 5% (w/v-%) sucrose. In some embodiments of any one of the compositions described herein Reb M, brazzein, Reb D and Reb E have a sweetness intensity of a solution comprising 1% to 15% (w/v-%) sucrose. In some embodiments of any one of the compositions described herein. Reb M, brazzein, Reb D and Reb E have a sweetness intensity of a solution comprising 1% to 3% (w/v-%) sucrose.

In some embodiments, any one of the compositions described herein comprises Reb M, brazzein, Reb D, Reb E and Reb I. In some embodiments, brazzein is present in the composition in an amount that is between 4 and 30 ppm. In some embodiments, brazzein is present in the composition in an amount that is between 1 and 14 ppm. In some embodiments, brazzein is present in the composition in an amount that is between 1 and 50 ppm, Reb M is present in the composition in an amount that is between 1 to 30 ppm, Reb D is present in the composition in an amount that is between 1 and 350 ppm, Reb E is present in the composition in an amount that is between 1 and 85 ppm, and Reb I is present in the composition in an amount that is between 1 and 80 ppm. In some embodiments, brazzein is present in the composition in an amount that is between 4 and 30 ppm, Reb M is present in the composition in an amount that is between 300 to 400 ppm, Reb D is present in the composition in an amount that is between 30 and 80 ppm, Reb E is present in the composition in an amount that is between 20 and 80 ppm, and Reb I is present in the composition in an amount that is between 30 and 80 ppm. In some embodiments, brazzein is present in the composition in an amount that is between 4 and 20 ppm, Reb M is present in the composition in an amount that is between 250 to 450 ppm, Reb D is present in the composition in an amount that is between 30 and 80 ppm, Reb E is present in the composition in an amount that is between 20 and 80 ppm, and Reb I is present in the composition in an amount that is between 30 and 80 ppm. In some embodiments, brazzein is present in the composition in an amount that is between 4 and 30 ppm, Reb M is present in the composition in an amount that is between 250 to 500 ppm, Reb D is present in the composition in an amount that is between 25 and 150 ppm, Reb E is present in the composition in an amount that is between 25 and 75 ppm, and Reb I is present in the composition in an amount that is between 25 and 75 ppm. In some embodiments, brazzein is present in the composition in an amount that is between 1 and 14 ppm, Reb M is present in the composition in an amount that is between 1 to 7 ppm, Reb D is present in the composition in an amount that is between 1 and 5 ppm, Reb E is present in the composition in an amount that is between 1 and 7 ppm, and Reb I is present in the composition in an amount that is between 1 and 7 ppm. In some embodiments, brazzein is present in the composition in an amount that is between 1 and 14 ppm, Reb M is present in the composition in an amount that is between 1 to 24 ppm, Reb D is present in the composition in an amount that is between 1 and 5 ppm, Reb E is present in the composition in an amount that is between 1 and 7 ppm, and Reb I is present in the composition in an amount that is between 1 and 7 ppm. In some embodiments, brazzein is present in the composition in an amount that is between 1 and 20 ppm, Reb M is present in the composition in an amount that is between 1 to 14 ppm, Reb D is present in the composition in an amount that is between 1 and 10 ppm, Reb E is present in the composition in an amount that is between 1 and 20 ppm, and Reb I is present in the composition in an amount that is between 1 and 7 ppm. In some embodiments, brazzein is present in the composition in an amount that is between 3 and 30 ppm, Reb M is present in the composition in an amount that is between 100 to 400 ppm, Reb D is present in the composition in an amount that is between 50 and 300 ppm, Reb E is present in the composition in an amount that is between 20 and 70 ppm, and Reb I is present in the composition in an amount that is between 20 and 60 ppm. In some embodiments, brazzein is present in the composition in an amount that is between 4 and 20 ppm, Reb M is present in the composition in an amount that is between 380 to 450 ppm, Reb D is present in the composition in an amount that is between 30 and 60 ppm, Reb E is present in the composition in an amount that is between 30 and 60 ppm, and Reb I is present in the composition in an amount that is between 30 and 60 ppm. In some embodiments of any one of the compositions described herein Reb M, brazzcin, Reb D and Reb I have a sweetness intensity equivalent to the sweetness intensity of a solution comprising 1-5% w/w sucrose. In some embodiments of any one of the compositions described herein Reb M, brazzein, Reb D and Reb I have a sweetness intensity equivalent to the sweetness intensity of a solution comprising 1-15% w/w sucrose. In some embodiments of any one of the compositions described herein Reb M, brazzein, Reb D and Reb I has a sweetness intensity equivalent to the sweetness intensity of a solution comprising 1-3% w/w sucrose.

In some embodiments, any one of the compositions described herein comprises Reb M, brazzein, Reb D, Reb E, Reb I and thaumatin. In some embodiments, brazzein is present in the composition in an amount that is between 4 and 30 ppm, Reb M is present in the composition in an amount that is between 300 to 400 ppm, Reb D is present in the composition in an amount that is between 30 and 80 ppm, Reb E is present in the composition in an amount that is between 20 and 80 ppm, and Reb I is present in the composition in an amount that is between 30 and 80 ppm, and thaumatin is present in the composition in an amount that is between 1 and 5 ppm. In some embodiments of any one of the compositions described herein Reb M, brazzein, Reb D, Reb I and thaumatin have a sweetness intensity equivalent to the sweetness intensity of a solution comprising 1-5% w/w sucrose. In some embodiments of any one of the compositions described herein Reb M, brazzein, Reb D, Reb I and thaumatin have a sweetness intensity equivalent to the sweetness intensity of a solution comprising 1-15% w/w sucrose. In some embodiments of any one of the compositions described herein Reb M, brazzein, Reb D, Reb I and thaumatin have a sweetness intensity equivalent to the sweetness intensity of a solution comprising 1-3% w/w sucrose.

In some embodiments, any one of the compositions described herein comprises Reb M, brazzein, Reb D, Reb E, Reb I and glycerin. In some embodiments, brazzein is present in the composition in an amount that is between 4 and 30 ppm, Reb M is present in the composition in an amount that is between 250 to 500 ppm, Reb D is present in the composition in an amount that is between 25 and 150 ppm, Reb E is present in the composition in an amount that is between 25 and 75 ppm, and Reb I is present in the composition in an amount that is between 25 and 75 ppm and glycerin is present in the composition in an amount that is between 500 ppm and 4000 ppm. In some embodiments, glycerin is present in the composition in an amount that is between 200 ppm and 4000 ppm. In some embodiments, glycerin is present in the composition in an amount that is between 200 ppm and 400 ppm. In some embodiments of any one of the compositions described herein Reb M, brazzein, Reb D, Reb I and glycerin have a sweetness intensity equivalent to the sweetness intensity of a solution comprising 1-5% w/w sucrose. In some embodiments of any one of the compositions described herein Reb M, brazzein, Reb D, Reb I and glycerin have a sweetness intensity equivalent to the sweetness intensity of a solution comprising 1-15% w/w sucrose. In some embodiments of any one of the compositions described herein Reb M, brazzein, Reb D, Reb I and glycerin have a sweetness intensity equivalent to the sweetness intensity of a solution comprising 1-3% w/w sucrose.

In some embodiments, any one of the compositions described herein comprises Reb M, brazzein, Reb D, Reb E, Reb I and Reb B. In some embodiments, brazzein is present in the composition in an amount that is between 1 and 50 ppm, Reb M is present in the composition in an amount that is between 1 and 450 ppm, Reb D is present in the composition in an amount that is between 1 and 60 ppm, Reb E is present in the composition in an amount that is between 1 and 60 ppm, Reb I is present in the composition in an amount that is between 1 and 60 ppm, and Reb B is present in the composition in an amount that is between 1 and 150 ppm. In some embodiments, brazzein is present in the composition in an amount that is between 4 and 20 ppm, Reb M is present in the composition in an amount that is between 2 and 400 ppm, Reb D is present in the composition in an amount that is between 5 and 50 ppm, Reb E is present in the composition in an amount that is between 5 and 50 ppm, Reb I is present in the composition in an amount that is between 5 and 50 ppm, and Reb B is present in the composition in an amount that is between 5 and 100 ppm. In some embodiments, brazzein is present in the composition in an amount that is between 4 and 14 ppm, Reb M is present in the composition in an amount that is between 2 and 400 ppm, Reb D is present in the composition in an amount that is between 5 and 50 ppm, Reb E is present in the composition in an amount that is between 5 and 50 ppm, Reb I is present in the composition in an amount that is between 5 and 50 ppm, and Reb B is present in the composition in an amount that is between 5 and 100 ppm.

In some embodiments, any one of the compositions described herein comprises brazzein, Reb M, Reb D, Reb E, Reb I, Reb B, caffeine, taurine, niacin (Vitamin B3), pyridoxine (Vitamin B6), pantothenic acid (Vitamin B5), and cobalamin (Vitamin B12). In some embodiments, brazzein is present in the composition in an amount that is between 1 and 50 ppm, Reb M is present in the composition in an amount that is between 1 and 450 ppm, Reb D is present in the composition in an amount that is between 1 and 60 ppm, Reb E is present in the composition in an amount that is between 1 and 60 ppm, Reb I is present in the composition in an amount that is between 1 and 60 ppm, and Reb B is present in the composition in an amount that is between 1 and 150 ppm, caffeine is present in the composition in an amount that is between 1 ppm and 700 ppm, taurine is present in the composition in an amount that is between 500 ppm-18000 ppm, niacin (Vitamin B3) is present in the composition in an amount that is between 1 and 700 ppm, pyridoxine (Vitamin B6) is present in the composition in an amount that is between 1 and 200 ppm, pantothenic acid (Vitamin B5) is present in the composition in an amount that is between 1 and 150 ppm, and cobalamin (Vitamin B12) is present in the composition in an amount that is between 1 and 100 ppm. In some embodiments, brazzein is present in the composition in an amount that is between 4 and 20 ppm, Reb M is present in the composition in an amount that is between 2 and 400 ppm, Reb D is present in the composition in an amount that is between 5 and 50 ppm, Reb E is present in the composition in an amount that is between 5 and 50 ppm, Reb I is present in the composition in an amount that is between 5 and 50 ppm, and Reb B is present in the composition in an amount that is between 5 and 100 ppm, caffeine is present in the composition in an amount that is between 100 and 600 ppm, taurine is present in the composition in an amount that is between 500 ppm and 12000 ppm, niacin (Vitamin B3) is present in the composition in an amount that is between 5 and 680 ppm, pyridoxine (Vitamin B6) is present in the composition in an amount that is between 5 and 180 ppm, pantothenic acid (Vitamin B5) is present in the composition in an amount that is between 5 and 120 ppm, and cobalamin (Vitamin B12) is present in the composition in an amount that is between 5 and 80 ppm. In some embodiments, brazzein is present in the composition in an amount that is between 4 and 14 ppm, Reb M is present in the composition in an amount that is between 2 and 400 ppm, Reb D is present in the composition in an amount that is between 5 and 50 ppm, Reb E is present in the composition in an amount that is between 5 and 50 ppm, Reb I is present in the composition in an amount that is between 5 and 50 ppm, and Reb B is present in the composition in an amount that is between 5 and 100 ppm, caffeine is present in the composition in an amount that is between 1 and 600 ppm, taurine is present in the composition in an amount that is between 500 ppm-12000 ppm, niacin (Vitamin B3) is present in the composition in an amount that is between 1 and 680 ppm, pyridoxine (Vitamin B6) is present in the composition in an amount that is between 1 and 180 ppm, pantothenic acid (Vitamin B5) is present in the composition in an amount that is between 1 and 120 ppm, and cobalamin (Vitamin B12) is present in the composition in an amount that is between 1 and 80 ppm.

In some embodiments, any one of the compositions described herein comprises Reb M, brazzein, Reb D, Reb E, Reb I, Reb B and Reb A. In some embodiments, brazzein is present in the composition in an amount that is between 1 and 50 ppm, Reb M is present in the composition in an amount that is between 40 and 550 ppm, Reb D is present in the composition in an amount that is between 1 and 350 ppm, Reb E is present in the composition in an amount that is between 1 and 85 ppm, Reb I is present in the composition in an amount that is between 1 and 75 ppm, Reb B is present in the composition in an amount that is between 1 and 150 ppm, and Reb A is present in the composition in an amount that is between 1 and 150 ppm. In some embodiments, brazzein is present in the composition in an amount that is between 3 and 30 ppm, Reb M is present in the composition in an amount that is between 300 and 400 ppm, Reb D is present in the composition in an amount that is between 60 and 140 ppm, Reb E is present in the composition in an amount that is between 30 and 70 ppm, Reb I is present in the composition in an amount that is between 30 and 70 ppm, Reb B is present in the composition in an amount that is between 30 and 70 ppm, and Reb A is present in the composition in an amount that is between 1 and 10 ppm. In some embodiments, brazzein is present in the composition in an amount that is between 1 and 50 ppm, Reb M is present in the composition in an amount that is between 220 and 300 ppm, Reb D is present in the composition in an amount that is between 2 and 40 ppm, Reb E is present in the composition in an amount that is between 20 and 80 ppm, Reb I is present in the composition in an amount that is between 10 and 50 ppm, Reb B is present in the composition in an amount that is between 5 and 50 ppm, and Reb A is present in the composition in an amount that is between 5 and 50 ppm. In some embodiments, brazzein is present in the composition in an amount that is between 1 and 40 ppm, Reb M is present in the composition in an amount that is between 50 and 400 ppm, Reb D is present in the composition in an amount that is between 50 and 300 ppm, Reb E is present in the composition in an amount that is between 5 and 50 ppm, Reb I is present in the composition in an amount that is between 5 and 50 ppm, Reb B is present in the composition in an amount that is between 5 and 100 ppm, and Reb A is present in the composition in an amount that is between 5 and 100 ppm. In some embodiments, brazzein is present in the composition in an amount that is between 7 and 40 ppm, Reb M is present in the composition in an amount that is between 220 and 300 ppm, Reb D is present in the composition in an amount that is between 5 and 300 ppm, Reb E is present in the composition in an amount that is between 5 and 80 ppm, Reb I is present in the composition in an amount that is between 15 and 50 ppm, Reb B is present in the composition in an amount that is between 5 and 100 ppm, and Reb A is present in the composition in an amount that is between 5 and 50 ppm. In some embodiments, brazzein is present in the composition in an amount that is between 1 and 40 ppm, Reb M is present in the composition in an amount that is between 50 and 400 ppm, Reb D is present in the composition in an amount that is between 50 and 300 ppm, Reb E is present in the composition in an amount that is between 5 and 50 ppm, Reb I is present in the composition in an amount that is between 5 and 50 ppm, Reb B is present in the composition in an amount that is between 5 and 100 ppm, and Reb A is present in the composition in an amount that is between 5 and 100 ppm. In some embodiments, brazzein is present in the composition in an amount that is between 1 and 40 ppm, Reb M is present in the composition in an amount that is between 50 and 400 ppm, Reb D is present in the composition in an amount that is between 50 and 300 ppm, Reb E is present in the composition in an amount that is between 5 and 50 ppm, Reb I is present in the composition in an amount that is between 5 and 50 ppm, Reb B is present in the composition in an amount that is between 5 and 100 ppm, and Reb A is present in the composition in an amount that is between 5 and 100 ppm. In some embodiments, brazzein is present in the composition in an amount that is between 1 and 40 ppm, Reb M is present in the composition in an amount that is between 50 and 400 ppm, Reb D is present in the composition in an amount that is between 50 and 300 ppm, Reb E is present in the composition in an amount that is between 5 and 50 ppm, Reb I is present in the composition in an amount that is between 5 and 50 ppm, Reb B is present in the composition in an amount that is between 5 and 100 ppm, and Reb A is present in the composition in an amount that is between 5 and 100 ppm. In some embodiments, brazzein is present in the composition in an amount that is between 1 and 40 ppm, Reb M is present in the composition in an amount that is between 50 and 400 ppm, Reb D is present in the composition in an amount that is between 50 and 300 ppm, Reb E is present in the composition in an amount that is between 5 and 50 ppm, Reb I is present in the composition in an amount that is between 5 and 50 ppm, Reb B is present in the composition in an amount that is between 5 and 100 ppm, and Reb A is present in the composition in an amount that is between 5 and 100 ppm. In some embodiments, brazzein is present in the composition in an amount that is between 50 and 300 ppm, Reb M is present in the composition in an amount that is between 50 and 400 ppm, Reb D is present in the composition in an amount that is between 50 and 300 ppm, Reb E is present in the composition in an amount that is between 5 and 50 ppm, Reb I is present in the composition in an amount that is between 5 and 50 ppm, Reb B is present in the composition in an amount that is between 5 and 100 ppm, and Reb A is present in the composition in an amount that is between 5 and 100 ppm. In some embodiments, brazzein is present in the composition in an amount that is between 1 and 40 ppm, Reb M is present in the composition in an amount that is between 50 and 400 ppm, Reb D is present in the composition in an amount that is between 50 and 300 ppm, Reb E is present in the composition in an amount that is between 5 and 50 ppm, Reb I is present in the composition in an amount that is between 5 and 50 ppm, Reb B is present in the composition in an amount that is between 5 and 100 ppm, and Reb A is present in the composition in an amount that is between 5 and 100 ppm. In some embodiments of any one of the compositions described herein Reb M, brazzein, Reb D, Reb E, Reb I, Reb B and Reb A have a sweetness intensity equivalent to the sweetness intensity of a solution comprising 200 ppm sucralose.

In some embodiments, a composition comprising Reb M and brazzein described herein further comprises ferulic acid. In some embodiments, a composition comprises between about 1-30 wt. % ferulic acid, between about 5-25 wt. % ferulic acid, or between about 10-20 wt. % ferulic acid. In some embodiments, a composition comprises an amount of ferulic acid that is between about 0.8 ppm and about 30 ppm, between about 0.8 ppm and about 24 ppm, between about 0.8 ppm and about 12 ppm, between about 1.6 ppm and about 8 ppm, or between about 3.2 ppm and about 6 ppm.

In some embodiments, a composition described herein comprises rebaudioside M (Reb M), brazzein, and ferulic acid. In some embodiments, Reb M is present in the composition in an amount that has a sweetness equivalent (SE) between about 0.5% and about 15% sucrose, brazzein is present in the composition in an amount that is between about 1 ppm and about 200 ppm (e.g., about 1 ppm and about 45 ppm or about 1 ppm and about 30 ppm) and ferulic acid is present in the composition in an amount that is between about 0.8 ppm to about 12 ppm. In some embodiments, Reb M is present in the composition in an amount that has a sweetness equivalent (SE) of about 5% sucrose, brazzein is present in the composition in an amount that is about 25 ppm, and ferulic acid is present in the composition in an amount that is about 6 ppm.

In some embodiments, the composition further comprises erythritol, isomalt, inulin, gum arabic, aspartame, sucralose, acesulfame potassium, tagatose, kojibiose, trehalose, sucrose, lactose, fructose, D-glucose, galactose, or combinations thereof. In some embodiments, the composition further comprises erythritol. In some embodiments, the composition further comprises isomalt. In some embodiments, the composition further comprises inulin. In some embodiments, the composition further comprises gum arabic. In some embodiments, the composition further comprises aspartame. In some embodiments, the composition further comprises sucralose. In some embodiments, the composition further comprises acesulfame potassium. In some embodiments, the composition further comprises tagatose. In some embodiments, the composition further comprises kojibiose. In some embodiments, the composition further comprises trehalose. In some embodiments, the composition further comprises sucrose. In some embodiments, the composition further comprises lactose. In some embodiments, the composition further comprises fructose. In some embodiments, the composition further comprises D-glucose. In some embodiments, the composition further comprises galactose.

Any one of the compositions co described herein may be in any form that is generally known in the art, such as a solid (e.g., a powder, a consumable solid) or a liquid (e.g., an aqueous liquid, a non-aqueous liquid, a consumable liquid). Any one of the compositions described herein may be formulated for pharmaceutical use by comprising one or more pharmaceutically acceptable excipients well known in the art. Any one of the compositions described herein may comprise one or more other components of the composition, such as a solvent.

Methods of Production

Steviol glycosides can be isolated from *Stevia rebaudiana* leaves. Steviol glycosides are used as high intensity, low-calorie sweeteners and are significantly sweeter than sucrose. As natural sweeteners, different steviol glycosides have different degrees of sweetness and aftertaste. For example, stevioside is 100-150 times sweeter than sucrose, with a bitter aftertaste. Rebaudioside C is between 40-60 times sweeter than sucrose. Dulcoside A is about 30 times sweeter than sucrose. Steviol glycosides with known structures include Rebaudioside M:

The majority of steviol glycosides are formed by several glycosylation reactions of steviol, which are typically catalyzed by the UDP-glycosyltransferases (UGTs) using uridine 5'-diphosphoglucose (UDP-glucose) as a donor of the sugar moiety. UGTs in plants make up a very diverse group of enzymes that transfer a glucose residue from UDP-glucose to steviol. For example, glycosylation of the C-2' of the 19-O-glucose of the stevioside yields Rebaudioside E.

Any suitable technique known in the art for isolating and/or purifying Rebaudiosides, such Reb M, from plants, such as *stevia*, may be used. For example, Rebaudiosides can be isolated and/or purified from *stevia* plant material utilizing one or more of the techniques described in U.S. Pat. Nos. 3,723,410; 4,082,858; 4,361,697; 4,599,403; 5,112, 610; 5,962,678; 8,299,224; 8,414,951; U.S. Patent Application Publication Nos. 2006/0083838; 2006/0134292; 2007/0082103; 2008/0300402; and Chaturvedula, V S P and Prakash, I, Eur. Chem. Bull. 2013, 2 (5), 298-302. Such techniques are incorporated herein by reference. Alternatively, the compounds can be recombinantly produced or chemically synthesized using methods well known to those of skill in the art.

In some embodiments, glycosides from leaves, such as Rebaudiosides, can be extracted using either water or organic solvent extraction. Supercritical fluid extraction and steam distillation can also be used. In other embodiments, Rebaudiosides can be recovered from *stevia* plants using membrane technology. In some embodiments, production of an extract typically includes extraction of plant material with water or a water-organic solvent mixture, precipitation of high molecular weight substances, deionization and decolorization, purification on specific macroporous polymeric adsorbents, concentration, and drying.

In other embodiments, extracts of *stevia* leaves may be purified to concentrate a selected component of the *stevia* extract. For example, column chromatography may be used to isolate Rebaudiosides from the other diterpene glycosides. In some embodiments, following chromatographic separation, the produced Rebaudioside may optionally be recrystallized at least once, or at least twice, or at least three times, to obtain a *stevia* extract containing a desired level of purity of a Rebaudioside, such as Reb M.

In some embodiments, an extract used in the compositions (e.g., formulations) provided herein has a purity of about 50% to about 100% by weight, about 55% to about 100% by weight, about 60% to about 100% by weight, about 65% to about 100% by weight, about 70% to about 100% by weight, about 75% to about 100% by weight, about 80% to about 100% by weight, about 85% to about 100% by weight, about 86% to about 100% by weight, about 87% to about 100% by weight, about 88% to about 100% by weight, about 89% to about 100% by weight, about 90% to about 100% by weight, about 91% to about 100% by weight, about 92% to about 100% by weight, about 93% to about 100% by weight, about 94% to about 100% by weight, about 95% to about 100% by weight, about 96% to about 100% by weight, about 97% to about 100% by weight, about 98% to about 100% by weight, or about 99% to about 100% by weight.

Alternatively, an extract used in the compositions (e.g., formulations) provided herein has a purity of about 50% to about 100% by weight, about 50% to about 99% by weight, about 50% to about 98% by weight, about 50% to about 97% by weight, about 50% to about 96% by weight, about 50% to about 95% by weight, about 50% to about 94% by weight, about 50% to about 93% by weight, about 50% to about 92% by weight, about 50% to about 91% by weight, about 50% to about 90% by weight, about 50% to about 85% by weight, about 50% to about 80% by weight, about 50% to about 75% by weight, about 50% to about 70% by weight, about 50% to about 65% by weight, about 50% to about 60% by weight, or about 50% to about 55% by weight. For example, an extract used in a formulation provided herein may have a purity of about 50%, about 55%, about 60%, about 65%, about 70%, about 75%, about 80%, about 85%, about 86%, about 87%, about 88%, about 89%, about 90%, about 91%, about 92%, about 93%, about 94%, about 95%, about 96%, about 97%, about 98%, about 99%, or about 100% by weight, including any range in between these values.

The purity of Rebaudiosides, such as those extracted, isolated, and/or purified from *stevia* plants, can be assayed using any suitable method known in the art. For example, chromatography, such as HPLC, may be used to test the purity of Rebaudioside extracts.

In some embodiments, production can be accomplished through the utilization of microbial strains to produce Rebaudiosides in high yield and purity to allow commercial incorporation into orally consumable products (See, e.g., U.S. Pat. Nos. 9,988,414, 9,522,929, 10,010,099, 10,010, 101, 10,081,826, 10,253,344 all of which, including the methods of production, are incorporated herein by reference).

In some embodiments, rebaudiosides may be produced by recombinantly expressing enzymes in a microbial system, such as a bacterium or fungus. In some embodiments, a host cell belonging to the microbial system is selected from the group consisting of *Escherichia; Salmonella; Bacillus; Acinetobacter; Streptomyces; Corynebacterium; Methylosinus; Methylomonas; Rhodococcus; Pseudomonas; Rhodobacter; Synechocystis; Saccharomyces; Zygosaccharomyces; Kluyveromyces; Candida; Hansenula;* Debaryomyces; *Mucor; Pichia; Torulopsis; Aspergillus;* Arthrobotlys; Brevibacteria; *Microbacterium; Arthrobacter; Citrobacter; Klebsiella; Pantoea; Corynebacterium; Clostridium* (e.g., *Clostridium acetobutylicum*). In some embodiments, the host cell is a cell isolated from plants selected from the group consisting of soybean; rapeseed; sunflower; cotton; corn; tobacco; alfalfa; wheat; barley; oats; sorghum; rice; broccoli; cauliflower; cabbage; parsnips; melons; carrots; celery; parsley; tomatoes; potatoes; strawberries; peanuts; grapes; grass seed crops; sugar beets; sugar cane; beans; peas; rye; flax; hardwood trees; softwood trees; forage grasses; *Arabidopsis thaliana*; rice (*Oryza sativa*); *Hordeum yulgare*; switchgrass (*Panicum* vigratum); Brachypodium spp.; *Brassica* spp.; and *Crambe abyssinica*. In some embodiments, the cell is a bacterial cell, such as *E. coli*, or a yeast cell, such as a *Saccharomyces* cell, *Pichia* cell, or a *Yarrowia* cell. In some embodiments, the cell is an algal cell or a plant cell.

In some embodiments, rebaudiosides of the compositions (e.g., formulations) provided herein are produced in a reaction mixture including a start compound (e.g., any natural or synthetic compound capable of being converted into a steviol glycoside compound in a reaction catalyzed by one or more enzymes); a substrate selected from the group consisting of sucrose, uridine diphosphate (UDP) and uridine diphosphate-glucose (UDP-glucose); and one or more enzymes, such as a UDP-glycosyltransferase. Suitable UDP-glycosyltransferases for producing Rebaudiosides in either a microbial system or an in vitro reaction mixture include any UGT known in the art as capable of catalyzing one or more reactions in the biosynthesis of steviol glycoside compounds, such as, without limitation, EUGT11 (GenBank Accession No. AC133334), HV1 (GenBank Accession No. BAJ98242.1), UGT76G1 (Genbank Accession No. AAR06912.1), UGT85C2 (GenBank Accession No. AAR06916.1), UGT74G1 (GenBank Accession No. AAR06920.1), or the functional homologs, fragments, or variants thereof.

In some embodiments, the reaction mixture further comprises additional enzymes (e.g., sucrose synthase or SUS) to improve the efficiency or modify the outcome of the overall biosynthesis of steviol glycoside compounds. For example, the additional enzyme may regenerate the UDP-glucose needed for the glycosylation reaction by converting the UDP produced from the glycosylation reaction back to UDP-glucose (using, for example, sucrose as a donor of the glucose residue), thus improving the efficiency of the glycosylation reaction.

Standard recombinant DNA and molecular cloning techniques used here are well known in the art and are described, for example, by Sambrook, J., Fritsch, E. F. and Maniatis, T. MOLECULAR CLONING: A LABORATORY MANUAL, 2nd ed.; Cold Spring Harbor Laboratory: Cold Spring Harbor, N.Y., 1989 (hereinafter "Maniatis"); and by Silhavy, T. J., Bennan, M. L. and Enquist, L. W. EXPERIMENTS WITH GENE FUSIONS; Cold Spring Harbor Laboratory: Cold Spring Harbor, N.Y., 1984; and by Ausubel, F. M. et al., IN CURRENT PROTOCOLS IN MOLECULAR BIOLOGY, published by Greene Publishing and Wiley-Interscience, 1987; (the entirety of each of which is hereby incorporated herein by reference).

Rebaudioside M

Rebaudioside M is a steviol glycoside produced in *Stevia* plants. Rebaudioside M has the molecular formula C56H90O33 and the IUPAC name, 13-[(O-b-D-Glucopyranosyl-(1,2)-O-[b-D-glucopyranosyl-(1,3)]-b-D-glucopyranosyl)oxy]-kaur-16-en-18-oic acid (4')-O-b-D-glucopyranosy 1-(1,2)-O-[b-D-glucopyranosyl-(1,3)]-b-D-glucopyranosyl ester.

Rebaudioside M may be purified from *Stevia* leaf extracts, or recombinantly or synthetically produced. In some embodiments, Rebaudioside M is produced from a cultured, genetically modified microorganism. In some embodiments, Rebaudioside M is produced from another Rebaudioside, such as Rebaudioside D, Rebaudioside A, Rebaudioside E, or stevioside. Techniques to produce Rebaudioside M from another Rebaudioside, such as, for example Rebaudioside A, may produce some quantity of another Rebaudioside, such as Rebaudioside D, from which Rebaudioside M is further produced and/or enriched.

A method for producing Rebaudioside M from Rebaudioside D may include preparing a reaction mixture comprising rebaudioside D, substrates selected from the group consisting of sucrose, uridine diphosphate (UDP), uridine diphosphate-glucose (UDP-glucose), and combinations thereof, and a UDP-glycosyltransferase selected from the group consisting of UGT76G1, a UDP-glycosyltransferase-Sucrose synthase fusion enzyme, and combinations thereof, with or without sucrose synthase; and incubating the reaction mixture for a sufficient time to produce rebaudioside M, wherein a glucose is covalently coupled to the rebaudioside D to produce rebaudioside M.

A method for producing Rebaudioside M and Rebaudioside D from stevioside may include preparing a reaction mixture comprising stevioside, substrates selected from the group consisting of sucrose, uridine diphosphate (UDP), uridine diphosphate-glucose (UDP-glucose), and combinations thereof, and a UDP-glycosyltransferase selected from the group consisting of HV1, UGT76G1, a UDP-glycosyltransferase-Sucrose synthase fusion enzyme, and combinations thereof, with or without sucrose synthase; and incubating the reaction mixture for a sufficient time to produce rebaudioside M. In certain embodiments, a glucose is covalently coupled to the stevioside to produce rebaudioside E. Continually, a glucose is covalently coupled to the rebaudioside E to produce rebaudioside D, and a glucose is covalently coupled to the rebaudioside D to produce rebaudioside M.

A method for producing Rebaudioside M and Rebaudioside D from Rebaudioside A may include preparing a reaction mixture comprising rebaudioside A, substrates selected from the group consisting of sucrose, uridine diphosphate (UDP), uridine diphosphate-glucose (UDP-glucose), and combinations thereof, and a UDP-glycosyltransferase selected from the group consisting of HV1, UGT76G1, a UDP-glycosyltransferase-Sucrose synthase fusion enzyme, and combinations thereof, with or without sucrose synthase; and incubating the reaction mixture for a sufficient time to produce rebaudioside M, wherein a glucose is covalently coupled to the rebaudioside A to produce rebaudioside D, and a glucose is covalently coupled to the rebaudioside D to produce rebaudioside M.

A method for producing Rebaudioside M and Rebaudioside D from Rebaudioside E may include preparing a reaction mixture comprising rebaudioside E, substrates selected from the group consisting of sucrose, uridine diphosphate (UDP), uridine diphosphate-glucose (UDP-glucose), and combinations thereof, and a UDP-glycosyltransferase selected from the group consisting of an UGT76G1, a UDP-glycosyltransferase-Sucrose synthase fusion enzyme, and combinations thereof, with or without sucrose synthase; and incubating the reaction mixture for a sufficient time to produce rebaudioside M, wherein a glucose is covalently coupled to the rebaudioside E to produce rebaudioside D, and wherein a glucose is covalently coupled to the rebaudioside D to produce rebaudioside M.

In some embodiments, Rebaudioside M is produced via covalently coupling a glucose to a steviol glycoside (e.g., rebaudioside D) by an UGT76G1, a UTG76G1-SUS fusion enzyme, or UGT76G1 variants such as UGT76G1 CP1, UGT76G1 CP2, and UGT76G1 L200A. In some embodiments, Rebaudioside M is produced by a reaction mixture comprising a steviol glycoside (e.g., rebaudioside D); a substrate selected from the group consisting of sucrose, uridine diphosphate (UDP), and uridine diphosphate-glucose (UDP-glucose); and UGT76G1 (e.g., SEQ ID No: 1), UGT76G1-SUS fusion enzyme (e.g., SEQ ID NO: 9), UTG76G1 CP1 variant (e.g., SEQ ID NO: 3), UTG76G1 CP2 variant (e.g., SEQ ID NO: 4), or UTG76G1 L200A variant (e.g., SEQ ID NO: 2), with or without additional sucrose synthase (e.g., SEQ ID NO: 8).

TABLE 1

Examples of enzymes used for synthesizing rebaudiosides

| Name | Sequences |
|---|---|
| UGT76G1 WT Amino Acid | MENKTETTVRRRRRIILFPVPFQGHINPILQLANVLYSKGFSITIFHTNF NKPKTSNYPHFTFRFILDNDPQDERISNLPTHGPLAGMRIPIINEHGAD ELRRELELLMLASEEDEEVSCLITDALWYFAQSVADSLNLRRLVLMT SSLFNFHAHVSLPQFDELGYLDPDDKTRLEEQASGFPMLKVKDIKSA YSNWQILKEILGKMIKQTKASSGVIWNSFKELEESELETVIREIPAPSF LIPLPKHLTASSSSLLDHDRTVFQWLDQQPPSSVLYVSFGSTSEVDEK DFLEIARGLVDSKQSFLWVVRPGFVKGSTWVEPLPDGFLGERGRIVK WVPQQEVLAHGAIGAFWTHSGWNSTLESVCEGVPMIFSDFGLDQPL NARYMSDVLKVGVYLENGWERGEIANAIRRVMVDEEGEYIRQNAR VLKQKADVSLMKGGSSYESLESLVSYISSL (SEQ ID NO: 1) |
| UGT76G1 L200A Amino Acid | MENKTETTVRRRRRIILFPVPFQGHINPILQLANVLYSKGFSITIFHTNF NKPKTSNYPHFTFRFILDNDPQDERISNLPTHGPLAGMRIPIINEHGAD ELRRELELLMLASEEDEEVSCLITDALWYFAQSVADSLNLRRLVLMT SSLFNFHAHVSLPQFDELGYLDPDDKTRLEEQASGFPMLKVKDIKSA YSNWQIAKEILGKMIKQTKASSGVIWNSFKELEESELETVIREIPAPSF LIPLPKHLTASSSSLLDHDRTVFQWLDQQPPSSVLYVSFGSTSEVDEK DFLEIARGLVDSKQSFLWVVRPGFVKGSTWVEPLPDGFLGERGRIVK WVPQQEVLAHGAIGAFWTHSGWNSTLESVCEGVPMIFSDFGLDQPL NARYMSDVLKVGVYLENGWERGEIANAIRRVMVDEEGEYIRQNAR VLKQKADVSLMKGGSSYESLESLVSYISSL (SEQ ID NO: 2) |

TABLE 1-continued

Examples of enzymes used for synthesizing rebaudiosides

| Name | Sequences |
|------|-----------|
| UGT76G1 CP1 Amino Acid | MNWQILKEILGKMIKQTKASSGVIWNSFKELEESELETVIREIPAPSFL IPLPKHLTASSSSLLDHDRTVFQWLDQQPPSSVLYVSFGSTSEVDEKD FLEIARGLVDSKQSFLWVVRPGFVKGSTWVEPLPDGFLGERGRIVK WVPQQEVLAHGAIGAFWTHSGWNSTLESVCEGVPMIFSDFGLDQPL NARYMSDVLKVGVYLENGWERGEIANAIRRVMVDEEGEYIRQNAR VLKQKADVSLMKGGSSYESLESLVSYISSLENKTETTVRRRRRIILFP VPFQGHINPILQLANVLYSKGFSITIFHTNFNKPKTSNYPHFTFRFILDN DPQDERISNLPTHGPLAGMRIPIINEHGADELRRELELLMLASEEDEE VSCLITDALWYFAQSVADSLNLRRLVLMTSSLFNFHAHVSLPQFDEL GYLDPDDKTRLEEQASGFPMLKVKDIKSAYS (SEQ ID NO: 3) |
| UGT76G1 CP2 Amino Acid | MNWQILKEILGKMIKQTKASSGVIWNSFKELEESELETVIREIPAPSFL IPLPKHLTASSSSLLDHDRTVFQWLDQQPPSSVLYVSFGSTSEVDEKD FLEIARGLVDSKQSFLWVVRPGFVKGSTWVEPLPDGFLGERGRIVK WVPQQEVLAHGAIGAFWTHSGWNSTLESVCEGVPMIFSDFGLDQPL NARYMSDVLKVGVYLENGWERGEIANAIRRVMVDEEGEYIRQNAR VLKQKADVSLMKGGSSYESLESLVSYISSLYKDDSGYSSSYAAAAG MENKTETTVRRRRRIILFPVPFQGHINPILQLANVLYSKGFSITIFHTNF NKPKTSNYPHFTFRFILDNDPQDERISNLPTHGPLAGMRIPIINEHGAD ELRRELELLMLASEEDEEVSCLITDALWYFAQSVADSLNLRRLVLMT SSLFNFHAHVSLPQFDELGYLDPDDKTRLEEQASGFPMLKVKDIKSA YS (SEQ ID NO: 4) |
| EUGT11 WT Amino Acid | MDSGYSSSYAAAAGMHVVICPWLAFGHLLPCLDLAQRLASRGHRV SFVSTPRNISRLPPVRPALAPLVAFVALPLPRVEGLPDGAESTNDVPH DRPDMVELHRRAFDGLAAPFSEFLGTACADWVIVDVFHHWAAAAA LEHKVPCAMMLLGSAHMIASIADRRLERAETESPAAAGQGRPAAAP TFEVARMKLIRTKGSSGMSLAERFSLTLSRSSLVVGRSCVEFEPETVP LLSTLRGKPITFLGLMPPLHEGRREDGEDATVRWLDAQPAKSVVYV ALGSEVPLGVEKVHELALGLELAGTRFLWALRKPTGVSDADLLPAG FEERTRGRGVVATRWVPQMSILAHAAVGAFLTHCGWNSTIEGLMFG HPLIMLPIFGDQGPNARLIEAKNAGLQVARNDGDGSFDREGVAAAIR AVAVEEESSKVFQAKAKKLQEIVADMACHERYIDGFIQQLRSYKD (SEQ ID NO: 5) |
| EUGT11 CP1 Amino Acid | MGSSGMSLAERFSLTLSRSSLVVGRSCVEFEPETVPLLSTLRGKPITFL GLMPPLHEGRREDGEDATVRWLDAQPAKSVVYVALGSEVPLGVEK VHELALGLELAGTRFLWALRKPTGVSDADLLPAGFEERTRGRGVVA TRWVPQMSILAHAAVGAFLTHCGWNSTIEGLMFGHPLIMLPIFGDQG PNARLIEAKNAGLQVARNDGDGSFDREGVAAAIRAVAVEEESSKVF QAKAKKLQEIVADMACHERYIDGFIQQLRSYKDDSGYSSSYAAAAG MHVVICPWLAFGHLLPCLDLAQRLASRGHRVSFVSTPRNISRLPPVR PALAPLVAFVALPLPRVEGLPDGAESTNDVPHDRPDMVELHRRAFD GLAAPFSEFLGTACADWVIVDVFHHWAAAAALEHKVPCAMMLLGS AHMIASIADRRLERAETESPAAAGQGRPAAAPTFEVARMKLIRTK (SEQ ID NO: 6) |
| HV1 glycosyltransferase amino acid | MDGNSSSSPLHVVICPWLALGHLLPCLDIAERLASRGHRVSFVSTPR NIARLPPLRPAVAPLVDFVALPLPHVDGLPEGAESTNDVPYDKFELH RKAFDGLAAPFSEFLRAACAEGAGSRPDWLIVDTFHHWAAAAAVE NKVPCVMLLLGAATVIAGFARGVSEHAAAAVGKERPAAEAPSFETE RRKLMTTQNASGMTVAERYFLTLMRSDLVAIRSCAEWEPESVAALT TLAGKPVVPLGLLPPSPEGGRGVSKEDAAVRWLDAQPAKSVVYVAL GSEVPLRAEQVHELALGLELSGARFLWALRKPTDAPDAAVLPPGFEE RTRGRGLVVTGWVPQIGVLAHGAVAAFLTHCGWNSTIEGLLFGHPL IMLPISSDQGPNARLMEGRKVGMQVPRDESDGSFRREDVAATVRAV AVEEDGRRVFTANAKKMQEIVADGACHERCIDGFIQQLRSYKA (SEQ ID NO: 7) |
| SUS1 WT from *Arabidopsis thaliana*, Amino Acid | MANAERMITRVHSQRERLNETLVSERNEVLALLSRVEAKGKGILQQ NQIIAEFEALPEQTRKKLEGGPFFDLLKSTQEAIVLPPWVALAVRPRP GVWEYLRVNLHALVVEELQPAEFLHPKEELVDGVKNGNFTLELDFE PFNASIPRPTLHKYIGNGVDFLNRHLSAKLFHDKESLLPLLKFLRLHS HQGKNLMLSEKIQNLNTLQHTLRKAEEYLAELKSETLYEEFEAKFEE IGLERGWGDNAERVLDMIRLLLDLLEAPDPCTLETFLGRVPMVFNV VILSPHGYFAQDNVLGYPDTGGQVVYILDQVRALEIEMLQRIKQQGL NIKPRILILTRLLPDAVGTTCGERLERVYDSEYCDILRVPFRTEKGIVR KWISRFEVWPYLETYTEDAAVELSKELNGKPDLIIGNYSDGNLVASL LAHKLGVTQCTIAHALEKTKYPDSDIYWKKLDDKYHFSCQFTADIFA MNHTDFIITSTFQEIAGSKETVGQYESHTAFTLPGLYRVVHGIDVFDP KFNIVSPGADMSIYFPYTEEKRRLTKFHSEIEELLYSDVENKEHLCVL KDKKKPILFTMARLDRVKNLSGLVEWYGKNTRLRELANLVVGGD RRKESKDNEEKAEMKKMYDLIEEYKLNGQFRWISSQMDRVRNGEL |

TABLE 1-continued

Examples of enzymes used for synthesizing rebaudiosides

| Name | Sequences |
|---|---|
| | YRYICDTKGAFVQPALYEAFGLTVVEAMTCGLPTFATCKGGPAEIIV<br>HGKSGFHIDPYHGDQAADTLADFFTKCKEDPSHWDEISKGGLQRIEE<br>KYTWQIYSQRLLTLTGVYGFWKHVSNLDRLEARRYLEMFYALKYR<br>PLAQAVPLAQDD (SEQ ID NO: 8) |
| UGT76G1-<br>AtSUS1 fusion<br>enzyme, amino<br>acid | MENKTETTVRRRRRIILFPVPFQGHINPILQLANVLYSKGFSITIFHTNF<br>NKPKTSNYPHFTFRFILDNDPQDERISNLPTHGPLAGMRIPIINEHGAD<br>ELRRELELLMLASEEDEEVSCLITDALWYFAQSVADSLNLRRLVLMT<br>SSLFNFHAHVSLPQFDELGYLDPDDKTRLEEQASGFPMLKVKDIKSA<br>YSNWQILKEILGKMIKQTKASSGVIWNSFKELEESELETVIREIPAPSF<br>LIPLPKHLTASSSSLLDHDRTVFQWLDQQPPSSVLYVSFGSTSEVDEK<br>DFLEIARGLVDSKQSFLWVVRPGFVKGSTWVEPLPDGFLGERGRIVK<br>WVPQQEVLAHGAIGAFWTHSGWNSTLESVCEGVPMIFSDFGLDQPL<br>NARYMSDVLKVGVYLENGWERGEIANAIRRVMVDEEGEYIRQNAR<br>VLKQKADVSLMKGGSSYESLESLVSYISSLGSGANAERMITRVHSQR<br>ERLNETLVSERNEVLALLSRVEAKGKGILQQNQIIAEFEALPEQTRKK<br>LEGGPFFDLLKSTQEAIVLPPWVALAVRPRPGVWEYLRVNLHALVV<br>EELQPAEFLHFKEELVDGVKNGNFTLELDFEPFNASIPRPTLHKYIGN<br>GVDFLNRHLSAKLFHDKESLLPLLKFLRLHSHQGKNLMLSEKIQNLN<br>TLQHTLRKAEEYLAELKSETLYEEFEAKFEEIGLERGWGDNAERVLD<br>MIRLLLDLLEAPDPCTLETFLGRVPMVFNVVILSPHGYFAQDNVLGY<br>PDTGGQVVYILDQVRALEIEMLQRIKQQGLNIKPRILILTRLLPDAVG<br>TTCGERLERVYDSEYCDILRVPFRTEKGIVRKWISRFEVWPYLETYTE<br>DAAVELSKELNGKPDLIIGNYSDGNLVASLLAHKLGVTQCTIAHALE<br>KTKYPDSDIYWKKLDDKYHFSCQFTADIFAMNHTDFIITSTFQEIAGS<br>KETVGQYESHTAFTLPGLYRVVHGIDVFDPKFNIVSPGADMSIYFPYT<br>EEKRRLTKFHSEIEELLYSDVENKEHLCVLKDKKKPILFTMARLDRV<br>KNLSGLVEWYGKNTRLRELANLVVVGGDRRKESKDNEEKAEMKK<br>MYDLIEEYKLNGQFRWISSSQMDRVRNGELYRYICDTKGAFVQPALY<br>EAFGLTVVEAMTCGLPTFATCKGGPAEIIVHGKSGFHIDPYHGDQAA<br>DTLADFFTKCKEDPSHWDEISKGGLQRIEEKYTWQIYSQRLLTLTGV<br>YGFWKHVSNLDRLEARRYLEMFYALKYRPLAQAVPLAQDDWT<br>(SEQ ID NO: 9) |
| EUGT11-<br>AtSUS1 fusion<br>enzyme, amino<br>acid | MDSGYSSSYAAAAGMHVVICPWLAFGHLLPCLDLAQRLASRGHRV<br>SFVSTPRNISRLPPVRPALAPLVAFVALPLPRVEGLPDGAESTNDVPH<br>DRPDMVELHRRAFDGLAAPFSEFLGTACADWVIVDVFHHWAAAAA<br>LEHKVPCAMMLLGSAHMIASIADRRLERAETESPAAAGQGRPAAAP<br>TFEVARMKLIRTKGSSGMSLAERFSLTLSRSSLVVGRSCVEFEPETVP<br>LLSTLRGKPITFLGLMPPLHEGRREDGEDATVRWLDAQPAKSVVYV<br>ALGSEVPLGVEKVHELALGLELAGTRFLWALRKPTGVSDADLLPAG<br>FEERTRGRGVVATRWVPQMSILAHAAVGAFLTHCGWNSTIEGLMFG<br>HPLIMLPIFGDQGPNARLIEAKNAGLQVARNDGDGSFDREGVAAAIR<br>AVAVEEESSKVFQAKAKKLQEIVADMACHERYIDGFIQQLRSYKDG<br>SGANAERMITRVHSQRERLNETLVSERNEVLALLSRVEAKGKGILQQ<br>NQIIAEFEALPEQTRKKLEGGPFFDLLKSTQEAIVLPPWVALAVRPRP<br>GVWEYLRVNLHALVVEELQPAEFLHFKEELVDGVKNGNFTLELDFE<br>PFNASIPRPTLHKYIGNGVDFLNRHLSAKLFHDKESLLPLLKFLRLHS<br>HQGKNLMLSEKIQNLNTLQHTLRKAEEYLAELKSETLYEEFEAKFEE<br>IGLERGWGDNAERVLDMIRLLLDLLEAPDPCTLETFLGRVPMVFNV<br>VILSPHGYFAQDNVLGYPDTGGQVVYILDQVRALEIEMLQRIKQQGL<br>NIKPRILILTRLLPDAVGTTCGERLERVYDSEYCDILRVPFRTEKGIVR<br>KWISRFEVWPYLETYTEDAAVELSKELNGKPDLIIGNYSDGNLVASL<br>LAHKLGVTQCTIAHALEKTKYPDSDIYWKKLDDKYHFSCQFTADIFA<br>MNHTDFIITSTFQEIAGSKETVGQYESHTAFTLPGLYRVVHGIDVFDP<br>KFNIVSPGADMSIYFPYTEEKRRLTKFHSEIEELLYSDVENKEHLCVL<br>KDKKKPILFTMARLDRVKNLSGLVEWYGKNTRLRELANLVVVGGD<br>RRKESKDNEEKAEMKKMYDLIEEYKLNGQFRWISSQMDRVRNGEL<br>YRYICDTKGAFVQPALYEAFGLTVVEAMTCGLPTFATCKGGPAEIIV<br>HGKSGFHIDPYHGDQAADTLADFFTKCKEDPSHWDEISKGGLQRIEE<br>KYTWQIYSQRLLTLTGVYGFWKHVSNLDRLEARRYLEMFYALKYR<br>PLAQAVPLAQDD (SEQ ID NO: 10) |
| HV1-AtSUS1<br>fusion enzyme,<br>amino acid | MDGNSSSPLHVVICPWLALGHLLPCLDIAERLASRGHRVSFVSTPR<br>NIARLPPLRPAVAPLVDFVALPLPHVDGLPEGAESTNDVPYDKFELH<br>RKAFDGLAAPFSEFLRAACAEGAGSRPDWLIVDTFHHWAAAAAVE<br>NKVPCVMLLLGAATVIAGFARGVSEHAAAAVGKERPAAEAPSFETE<br>RRKLMTTQNASGMTVAERYFLTLMRSDLVAIRSCAEWEPESVAALT<br>TLAGKPVVPLGLLPPSPEGGRGVSKEDAAVRWLDAQPAKSVVYVAL<br>GSEVPLRAEQVHELALGLELSGARFLWALRKPTDAPDAAVLPPGFEE<br>RTRGRGLVVTGWVPQIGVLAHGAVAAFLTHCGWNSTIEGLFGHPL<br>IMLPISSDQGPNARLMEGRKVGMQVPRDESDGSFRREDVAATVRAV<br>AVEEDGRRVFTANAKKMQEIVADGACHERCIDGFIQQLRSYKAGSG<br>ANAERMITRVHSQRERLNETLVSERNEVLALLSRVEAKGKGILQQN<br>QIIAEFEALPEQTRKKLEGGPFFDLLKSTQEAIVLPPWVALAVRPRPG<br>VWEYLRVNLHALVVEELQPAEFLHFKEELVDGVKNGNFTLELDFEP |

TABLE 1-continued

Examples of enzymes used for synthesizing rebaudiosides

| Name | Sequences |
|---|---|
| | FNASIPRPTLHKYIGNGVDFLNRHLSAKLFHDKESLLPLLKFLRLHSH
QGKNLMLSEKIQNLNTLQHTLRKAEEYLAELKSETLYEEFEAKFEEI
GLERGWGDNAERVLDMIRLLLDLLEAPDPCTLETFLGRVPMVFNVV
ILSPHGYFAQDNVLGYPDTGGQVVYILDQVRALEIEMLQRIKQQGLN
IKPRILILTRLLPDAVGTTCGERLERVYDSEYCDILRVPFRTEKGIVRK
WISRFEVWPYLETYTEDAAVELSKELNGKPDLIIGNYSDGNLVASLL
AHKLGVTQCTIAHALEKTKYPDSDIYWKKLDDKYHFSCQFTADIFA
MNHTDFIITSTFQEIAGSKETVGQYESHTAFTLPGLYRVVHGIDVFDP
KFNIVSPGADMSIYFPYTEEKRRLTKFHSEIEELLYSDVENKEHLCVL
KDKKKPILFTMARLDRVKNLSGLVEWYGKNTRLRELANLVVVGGD
RRKESKDNEEKAEMKKMYDLIEEYKLNGQFRWISSQMDRVRNGEL
YRYICDTKGAFVQPALYEAFGLTVVEAMTCGLPTFATCKGGPAEIIV
HGKSGFHIDPYHGDQAADTLADFFTKCKEDPSHWDEISKGGLQRIEE
KYTWQIYSQRLLTLTGVYGFWKHVSNLDRLEARRYLEMFYALKYR
PLAQAVPLAQDD (SEQ ID NO: 11) |

Brazzein

Brazzein is natural peptide sweetener which was first isolated from the fruit of Pentadiplandra brazzeana Baillon found in West Africa. Brazzein is 500-2000 times sweeter than sucrose on a weight basis. There are three forms of brazzein protein identified in fruit. The major form brazzein has pyroglutamic acid at N-terminus has 54 amino acid residues (pyrE-bra). The minor form brazzein (53 aa) has identical amino acid sequence except no N-terminal pyroglutamic acid (des-pyrE-bra). PyrE-bra is 500 times sweeter than 10% sucrose solution and des-pyrE-bra is twice sweeter than pyre-bra. Brazzein is heat stable and its sweet taste remains after incubation at 98° C. for 2 hours and at 80° C. for 4.5 hours in the pH range of 2.5-8.0. Brazzein has four intramolecular disulfide bonds which is related to its heat-stability.

Brazzein may be purified from Pentadiplandra brazzeana Baillon fruit extracts, or recombinantly or synthetically produced. In some embodiments, brazzein is produced from a cultured, genetically modified microorganism. In some embodiments, brazzein is produced from a cultured, genetically modified host cell (e.g., a genetically modified yeast cell), in which multiple strategies are employed to increase brazzein folding, secretion and/or production.

In some embodiments, brazzein is produced by culturing a cell comprising a nucleic acid encoding a polypeptide comprising brazzein (SEQ ID NO: 12), or a polypeptide that is at least 70% (e.g., at least 70%, at least 75%, at least 80%, at least 85%, at least 90%, at least 99%, or at least 99%) identical to the amino acid sequence of SEQ ID NO: 12. In some embodiments, the nucleic acid encodes more than one copy of brazzein. In some embodiments, the nucleic acid encodes a polypeptide comprising tandem repeats of brazzein (e.g., each polypeptide comprises at least 2, at least 3, at least 4, at least 5, at least 6, at least 7, at least 8, at least 9, at least 10, at least 11, at least 12, at least 13, at least 14, at least 15, at least 16, at least 17, at least 18, at least 19, or at least 20 repeats of brazzein). In some embodiments, tandem repeats of brazzein are separated by a peptide spacer. In some embodiments, the peptide spacer is cleaved by a protease (e.g., a protease expressed by the genetically modified microorganism). In some embodiments, the peptide spacer is cleaved by a protease in vivo (i.e., in the genetically modified organism after translation of a brazzein-comprising polypeptide), or in vitro (e.g., by treating a brazzein-comprising polypeptide isolated from the genetically modified microorganism with a protease). In some embodiments, each spacer comprises the amino acid sequence of any one of SEQ ID NOs: 13, 14, or 15.

In some embodiments, the nucleic acid encoding a polypeptide comprising brazzein is a high copy plasmid. In some embodiments, the nucleic acid encoding a polypeptide comprising brazzein is a chromosome of the genetically modified microorganism. In some embodiments, expression of the polypeptide comprising brazzein is regulated by a constitutively active promotor sequence, or an inducible promotor sequence. In some embodiments, the promotor sequence is a promotor sequence that is known to be sufficient for the expression of an operably linked nucleotide sequence in the genetically modified microorganism. In some embodiments, the promotor comprises an AOX1 promoter and the genetically modified microorganism is a yeast cell (e.g., a genetically modified yeast cell). In some embodiments, the nucleic acid encoding a polypeptide comprising brazzein is chromosomally integrated (e.g., into a HIS4 locus of a recombinant yeast cell).

In some embodiments, the nucleic acid sequence encoding brazzein further comprises a transcription terminator sequence. In some embodiments, the transcription terminator sequence is a transcription terminator sequence that is known to be sufficient for the termination of transcription in the genetically modified microorganism. In some embodiments, the transcription terminator sequence comprises an AOX1 terminator and the genetically modified microorganism is a yeast cell (e.g., a genetically modified yeast cell).

In some embodiments, the nucleic acid sequence encoding brazzein further encodes a signal sequence that promotes the secretion of brazzein from the genetically modified host cell. A "signal peptide" refers to a short peptide present at the N-terminus of a protein destined to be secreted from a cell. In some embodiments, a signal peptide comprises a stretch of hydrophobic amino acid residues that facilitate the translocation of a newly synthesized peptide or protein to the cell membrane for subsequent secretion through the cell membrane. In some embodiments, a signal peptide is 5-20 (e.g., 5, 6, 7, 8, 9, 10, 11, 12, 13, 14, 15, 16, 17, 18, 19, or 20) amino acids in length. A protein with a signal peptide can be encapsulated in a secretory vesicle and trafficked to the cell membrane via the secretory pathway. The mechanism by which a newly synthesized peptide or protein comprising a signal peptide is secreted from the cell will be known by a person having ordinary skill in the art.

In some embodiments, brazzein is co-expressed with one or more chaperone proteins that facilitate intramolecular disulfide bond formation, folding, and/or secretion. In some embodiments, the one or more chaperones are selected from: PDI, PDI1, HAC1, ERO1, ERO2, ERV1, ERV2, ERO1, KAR2, SEC1, SLY1, and GPX1. The chaperone may be a chaperone from the same species as the genetically modified host cell (e.g., a genetically modified yeast cell)

TABLE 2

Examples of brazzein protein and spacers useful for brazzein synthesis

| Name | Sequences |
|---|---|
| Brazzein | QDKCKKVYENYPVSKCQLANQCNYDCKLDKHARSGECFY DEKRNLQCICDYCEY (SEQ ID NO: 12) |
| Protease-cleavable spacer 1 | KR (SEQ ID NO: 13) |
| Protease-cleavable spacer 2 | KREA (SEQ ID NO: 14) |
| Protease-cleavable spacer 3 | KREAEAEAEAEA (SEQ ID NO: 15) |

Thaumatin

Thaumatin is a group of intensely sweet basic proteins isolated from the fruit of Thaumatococcus danielli (West African Katemfe fruit). In some embodiments, any one of the compositions provided herein further comprise thaumatin. In some embodiments, thaumatin is present in the composition in an amount that is between 1-25, 1-20, 1-10, 1-6, 1-5, 1-2, 2-25, 2-20, 2-10, 2-6, 2-5, 5-25, 5-20, 5-10, 5-6, 6-25, 6-20, 6-10 or 10-25 ppm. In some embodiments, thaumatin is present in the composition in an amount that is about 1, 2, 5, 6, 10, 20, 25 ppm thaumatin. In some embodiments, thaumatin is present in the composition in an amount that is about 2-25 ppm. In some embodiments, thaumatin is present in the composition in an amount that is about 2-20 ppm. In some embodiments, thaumatin is present in the composition in an amount that is about 2-6 ppm.

Caffeine

In some embodiments, any one of the compositions provided herein further comprises caffeine. In some embodiments, caffeine is present in the composition in an amount that is between 10-800, 10-600, 10-200, 10-100, 100-800, 100-600, 100-200, 200-600, 200-800 or 600-800 ppm. In some embodiments, caffeine is present in the composition in an amount that is about 10, 100, 200, 600 or 800 ppm caffeine.

Taurine

In some embodiments, any one of the compositions provided herein further comprise taurine. In some embodiments, taurine is present in the composition in an amount that is between 500 and 20000 (e.g., 500-18000, 500-16000, 500-14000, 500-12000, 500-10000, 500-5000, 5000-20000%, 5000-18000, 5000-16000, 5000-14000, 5000-12000, 5000-10000, 10000-20000, 10000-18000, 10000-16000, 10000-14000, 10000-12000, 12000-20000, 12000-18000, 12000-16000, 12000-14000, 16000-20000, or 16000-18000) ppm. In some embodiments, taurine is present in the composition in an amount that is about 500 ppm, 5000 ppm, 10000 ppm, 12000 ppm, 14000 ppm, 16000 ppm, 18000 ppm or 20000 ppm taurine.

Niacin (Vitamin B3)

In some embodiments, any one of the compositions provided herein further comprises niacin (Vitamin B3). In some embodiments, niacin (Vitamin B3) is present in the composition in an amount that is between 1-800, 1-750, 1-700, 1-680, 1-500, 1-300, 1-250, 1-150, 1-100, 1-75, 1-50, 1-25, 1-5, 5-800, 5-750, 5-700, 5-680, 5-500, 5-300, 5-250, 5-150, 5-100, 5-75, 5-50, 5-25, 10-800, 10-750, 10-700, 10-680, 10-500, 10-300, 10-250, 10-150, 10-100, 10-75, 10-50, 10-25, 50-800, 50-750, 50-700, 50-680, 50-500, 50-300, 50-250, 50-150, 50-100, 50-75, 75-800, 75-750, 75-700, 75-680, 75-500, 75-300, 75-250, 75-150, 75-100, 150-800, 150-750, 150-700, 150-680, 150-500, 150-300, 150-250, 300-800, 300-750, 300-700, 300-680, 300-500, or 680-800 ppm. In some embodiments, niacin is present in the composition in an amount that is about 1, 5, 75, 150, 300, 680, 800 ppm. In some embodiments, niacin is present in the composition in an amount that is between 5 and 680 ppm.

Pyridoxine (Vitamin B6)

In some embodiments, any one of the compositions provided herein further comprises pyridoxine (Vitamin B6). In some embodiments, pyridoxine (Vitamin B6) is present in the composition in an amount that is between 1-200, 1-180, 1-100, 1-50, 1-5, 5-200, 5-180, 5-100, 5-50, 50-200, 50-180, 50-100, 100-200, 100-180, or 180-200 ppm. In some embodiments, pyridoxine is present in the composition in an amount that is about 1, 5, 50, 100, 180, or 200 ppm.

Pantothenic Acid (Vitamin B5)

In some embodiments, any one of the compositions provided herein further comprises pantothenic acid (Vitamin B5). In some embodiments, pantothenic acid is present in the composition in an amount that is between 1-200, 1-120, 1-100, 1-50, 1-5, 5-200, 5-120, 5-100, 5-50, 50-200, 50-120, 50-100, 100-200, 100-120, or 120-200 ppm. In some embodiments, pantothenic acid is present in the composition in an amount that is about 1, 5, 50, 100, 180, or 200 ppm. In some embodiments, pantothenic acid is present in the composition in an amount that is between 5 and 120 ppm.

Cobalamin (Vitamin B12)

In some embodiments, any one of the compositions provided herein further comprises cobalamin (Vitamin B12). In some embodiments, cobalamin is present in the composition in an amount that is between 1-100, 1-80, 1-50, 1-25, 1-5, 5-100, 5-80, 5-50, 5-25, 25-100, 25-80, 25-50, 50-80, 50-100, or 80-100 ppm. In some embodiments, cobalamin is present in the composition in an amount that is about 1, 5, 25, 50, 80, or 100 ppm.

Ferulic Acid

Ferulic acid is a hydrocinnamic acid that is abundant in plant cells, particularly as a component of pectin, lignin, and plant cell walls. In nature, ferulic acid serves as a precursor for the synthesis of many other organic compounds. It is frequently found in edible plants such as corn, rice, bamboo shoots, cereals, flaxseed, tea leaves, and legumes. Ferulic acid is common in plant-based foods such as rice bran oil, breads containing flaxseed, and rye bread. Ferulic acid acts as an antioxidant, and can therefore protect the Rebaudiosides with which it is formulated from oxidation, which results in undesired off-flavors. Methods of producing ferulic acid are described in U.S. Pat. No. 5,288,902, which methods are incorporated herein by reference. A brief description, which provides an overview of exemplary methods is provided.

Briefly, U.S. Pat. No. 5,288,902 provides a method of manufacturing ferulic acid by hydrolyzing oryzanol, which method is incorporated by reference. Briefly, waste material, by-product or a crude oryzanol can be subjected to hydrolysis in the presence of an alkali so as to manufacture ferulic acid. In general, sodium hydroxide or potassium hydroxide can be used as an alkali in the step of hydrolyzing oryzanol. It is also possible to use other alkaline compounds such as LiOH, RuOH, $Na_2CO_3$, $K_2CO_3$ and $NaHCO_3$. In the next step, a solution containing an alkali salt of ferulic acid can be acidified with, for example, a dilute sulfuric acid so as to precipitate ferulic acid in the solution, followed by separating the precipitated ferulic acid by mean of filtration. The crude ferulic acid separated by filtration can be dissolved in hot water (about 90 to 100° C.) and, then, the system can be cooled so as to permit precipitation of ferulic acid. A pure trans-ferulic acid can be obtained, which refers to the naturally occurring form of ferulic acid.

Orally Consumable Products

Any one of the compositions (e.g., formulations) described herein may be used in a consumable (e.g., an orally consumable product). In some embodiments, the consumable comprises about 0.2-0.3 wt. % (e.g., 0.2, 0.25, or 0.3 wt. %) of the composition, on an anhydrous wt./wt. basis. Non-limiting examples of a consumable include: oral compositions, pharmaceutical compositions, beverages, food compositions, amino feed products, liquids, powder products, and table-top sweeteners.

In some embodiments, liquid consumables comprising any one of the compositions described herein may further comprise a solvent (e.g., a liquid, food grade and/or organic solvent). In some embodiments, the solvent comprises ethyl alcohol, propylene glycol, glycerin, ferulic acid, or water and/or combinations thereof. In some embodiments, the solvent is propylene glycol or ferulic acid. In some embodiments, powder consumables comprising any one of the compositions described herein further comprises dextrin and/or maltodextrin.

In some embodiments, table-top sweeteners comprising any one of the compositions described herein is in a product form, e.g., a powder that may be added to a beverage (e.g., tea or coffee).

Any one of the compositions (e.g., formulations) described herein can be used for the production of baked goods, dairy products, spreads, margarines, sports products, nutrition bars and infant formulas, feed, aquaculture, nutraceuticals, or oral hygiene products (e.g., toothpaste or mouthwash) comprising the composition of the present disclosure.

In some embodiments, any one of the compositions (e.g., formulations) described herein may be used for creating or enhancing a sweetening effect of an orally consumable products. In some embodiments, methods of creating or enhancing a sweetening effect of an orally consumable product comprises adding an amount of any one of the formulations described herein sufficient to produce the desired degree of sweetness to the orally consumable product.

Accordingly, other aspects of the present disclosure provide orally consumable products comprising any one of the compositions (e.g., formulations) described herein. In some embodiments, the orally consumable product is selected from the group consisting of a food composition, a beverage product, a dietary supplement, a nutraceutical, an edible gel mix, an edible gel composition, a pharmaceutical composition, a dental and oral hygiene composition, and an animal feed.

In some embodiments, the orally consumable product comprising any one of the compositions (e.g., formulations) described herein is a dental and oral hygiene composition. Examples of suitable dental and oral hygiene compositions can be, for example, toothpastes, tooth polishes, dental floss, mouthwashes, mouth rinses, dentrifices, mouth sprays, mouth refreshers, plaque rinses, dental pain relievers, and the like. In some embodiments, the dental and oral hygiene composition is a toothpaste.

In some embodiments, the orally consumable product comprising any one of the compositions (e.g., formulations) described herein is a pharmaceutical composition. In some embodiments, the pharmaceutical composition comprises any one of the formulations described herein, and further comprises one or more pharmaceutically acceptable excipients. In some embodiments, pharmaceutical compositions of the present disclosure can be used to formulate pharmaceutical drugs containing one or more active agents that exert a biological effect. Accordingly, in some embodiments, pharmaceutical compositions of the present disclosure can contain one or more active agents that exert a biological effect. Suitable active agents are well known in the art (e.g., The Physician's Desk Reference). Such compositions can be prepared according to procedures well known in the art, for example, as described in Remington's Pharmaceutical Sciences, Mack Publishing Co., Easton, Pa., USA. In an embodiment of any one of the methods or compositions provided herein, the pharmaceutical composition comprises any one of the formulations described herein and a pharmaceutical, and is in an encapsulated form. In an embodiment of any one of the methods or compositions provided herein, the pharmaceutical composition comprises any one of the formulations described herein and a pharmaceutical, and is in a liquid or gel that is encapsulated. Encapsulation can be achieved by spray drying, oven dying, glass encapsulation, etc.

In some embodiments, the orally consumable product comprising any one of the compositions (e.g., formulations) described herein is a beverage (e.g., a carbonated beverage product or a non-carbonated beverage product). The beverage can also be, for example, a soft drink, a fountain beverage, a frozen beverage; a ready-to-drink beverage; a frozen and ready-to-drink beverage, coffee, tea, a dairy beverage, a powdered soft drink, a liquid concentrate, flavored water, enhanced water, fruit juice, a fruit juice flavored drink, a sport drink, or an energy drink, isotonic drinks, low-calorie drinks, zero-calorie drinks, vegetable juices, juice drinks, dairy drinks, yoghurt drinks, alcohol beverages, protein beverages, dairy beverages, or plant-based beverages. In an embodiment, any one of the beverages as described herein can be in powdered form (i.e., a powdered beverage) and may be reconstituted subsequently, such as by a consumer. In an embodiment, any one of the beverages as described herein can be in liquid form.

In some embodiments, the beverage of the present disclosure comprises any one of the compositions (e.g., formulations) described herein, and further comprises one or more beverage ingredients such as, for example, acidulants, fruit juices and/or vegetable juices, pulp, etc., flavorings, coloring, preservatives, vitamins, minerals, electrolytes, erythritol, tagatose, glycerine, and carbon dioxide. The beverages described herein may be provided in any suitable form, such as a beverage concentrate and a carbonated, ready-to-drink beverage.

In certain embodiments, the beverages of the present disclosure can have any of numerous different specific formulations or constitutions. The formulation of a beverage of the present disclosure can vary to a certain extent, depending upon such factors as the product's intended market segment, its desired nutritional characteristics, flavor profile, and the like. For example, in certain embodiments, it can generally be an option to add further ingredients to the formulation of a particular beverage product. For example, additional (i.e., more and/or other) sweeteners can be added, flavorings, electrolytes, vitamins, fruit juices or other fruit products, tastents, masking agents and the like, flavor enhancers, and/or carbonation typically may be added to any such formulations to vary the taste, mouthfeel, nutritional characteristics, etc.

In some embodiments, the orally consumable product comprising any one of the compositions (e.g., formulations) described herein is a food composition. A "food composition" refers to any solid or liquid ingestible material that can, but need not, have a nutritional value and be intended for consumption by humans and animals. Examples of suitable food product compositions can be, for example, confectionary compositions, such as candies, mints, fruit flavored drops, cocoa products, chocolates, and the like; condiments, such as ketchup, mustard, mayonnaise, and the like; chewing gums; cereal compositions; baked goods, such as breads, cakes, pies, cookies, and the like; dairy products, such as milk, cheese, cream, ice cream, sour cream, yogurt, sherbet, and the like; tabletop sweetener compositions; soups; stews; convenience foods; meats, such as ham, bacon, sausages, jerky, and the like; gelatins and gelatin-like products such as jams, jellies, preserves, and the like; fruits; vegetables; egg products; icings; syrups including molasses; snacks; nut meats and nut products; and animal feed. Other non-limiting examples of food compositions include bakery products, cookies, biscuits, baking mixes, cereals, confectioneries, candies, toffees, chewing gum, dairy products, flavored milk, yoghurts, flavored yoghurts, cultured milk, soy sauce and other soy base products, salad dressings, mayonnaise, vinegar, frozen-desserts, meat products, fish-meat products, bottled and canned foods, tabletop sweeteners, fruits and vegetables, herbs, spices and seasonings, natural and synthetic flavors, and flavor enhancers, such as monosodium glutamate, prepared packaged products, such as dietetic sweeteners, liquid sweeteners, granulated flavor mixes, pet foods, livestock feed, tobacco, and materials for baking applications, such as powdered baking mixes for the preparation of breads, cookies, cakes, pancakes, donuts and the like.

In some embodiments, the food composition is selected from the group consisting of spreads, margarines, sports products, nutrition bars, infant formulas, mayonnaise, confectionary composition, a condiment, a chewing gum, a cereal composition, a baked good, a dairy product, and a tabletop sweetener composition. In some embodiments, the food composition is a food composition included in Table 3.

In some embodiments, the food composition is a yogurt. In some embodiments, the food composition is frozen. In some embodiments, the food composition is ice cream.

TABLE 3

Examples of orally consumable compositions

| BEVERAGES | DAIRY PRODUCTS | BAKING | PREPARED FOODS | OIL BASED PRODUCTS | SNACK FOODS |
|---|---|---|---|---|---|
| Soy milks | Cheeses | Breads | Entrees | Salad | Granola |
| Smoothies | Cream | Rolls | Side Dishes | Dressing | Cereals |
| Fruit Juices | Cheeses | Cakes | Soups | Mayonnaise | Snack/Nutritional |
| Dairy Drinks | Sour Cream | Pastries | Sauces | Margarine/ | Bars |
|  | Yogurt | Cookies | Processed | Spreads | Confectionary |
|  | Yogurt | Crackers | Meats | Shortening |  |
|  | Drinks | Muffins | Processed |  |  |
|  | Non-Dairy |  | Fish |  |  |
|  | Creamers |  | Pet Foods |  |  |
|  | Dips |  |  |  |  |

Food compositions described herein include any preparations or compositions which are suitable for consumption and are used for nutrition or enjoyment purposes. They are generally products which are intended to be eaten by humans or animals and introduced into the body through the mouth, to remain there for a certain time and then either be eaten (e.g. ready-to-eat foodstuffs or feeds, see also herein below) or removed (e.g. chewing gums). Such products include any substances or products which in the processed, partially processed or unprocessed state are to be ingested by humans or animals. They also include substances which are added to orally consumable products during their manufacture, preparation or treatment and which are intended to be introduced into the human or animal oral cavity.

The food compositions according to the disclosure also include substances which in the unchanged, treated or prepared state are to be swallowed by a human or animal and then digested; in this respect, the orally consumable products according to the disclosure also include casings, coatings or other encapsulations which are to be swallowed at the same time or which may be expected to be swallowed. The expression "food composition" covers ready-to-eat foodstuffs, beverages and feeds, that is to say foodstuffs, beverages or feeds that are already complete in terms of the substances that are important for the taste. The expressions "ready-to-eat foodstuff" and "ready-to-eat feed" also include drinks as well as solid or semi-solid ready-to-eat foodstuffs or feeds. Examples which may be mentioned are frozen products, which must be thawed and heated to eating temperature before they are eaten. Products such as yoghurt or ice-cream as well as chewing gums or hard caramels are also included among the ready-to-eat foodstuffs or feeds of the current disclosure.

In some embodiments, the orally consumable product comprising any one of the compositions (e.g., formulations) described herein is an animal feed product for livestock, companion animals and/or aquaculture. In some embodiments, the livestock is cattle, swine and/or poultry. In some embodiments, the animal feed product further comprises a hydrocolloid or erythritol.

In some embodiments, any one of the orally consumable products described herein further comprises a component selected from the group consisting of sucrose, aroma compounds, flavoring compounds and mixtures thereof. In some embodiments, any one of the orally consumable products described herein further comprises tocopherols in an amount of at least about 5 ppm. In some embodiments, any one of the orally consumable products described herein further comprises at least one stabilizing agent selected from the group consisting of citric acid, sodium benzoate, t-butyl hydroquinone, ascorbyl palmitate, propyl gallate, and combinations thereof. In some embodiments, any one of the orally consumable products described herein further comprises a moisture containing ingredient. In some embodiments, the moisture ingredient is an emulsion. In some embodiments, any one of the orally consumable products described herein further comprises a chelating agent.

In some embodiments, any one of the orally consumable products described herein can also have at least one additional sweetener. The at least one additional sweetener can be a natural high intensity sweetener, for example. The additional sweetener can be selected from a *stevia* extract, a steviol glycoside, stevioside, rebaudioside A, rebaudioside B, rebaudioside C, rebaudioside D, rebaudioside E, rebaudioside F, dulcoside A, rubusoside, steviolbioside, sucrose, high fructose corn syrup, fructose, glucose, xylose, arabinose, rhamnose, erythritol, xylitol, mannitol, sorbitol, inositol, AceK, aspartame, neotame, sucralose, saccharine, naringin dihydrochalcone (NarDHC), neohesperidin dihydrochalcone (NDHC), rubusoside, mogroside IV, siamenoside I, mogroside V, monatin, thaumatin, monellin, L-alanine, glycine, Lo Han Guo, hernandulcin, phyllodulcin, trilobtain, and combinations thereof. In some embodiments, any one of the orally consumable products described herein does not have a sweetener in addition to a formulation provided herein.

In some embodiments, any one of the orally consumable products described herein can also have at least one additive. The additive can be, for example, a carbohydrate, a polyol, an amino acid or salt thereof, a polyamino acid or salt thereof, a sugar acid or salt thereof, a nucleotide, an organic acid, an inorganic acid, an organic salt, an organic acid salt, an organic base salt, an inorganic salt, a bitter compound, a flavorant, a flavoring ingredient, an astringent compound, a protein, a protein hydrolysate, a surfactant, an emulsifier, a flavonoids, an alcohol, a polymer, and combinations thereof.

As used herein, "dietary supplement(s)" refers to compounds intended to supplement the diet and provide nutrients, such as vitamins, minerals, fiber, fatty acids, amino acids, etc. that may be missing or may not be consumed in sufficient quantities in a diet. Any suitable dietary supplement known in the art may be used. Examples of suitable dietary supplements can be, for example, nutrients, vitamins, minerals, fiber, fatty acids, herbs, botanicals, amino acids, and metabolites.

As used herein, "nutraceutical(s)" refers to compounds, which includes any food or part of a food that may provide medicinal or health benefits, including the prevention and/or treatment of disease or disorder (e.g., fatigue, insomnia, effects of aging, memory loss, mood disorders, cardiovascular disease and high levels of cholesterol in the blood, diabetes, osteoporosis, inflammation, autoimmune disorders, etc.). Any suitable nutraceutical known in the art may be used. In some embodiments, nutraceuticals can be used as supplements to food and beverages and as pharmaceutical formulations for enteral or parenteral applications which may be solid formulations, such as capsules or tablets, or liquid formulations, such as solutions or suspensions.

In some embodiments, dietary supplements and nutraceuticals can further contain protective hydrocolloids (such as gums, proteins, modified starches), binders, film-forming agents, encapsulating agents/materials, wall/shell materials, matrix compounds, coatings, emulsifiers, surface active agents, solubilizing agents (oils, fats, waxes, lecithins, etc.), adsorbents, carriers, fillers, co-compounds, dispersing agents, wetting agents, processing aids (solvents), flowing agents, taste-masking agents, weighting agents, jellifying agents, gel-forming agents, antioxidants and antimicrobials.

As used herein, a "gel" refers to a colloidal system in which a network of particles spans the volume of a liquid medium. Although gels mainly are composed of liquids, and thus exhibit densities similar to liquids, gels have the structural coherence of solids due to the network of particles that spans the liquid medium. For this reason, gels generally appear to be solid, jelly-like materials. Gels can be used in a number of applications. For example, gels can be used in foods, paints, and adhesives. Gels that can be eaten are referred to as "edible gel compositions." Edible gel compositions typically are eaten as snacks, as desserts, as a part of staple foods, or along with staple foods. Examples of suitable edible gel compositions can be, for example, gel desserts, puddings, jams, jellies, pastes, trifles, aspics, marshmallows, gummy candies, and the like. In some embodiments, edible gel mixes generally are powdered or granular solids to which a fluid may be added to form an edible gel composition. Examples of suitable fluids can be, for example, water, dairy fluids, dairy analogue fluids, juices, alcohol, alcoholic beverages, and combinations thereof. Examples of suitable dairy fluids can be, for example, milk, cultured milk, cream, fluid whey, and mixtures thereof. Examples of suitable dairy analogue fluids can be, for example, soy milk and non-dairy coffee whitener.

As used herein, the term "gelling ingredient" refers to any material that can form a colloidal system within a liquid medium. Examples of suitable gelling ingredients can be, for example, gelatin, alginate, carrageenan, gum, pectin, konjac, agar, food acid, rennet, starch, starch derivatives, and combinations thereof. It is well known to those in the art that the amount of gelling ingredient used in an edible gel mix or an edible gel composition can vary considerably depending on a number of factors such as, for example, the particular gelling ingredient used, the particular fluid base used, and the desired properties of the gel.

Gel mixes and gel compositions of the present disclosure can be prepared by any suitable method known in the art. In some embodiments, edible gel mixes and edible gel compositions of the present disclosure can be prepared using other ingredients in addition to the gelling agent. Examples of other suitable ingredients can be, for example, a food acid, a salt of a food acid, a buffering system, a bulking agent, a sequestrant, a cross-linking agent, one or more flavors, one or more colors, and combinations thereof.

In certain embodiments that can be combined with any of the preceding embodiments, the orally consumable products can further include one or more additives selected from a carbohydrate, a polyol, an amino acid or salt thereof, a poly-amino acid or salt thereof, a sugar acid or salt thereof, a nucleotide, an organic acid, an inorganic acid, an organic salt, an organic acid salt, an organic base salt, an inorganic salt, a bitter compound, a flavorant, a flavoring ingredient, an astringent compound, a protein, a protein hydrolysate, a surfactant, an emulsifier, a flavonoids, an alcohol, a polymer, and combinations thereof.

The compositions can be used "as-is" or in combination with other sweeteners, flavors and food ingredients. For use in domestic applications, particularly as a replacement for sugar in beverage sweetening, it is desirable in some embodiments that the compositions according to the present disclosure include a bulking agent so that an equivalent sweetness to that provided by, for example, a teaspoonful of sugar is provided by an amount which can conveniently be handled. Any suitable soluble and edible material can be used, for example, a carbohydrate such as sucrose itself, especially transformed sugar of low density, dextrose, or sorbitol or a dextrin such as spray-dried maltodextrin. While the substances will add to the caloric value of the composition, the total will still be considerably smaller than that of the amount of sugar providing an equivalent sweetness. Alternatively, the sweetening composition may be prepared in a tablet form.

Compositions provided herein are usually stable at pH values in the range of from 2 to 10, especially 3 to 8. Dry compositions, such as powders, granules or tablets can be stable indefinitely when stored under dry conditions at room temperature. Compositions in the form of aqueous solutions can be stable indefinitely when frozen. If a preservative such as benzoic acid or its salts, sulphur dioxide or sodium meta-bisulphite is added to such a composition, it may be stored almost indefinitely at room temperature. The compositions therefore can have a long shelf-life when incorporated into soft drinks or fruit juices, or other similar food compositions containing preservatives. The limitation on the use of sugar may also positively contribute to the long shelf-life of the products provided herein.

Food compositions comprising the inventive formulations provided herein may further comprise components selected from the group consisting of additional sweeteners or sweet-tasting compounds, aroma compounds, flavoring compounds, and their mixtures. Such additives may also specifically include hydrocolloids such as pectins, gelatin, carrageenan, or gums (Arabic, guar, locust bean) for dressings, jams, jellies, confections and the like. Other additives to food, feed or beverage compositions include chelating agents whose addition is designed to protect against enzymatic reactions and may specifically include ethylenediaminetetraacetic acid (EDTA).

Aroma compounds and flavor enhancing agents are well known in the art can be added to the compositions provided herein. These flavoring agents can be chosen from synthetic flavoring liquids and/or oils derived from plants leaves, flowers, or fruits. Representative flavoring liquids include: artificial, natural or synthetic fruit flavors such as *eucalyptus*, lemon, orange, banana, grape, lime, apricot, and grapefruit oils, fruit essences including apple, strawberry, cherry, orange, pineapple, and so forth, bean- and nut-derived flavors such as coffee, cocoa, cola, hazelnut, peanut or almond, and root-derived flavors such as licorice or ginger.

The following examples illustrate various embodiments of the present disclosure. It will be understood that the present disclosure is not limited to the materials, proportions, conditions and procedures set forth in the examples, which are only illustrative.

EXAMPLES

Example 1: Formulations Comprising Rebaudioside M and Brazzein

Formulations comprising brazzein and rebaudiosides were developed and their relative sweetness was assessed. Sweetness was graded on a scale from 0 (no sweetness) to 15 (maximal sweetness) and assessed for the different formulations over a period of 7 days.

Sweetness scores for sucrose controls and formulations comprising Rebaudioside M (Reb M) are shown in Table 4. The addition of 25 ppm brazzein to a 5% sucrose solution slightly enhanced the perceived sweetness profile of the solution, and sweetness remained stable over the 7-day period. However, brazzein unexpectedly and synergistically enhanced the sweetness of a Reb M solution that was formulated with a sweetness equivalent (SE) of 5% sucrose, as compared to the combination of sucrose and brazzein. Sweetness of a Reb M solution with 25 ppm brazzein was substantially higher than the corresponding sucrose solution and remained higher throughout the 7-day testing period.

TABLE 4

Sweetness of solutions containing brazzein (BZ).

| Sweetener Solution | Day 1 | Day 4 | Day 5 | Day 6 | Day 7 |
|---|---|---|---|---|---|
| Sucrose (5%) | 5 | 5 | 5 | 5 | 5 |
| Sucrose (5%) + 25 ppm BZ | 6 | 6 | 6 | 6 | 6 |
| Reb M at SE of 5% sucrose | 5 | 5 | 5 | 5 | 5 |
| Reb M at SE of 5% sucrose + 25 ppm BZ | 8 | 7 | 7 | 7 | 7 |

Sweetness scores are on a scale of 0-15.

The formulations in Table 4 comprise Reb M and brazzein formulated in a liquid. A liquid formulated with Reb M and brazzein may comprise one or more solvents, such as propylene glycol and/or ferulic acid, to be used as a carrier of Reb M and brazzein. These results are expected to extend to solid formulations comprising Reb M and brazzein, in which maltodextrin may be used as a carrier. The sweetness of liquid or solid formulations comprising Reb M and brazzein may be further enhanced by the addition of another, chemically distinct sweetener, such as ferulic acid.

Example 2: Formulations Comprising Rebaudioside M, Brazzein and Other Steviol Glycosides Formulations comprising brazzein and rebaudiosides were developed and their relative flavor and sweetness were assessed. Sweetness and flavor were graded across different factors on a scale from 0 (minimum) to 9 (maximal) and assessed for the different formulations. Different factors tested include total aroma impact, sweet onset, sweet taste, sour taste, bitter taste, total flavor impact, brown spice flavor, citrus flavor, sweet aromatics, green/vegetative, sweet at 30 seconds (sec), sweet at 60 sec, sweet at 2 minutes (min), sweet at 3 min, astringency, and bitter at 90 sec.

The formulations tested were brazzein, Reb M, and Reb D (test 1) or brazzein and Reb M (test 3) or Reb M, Reb D, Reb E, Reb I and brazzein (test 2). The formulations were formulated in a liquid comprising cola flavor with phosphoric acid and Caramel IV. Reb M, and Reb D (test 1) was comparable to the sucralose control in terms of sweetness onset, total flavor, sweet aromatics, green/vegetative, bitter taste, sweet linger & astringency. Reb M, and Reb D (test 1) had slightly slower sweet onset and increased sweet at 60 seconds compare to the sucralose control. Reb M, Reb D, Reb E, Reb I and brazzein (test 2) was similar to Reb M, and Reb D (test 1) in terms of flavor and sweetness match. Brazzein and Reb M (test 3) was lower in flavor overall, and most different from the sucralose control (FIG. 1).

The results indicate that combinations of brazzein and rebaudiosides enhance the sweetness of liquid compositions, such as cola.

Example 3: Formulations Comprising Brazzein

Formulations comprising brazzein and chocolate were developed, and their relative flavor and sweetness were assessed. Sweetness and flavor were graded across different factors on a scale from 0 (minimum) to 9 (maximal) and assessed for the different formulations. Different factors tested include sweet taste, bitter taste, chocolate flavor, dairy flavor, sweet aromatics, and green/vegetative. The formulations tested comprise brazzein, Reb D, Reb E, Reb I, Reb M and chocolate compared to a control (chocolate comprising Reb D, Reb E, Reb I, and Reb M).

Figure 2A:
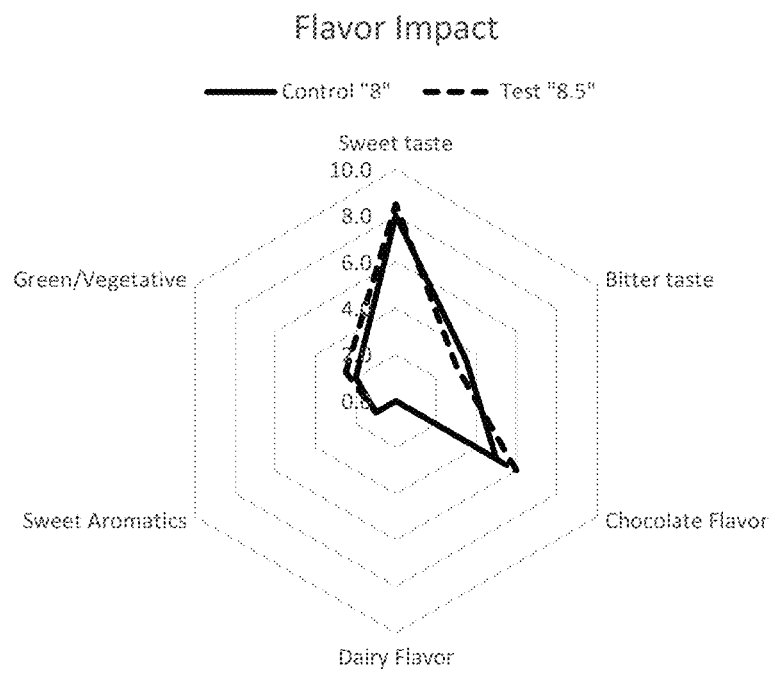
FIGS. 2A-2B show a line diagram of how different Brazzein and chocolate composition compared to control across different factors (FIG. 2A) and bar graphs of bitter and astringency outcomes for test (with Brazzein) and control (without Brazzein) (FIG. 2B).
Figure 2B:
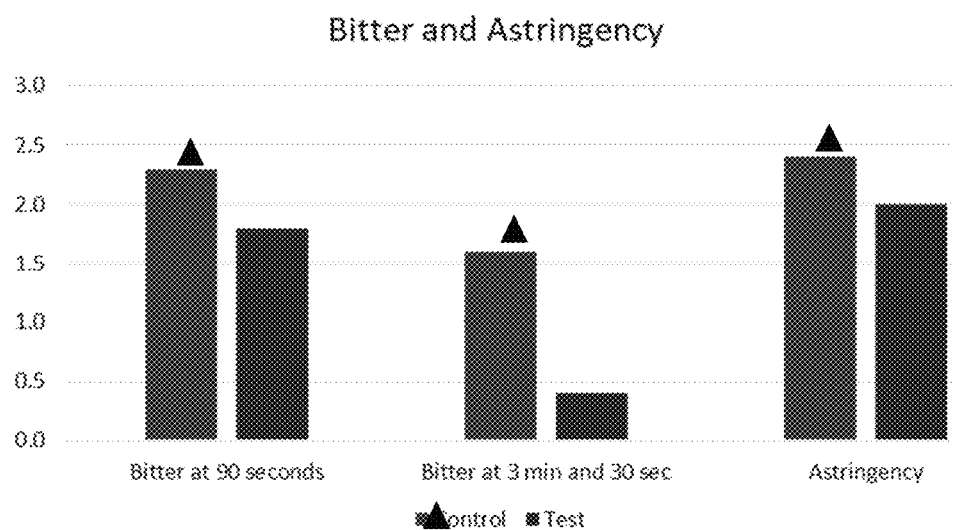

Results indicate that chocolate compositions including brazzein had enhanced chocolate flavor (FIG. 2A). Brazzein also decreased bitter taste at 120 seconds and astringency (FIG. 2B). The sweetness is enhanced by having the early onset and slow fade more like sugar than chocolate that is only sweetened with Reb D, Reb E, Reb I, and Reb M. Therefore, including brazzein in food compositions, such as chocolate, enhance the flavor and sweetness of the composition.

Example 4: Use of Preferred Embodiments of the Present Formulations in Liquid Cola FIG. 3A and FIG. 3B show examples of the formulations provided herein. In this example, exemplary formulations as provided herein are used in a liquid composition, cola. The rebaudioside formulation, labeled Reb M (95%), and the brazzein formulation were added to the components. Formulations had a low pH of about 2.5-2.8, Phosphoric Acid, Class IV caramel, carbonated using bench top SodaStream©. Weekly descriptive analysis was performed to understand the flavor modification and sweetness degradation/increase and any changes observed of Brazzein over time in two conditions (5° C., 20° C.). Fresh sample Bestevia® Reb M (95%) with Brazzein at 25 ppm was compared to Reb M (95%) with 25 ppm Brazzein in respective condition (5° C., 20° C.) over shelf life (5 weeks total).

Attributes that were monitored were Basic tastes: sweet taste and onset, sour taste, bitter taste. Flavor: brown spice, citrus, sweet aromatics, green notes. Lingering sensation: sweet at 30 seconds, 60 seconds, 90 seconds, 2 minutes, 3 minutes. Test for sweetness and flavor degradation/increase over time in comparison to fresh control. This was run as one test with 6 samples directly comparing the two treatments.

The formulation comprises the following components, as shown in FIG. 3A, in the following amounts:
Potassium sorbate, 0.0150 g
Sodium benzoate, 0.0150 g
Reb M (95%), 0.0320 g
Brazzein, 0.0025 g
Cola Flavor, 0.0300 g
Cola Base, 0.2500 g*
for a total volume of 100 ml liquid cola.
*Where cola base contains Phosphoric Acid, Class IV Caramel The formulation comprises the following components, as shown in FIG. 3B, in the following amounts:
Potassium sorbate, 0.0150 g
Sodium benzoate, 0.0150 g
Reb M (95%), 0.0320 g
Cola Flavor, 0.0300 g
Cola Base, 0.2500 g*
for a total volume of 100 ml liquid cola.
*Where cola base contains Phosphoric Acid, Class IV Caramel Example 5: Use of Preferred Embodiments of the Present Formulations in Liquid Cola FIG. 4A and FIG. 4B shows examples of the formulations provided herein. In this example, exemplary formulations as provided herein are used in a liquid composition, cola. The rebaudioside formulation, labeled Reb M, Reb D, Reb E, Reb I, and the brazzein formulation were added to the components. Formulations had a low pH about 2.6-2.8, Phosphoric Acid, Class IV caramel, and were carbonated using a bench top SodaStream©. Weekly descriptive analysis was performed to understand the flavor modification and sweetness degradation/increase of Brazzein over time in two conditions. Attributes that were monitored were Basic tastes: sweet taste and onset, sour taste, bitter taste. Flavor: brown spice, citrus, sweet aromatics, green notes. Lingering sensation: sweet at 30 seconds, 60 seconds, 90 seconds, 2 minutes, 3 minutes. Test for sweetness and flavor degradation/increase over time in comparison to fresh control.

The formulation comprises the following components, as shown in FIG. 4A, in the following amounts:
Potassium sorbate, 0.0150 g
Sodium benzoate, 0.0150 g
Reb M, Reb D, Reb E, and Reb I, 0.0400 g
Brazzein, 0.0025 g
Cola Flavor, 0.0300 g
Cola Base, 0.2500 g*
for a total volume of 100 ml liquid cola.
*Where cola base contains Phosphoric Acid, Class IV Caramel The formulation comprises the following components, as shown in FIG. 4B, in the following amounts:
Potassium sorbate, 0.0150 g
Sodium benzoate, 0.0150 g
Reb M, Reb D, Reb E, and Reb I, 0.0400 g
Cola Flavor, 0.0300 g
Cola Base, 0.2500 g*
for a total volume of 100 ml liquid cola.
*Where cola base contains Phosphoric Acid, Class IV Caramel Example 6: Use of Preferred Embodiments of the Present Formulations in Tomato Ketchup FIG. 5A and FIG. 5B shows examples of the formulations provided herein. In this example, exemplary formulations as provided herein are used in a food composition, tomato ketchup. The rebaudioside formulation containing Reb M, Reb D, Reb E, Reb I in a liquid, and a composition containing Lactic Acid, Brazzein at 3-25 ppm, Thaumatin at 2-25 ppm, and Vanallin at 1-20 ppm was added to the components.

The formulation comprises the following components, as shown in FIG. 5A, in the following amounts:
Tomato puree, double concentrated 18.0000 g
Spirit Vinegar (10% acetic acid) 7.0000 g
Salt 1.8000 g
Spices and seasonings 0.055 g
Starch, corn modified 2.6000 g
Reb M, Reb D, Reb E, Reb I 0.060 g
Glycerin 0.24 g
Composition containing Lactic Acid, Brazzein at 3-25 ppm, Thaumatin at 2-20 ppm, and Vanallin at 1-20 ppm 0.1500 g
Potassium Sorbate 0.1000 g
Water to total weight 100 g The formulation comprises the following components, as shown in FIG. 5B, in the following amounts:
Tomato puree, double concentrated 18.0000 g
Spirit Vinegar (10% acetic acid) 7.0000 g
Salt 1.8000 g
Spices and seasonings 0.055 g Starch, corn modified 2.6000 g
Reb M, Reb D, Reb E, Reb I 0.060 g
Glycerin 0.24 g
Potassium Sorbate 0.1000 g
Water to total weight 100 g The components were mixed to yield the final formulation.

Each food or beverage provided in the Examples or shown in the Figures exhibits a rounded and complete flavor profile and excellent mouthfeel in comparison to full sucrose versions and no added sugar versions containing steviol glycosides alone of the same food product or beverage.

Addition of Brazzein to sugar improves the organoleptic properties of savoury and sweet food products. Brazzein as a flavour can enhance the existing umami and savoury taste in sauces and snacks, making food products more appealing for human taste. Brazzein not only intensify the sweetness of sucrose but boosts the perception of the inherent characterizing flavors of the product at a level equal or higher than sucrose The use of the inventive sweetener formulations can also be used for a variety of other beverages including in the preparation of juice drinks from fruits, such as apples, lemons, apricots, cherries, pineapples, and mangoes.

What is claimed is:

1. A composition comprising rebaudioside M (Reb M) and brazzein, wherein brazzein is present in the composition in an amount that is between 1 ppm and 100 ppm, and wherein Reb M is present in the composition in an amount that is between 1 ppm and 600 ppm, further comprising one or more of rebaudioside A (Reb A), rebaudioside B (Reb B), rebaudioside D (Reb D), rebaudioside E (Reb E), rebaudioside I (Reb I), or combinations thereof.

2. The composition of claim 1, further comprising Reb D.

3. The composition of claim 2, wherein Reb D is present in the composition in an amount that is between 1 ppm and 500 ppm.

4. The composition of claim 1, further comprising Reb E.

5. The composition of claim 4, wherein Reb E is present in the composition in an amount that is between 1 ppm and 100 ppm.

6. The composition of claim 1, further comprising Reb I.

7. The composition of claim 6, wherein Reb I is present in the composition in an amount that is between 1 ppm and 100 ppm.

8. The composition of claim 1, further comprising Reb B.

9. The composition of claim 8, wherein Reb B is present in the composition in an amount that is between 1 ppm and 200 ppm.

10. The composition of claim 1, further comprising Reb A.

11. The composition of claim 10, wherein Reb A is present in the composition in an amount that is between 1 ppm and 200 ppm.

12. The composition claim 1, wherein the composition has a sweetness intensity equivalent to the sweetness intensity of a solution comprising 1% to 15% (w/v-%) sucrose.

13. The composition of claim 1, wherein the composition comprises brazzein and Reb M, wherein brazzein is present in the composition in an amount that is between 1 ppm and 30 ppm and Reb M is present in the composition in an amount that is between 250 ppm and 600 ppm.

14. The composition of claim 13, wherein:
(i) brazzein is present in the composition in an amount that is between 4 ppm and 20 ppm and Reb M is present in the composition in an amount that is between 380 ppm and 450 ppm;
(ii) brazzein is present in the composition in an amount that is between 4 ppm and 20 ppm and Reb M is present in the composition in an amount that is between 480 ppm and 550 ppm;
(iii) brazzein is present in the composition in an amount that is between 4 ppm and 20 ppm and Reb M is present in the composition in an amount that is between 440 ppm and 540 ppm;
(iv) brazzein is present in the composition in an amount that is between 5 ppm and 25 ppm and Reb M is present in the composition in an amount that is between 280 ppm and 380 ppm;
(v) brazzein is present in the composition in an amount that is between 7 ppm and 14 ppm and Reb M is present in the composition in an amount that is between 400 ppm and 450 ppm;
(vi) brazzein is present in the composition in an amount that is between 7 ppm and 14 ppm and Reb M is present in the composition in an amount that is between 500 ppm and 550 ppm;
(vi) brazzein is present in the composition in an amount that is about 7 ppm and Reb M is present in the composition in an amount that is about 493 ppm; or
(vii) brazzein is present in the composition in an amount that is about 25 ppm and Reb M is present in the composition in an amount that is about 320 ppm.

15. The composition of claim 13, wherein the composition has a sweetness intensity greater than the sweetness intensity of an otherwise identical composition except for the absence of brazzein.

16. The composition of claim 1, wherein the composition comprises brazzein, Reb M, and Reb D, wherein brazzein is present in the composition in an amount that is between 1 ppm and 50 ppm, Reb M is present in the composition in an amount that is between 200 ppm and 500 ppm, and Reb D is present in the composition in an amount that is between 20 ppm and 200 ppm.

17. The composition of claim 16, wherein:
(i) brazzein is present in the composition in an amount that is between 3 ppm and 30 ppm, Reb M is present in the composition in an amount that is between 300 ppm and 400 ppm, and Reb D is present in the composition in an amount that is between 60 ppm and 140 ppm; or
(ii) wherein brazzein is present in the composition in an amount that is between 4 ppm and 20 ppm, Reb M is present in the composition in an amount that is between 300 ppm and 400 ppm, and Reb D is present in the composition in an amount that is between 50 ppm and 150 ppm.

18. The composition of claim 16, wherein the composition has a sweetness intensity equivalent to the sweetness intensity of a solution comprising 200 ppm sucralose.

19. The composition of claim 1, wherein the composition comprises brazzein, Reb M, Reb D, Reb E, and Reb I, wherein brazzein is present in the composition in an amount that is between 1 ppm and 40 ppm, Reb M is present in the composition in an amount that is between 1 ppm to 500 ppm, Reb D is present in the composition in an amount that is between 1 ppm and 350 ppm, Reb E is present in the composition in an amount that is between 1 ppm and 100 ppm, and Reb I is present in the composition in an amount that is between 1 ppm and 100 ppm.

20. The composition of claim 19, wherein:
(i) brazzein is present in the composition in an amount that is between 1 ppm and 20 ppm, Reb D is present in the composition in an amount that is between 1 ppm to 10 ppm, Reb E is present in the composition in an amount that is between 1 ppm and 20 ppm, Reb M is present in the composition in an amount that is between 1 ppm and 14 ppm, and Reb I is present in the composition in an amount that is between 1 ppm and 7 ppm;
(ii) brazzein is present in the composition in an amount that is between 4 ppm and 30 ppm, Reb M is present in the composition in an amount that is between 300 ppm to 400 ppm, Reb D is present in the composition in an amount that is between 30 ppm and 80 ppm, Reb E is present in the composition in an amount that is between 20 ppm and 80 ppm, and Reb I is present in the composition in an amount that is between 30 ppm and 80 ppm; optionally wherein the composition further comprises thaumatin at 1-5 ppm;
(iii) brazzein is present in the composition in an amount that is between 4 ppm and 20 ppm, Reb M is present in the composition in an amount that is between 250 ppm to 450 ppm, Reb D is present in the composition in an amount that is between 30 ppm and 80 ppm, Reb E is present in the composition in an amount that is between 20 ppm and 80 ppm, and Reb I is present in the composition in an amount that is between 30 ppm and 80 ppm;
(iv) brazzein is present in the composition in an amount that is between 4 ppm and 30 ppm, Reb M is present in the composition in an amount that is between 250 ppm to 500 ppm, Reb D is present in the composition in an amount that is between 25 ppm and 150 ppm, Reb E is present in the composition in an amount that is between 25 ppm and 75 ppm, and Reb I is present in the composition in an amount that is between 25 ppm and 75 ppm; optionally wherein the composition further comprises glycerin at 500 ppm and 4000 ppm; further optionally wherein the composition has a sweetness intensity level equivalent to sweetness intensity of a solution comprising 1-3% w/w of sucrose; or
(v) brazzein is present in the composition in an amount that is between 3 ppm and 30 ppm, Reb M is present in the composition in an amount that is between 100 ppm to 400 ppm, Reb D is present in the composition in an amount that is between 50 ppm and 300 ppm, Reb E is present in the composition in an amount that is between 20 ppm and 70 ppm, and Reb I is present in the composition in an amount that is between 20 ppm and 60 ppm; optionally wherein the composition further comprises malic acid at 0.1-0.4% w/w; further optionally wherein the composition has a sweetness intensity level equivalent to sweetness intensity of a solution comprising 1-3% w/w of sucrose.

21. The composition of claim 19, wherein the composition has a sweetness intensity equivalent to the sweetness intensity of a solution comprising 1% to 15% (w/v-%) sucrose.

22. The composition of claim 1, wherein the composition comprises brazzein, Reb M, Reb D, Reb E, Reb I, and Reb B, wherein brazzein is present in the composition in an amount that is between 4 ppm and 20 ppm, Reb M is present in the composition in an amount that is between 2 ppm to 400 ppm, Reb D is present in the composition in an amount that is between 5 ppm and 50 ppm, Reb E is present in the composition in an amount that is between 5 ppm and 50 ppm, Reb I is present in the composition in an amount that is between 5 ppm and 50 ppm, and Reb B is present in the composition in an amount that is between 5 ppm and 100 ppm.

23. The composition of claim 22, further comprising one or more of caffeine, taurine, niacin (Vitamin B3), pyridoxine (Vitamin B6), pantothenic acid (Vitamin B5), cobalamin (Vitamin B12), and combination thereof; optionally wherein caffeine is present in the composition in an amount that is between 100 ppm-600 ppm, taurine is present in the composition in an amount that is between 500 ppm and 12000 ppm, niacin (Vitamin B3) is present in the composition in an amount that is between 5-680 ppm, pyridoxine (Vitamin B6) is present in the composition in an amount that is between 5-180 ppm, pantothenic acid (Vitamin B5) is present in the composition in an amount that is between 5-120 ppm, and cobalamin (Vitamin B12) is present in the composition in an amount that is between 5-80 ppm.

24. The composition of claim 1, wherein the composition comprises brazzein, Reb M, Reb D, Reb E, Reb I, Reb B, and Reb A, wherein brazzein is present in the composition in an amount that is between 1 ppm and 50 ppm, Reb M is present in the composition in an amount that is between 50 ppm to 400 ppm, Reb D is present in the composition in an amount that is between 1 ppm and 350 ppm, Reb E is present in the composition in an amount that is between 5 ppm and 100 ppm, Reb I is present in the composition in an amount that is between 5 ppm and 100 ppm, Reb A is present in the composition in an amount that is between 1 ppm and 100 ppm, and Reb B is present in the composition in an amount that is between 1 ppm and 100 ppm.

25. The composition of claim 24, wherein:
(i) brazzein is present in the composition in an amount that is between 3 ppm and 30 ppm, Reb M is present in the composition in an amount that is between 300 ppm to 400 ppm, Reb D is present in the composition in an amount that is between 60 ppm and 140 ppm, Reb E is present in the composition in an amount that is between 30 ppm and 70 ppm, Reb I is present in the composition in an amount that is between 30 ppm and 70 ppm, Reb A is present in the composition in an amount that is between 1 ppm and 10 ppm, and Reb B is present in the composition in an amount that is between 30 ppm and 70 ppm;
(ii) brazzein is present in the composition in an amount that is between 7 ppm and 40 ppm, Reb M is present in the composition in an amount that is between 220 ppm to 300 ppm, Reb D is present in the composition in an amount that is between 2 ppm and 40 ppm, Reb E is present in the composition in an amount that is between 5 ppm and 50 ppm, Reb I is present in the composition in an amount that is between 5 ppm and 50 ppm, Reb A is present in the composition in an amount that is between 5 ppm and 100 ppm, and Reb B is present in the composition in an amount that is between 5 ppm and 100 ppm;

(iii) brazzein is present in the composition in an amount that is between 7 ppm and 40 ppm, Reb M is present in the composition in an amount that is between 220 ppm to 300 ppm, Reb D is present in the composition in an amount that is between 5 ppm and 300 ppm, Reb E is present in the composition in an amount that is between 5 ppm and 80 ppm, Reb I is present in the composition in an amount that is between 15 ppm and 50 ppm, Reb A is present in the composition in an amount that is between 5 ppm and 100 ppm, and Reb B is present in the composition in an amount that is between 5 ppm and 100 ppm; or (iv) brazzein is present in the composition in an amount that is between 1 ppm and 40 ppm, Reb M is present in the composition in an amount that is between 50 ppm to 400 ppm, Reb D is present in the composition in an amount that is between 50 ppm and 300 ppm, Reb E is present in the composition in an amount that is between 5 ppm and 50 ppm, Reb I is present in the composition in an amount that is between 5 ppm and 50 ppm, Reb A is present in the composition in an amount that is between 5 ppm and 100 ppm, and Reb B is present in the composition in an amount that is between 5 ppm and 100 ppm; optionally wherein the composition further comprises malic acid at 0.05-0.35% (w/w) or citric acid at 0.05-0.4% (w/w); further optionally wherein the composition further comprises apple juice at 10-50% (v/v).

26. The composition of claim 24, wherein the composition has a sweetness intensity greater than the sweetness intensity of an otherwise identical composition except for the absence of brazzein.

27. A consumable comprising the composition of claim 1.

28. The consumable of claim 27, wherein the consumable is an oral composition, a pharmaceutical composition, a beverage, a food composition, an animal feed product, a liquid, a powder, a table-top sweetener.

29. The consumable of claim 27, wherein the consumable is cocoa mix, umami and/or savoury food, tomato ketchup, a sauce, a snack, an alcoholic beverage, fruit juice, fruit juice flavored drink, apple juice, carbonated apple juice, flavored water, enhanced water, acidified water, soft drink cola, or lemonade.

* * * * *